US010923130B2

(12) United States Patent
Choi et al.

(10) Patent No.: US 10,923,130 B2
(45) Date of Patent: Feb. 16, 2021

(54) ELECTRONIC DEVICE AND METHOD OF PERFORMING FUNCTION OF ELECTRONIC DEVICE

(71) Applicant: Samsung Electronics Co., Ltd., Gyeonggi-do (KR)

(72) Inventors: Gyucheol Choi, Gyeonggi-do (KR); Youngkyoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/270,788

(22) Filed: Feb. 8, 2019

(65) Prior Publication Data

US 2019/0251975 A1 Aug. 15, 2019

(30) Foreign Application Priority Data

Feb. 9, 2018 (KR) .................. 10-2018-0016277

(51) Int. Cl.
| | |
|---|---|
| *G10L 17/00* | (2013.01) |
| *H04L 29/06* | (2006.01) |
| *G06F 21/32* | (2013.01) |
| *G10L 17/06* | (2013.01) |

(52) U.S. Cl.
CPC .............. *G10L 17/00* (2013.01); *G06F 21/32* (2013.01); *G10L 17/06* (2013.01); *H04L 63/083* (2013.01)

(58) Field of Classification Search
CPC ..... G10L 17/005; G10L 17/06; H04L 63/083; G06F 21/32
USPC ....................................................... 704/246
See application file for complete search history.

(56) References Cited

U.S. PATENT DOCUMENTS

| | | | |
|---|---|---|---|
| 8,949,958 B1 | 2/2015 | Dixon | |
| 9,147,399 B1 | 9/2015 | Hart et al. | |
| 9,286,899 B1 | 3/2016 | Narayanan | |
| 9,299,350 B1 | 3/2016 | Dumont et al. | |
| 2006/0085189 A1* | 4/2006 | Dalrymple | G10L 17/06 704/250 |
| 2011/0099009 A1* | 4/2011 | Zopf | G10L 17/00 704/230 |

(Continued)

OTHER PUBLICATIONS

International Search Report dated May 22, 2019.
European Search Report dated Jun. 17, 2019.

*Primary Examiner* — Edwin S Leland, III
(74) *Attorney, Agent, or Firm* — Cha & Reiter, LLC

(57) ABSTRACT

An electronic device and method are disclosed, including a communication circuit, a speaker, a microphone and a processor. The processor implements the method, including receiving a first voice input through the microphone, executing first voiceprint authentication on the first voice input including determining whether the first voice input matches voice information corresponding to a user stored in the electronic device, when the first voice input does not match the voice information, transmit a request message to at least one external electronic device for execution of a second voiceprint authentication, receive a response message indicating whether the first voice input is authenticated under the second voiceprint authentication, receive a second voice input through the microphone, and transmit second data related to the second voice input to an external server through the communication circuit for Automatic Speech Recognition (ASR) or Natural Language Understanding (NLU) on the second data.

18 Claims, 32 Drawing Sheets

(56) References Cited

U.S. PATENT DOCUMENTS

| | | | |
|---|---|---|---|
| 2013/0225129 A1* | 8/2013 | Norbisrath | H04L 63/105 455/411 |
| 2015/0025888 A1* | 1/2015 | Sharp | G10L 17/04 704/246 |
| 2016/0019889 A1* | 1/2016 | Alvarez Guevara | G10L 19/00 704/254 |
| 2016/0275952 A1* | 9/2016 | Kashtan | H04M 3/569 |
| 2016/0322053 A1* | 11/2016 | Dai | G10L 17/06 |
| 2016/0358605 A1* | 12/2016 | Ganong, III | H04W 52/0254 |
| 2017/0032784 A1* | 2/2017 | Dadu | G06F 1/3287 |
| 2017/0358317 A1* | 12/2017 | James | G10L 25/48 |
| 2019/0251975 A1* | 8/2019 | Choi | H04L 63/083 |

\* cited by examiner

ELECTRONIC DEVICE AND METHOD OF PERFORMING FUNCTION OF ELECTRONIC DEVICE

CROSS-REFERENCE TO RELATED APPLICATION

This application is based on and claims priority under 35 U.S.C. § 119 of Korean Patent Application No. 10-2018-0016277, filed on Feb. 9, 2018, in the Korean Intellectual Property Office, the disclosure of which is incorporated herein by reference in its entirety.

BACKGROUND

1. Field

The present disclosure relates to an electronic device and a method of performing a function of the electronic device.

2. Description of the Related Art

An artificial intelligence system is a computer system for implementing computerized intelligences that can learn, make decisions, and improve recognition rates the more frequently it is used.

Artificial intelligence technology includes machine-learning (for example, deep-learning) technology that uses an algorithm for classifying/learning features of input data by itself, and element technologies for copying cognition and decision functions of the human brain through a machine-learning algorithm.

The element technologies may include one or more of language understanding technology for recognizing human languages/characters, visual understanding technology for recognizing objects through system like human vision, inference/prediction technology for determining information and performing logical inference and prediction, knowledge representation technology for processing human experience information to knowledge data, and motion control technology for controlling autonomous driving of vehicles or the motion of robots.

For example, language understanding corresponds to technology for recognizing and applying/processing human language/text and may include natural language processing, machine translation, conversation systems, question-and-answer processing, and voice recognition/synthesis.

For example, visual understanding corresponds to technology for recognizing objects through a system like human vision and processing the same, and may include object recognition, object tracking, image search, person recognition, scene understanding, spatial understanding, and image improvement.

For example, inference and prediction correspond to technology for determining information and logically inferring and predicting the same, and may include knowledge/probability-based inference, optimization prediction, preference-based planning, and recommendation.

For example, knowledge representation corresponds to technology for automatically processing human experience information to knowledge data and may include data structures (for example, data creation/classification) and data management (for example, the use of data).

For example, motion control corresponds to technology for controlling autonomous driving of vehicles or the motion of robots, and may include motion control (for example, navigation, impulsion, or driving) and manipulation control (for example, behavior control).

SUMMARY

An electronic device that has a voice recognition function may acquire an utterance from a user in a first mode (for example, a wakeup mode or an idle mode). When the utterance includes a preset word (for example, a wakeup word), the mode of the electronic device is switched to a second mode (for example, an instruction execution mode) and the electronic device may perform a relevant operation to execute the instruction included in the utterance. For example, a method of identifying whether the acquired utterance includes the preset word may include one or more of a method of analyzing an audio characteristic of the acquired utterance and comparing the same with an audio characteristic of the stored utterance, as well as a method of converting the acquired utterance into a character string (Speech-To-Text (STT)) and comparing the converted character string with the preset word.

In various examples, an electronic device that has a speaker authentication function may receive an utterance (or a voice) of the user and determine whether to authenticate the user of the electronic device through a voiceprint of the utterance. For example, the electronic device may acquire a voiceprint from the received utterance in the first mode and store the acquired voiceprint as an authentication voiceprint. The electronic device may receive an utterance of the user additionally received in the second mode and compare it to a voiceprint extracted from the utterance with the stored authentication voiceprint so as to perform a user authentication procedure.

The method of comparing audio characteristics or the method of comparing character strings through STT has disadvantages in that the operation is performed on an utterance of a user who is not registered in the electronic device. The method using the voiceprint authentication for performing the operation for the authenticated user's utterance has disadvantages in that the voiceprint should be registered to use the corresponding device and in that a non-registered user cannot use the device.

Various embodiments of the present disclosure may provide an electronic device capable of performing voiceprint authentication on the basis of an utterance of a user who is not registered and performing an operation related to the utterance, as well as a method of performing functions by the electronic device.

In accordance with an aspect of the present disclosure, an electronic device is provided. The electronic device includes: at least one communication circuit, a speaker, a microphone, at least one processor operationally connected to the communication circuit, the speaker, and the microphone, and a memory storing instructions, wherein the instructions are executable by the at least one processor to cause the electronic device to: receive a first voice input through the microphone, execute first voiceprint authentication on the first voice input including determining whether the first voice input matches voice information corresponding to a user stored in the electronic device, when the first voice input does not match the voice information, transmit a request message including first data related to the first voice input to at least one external electronic device using the communication circuit for execution of a second voiceprint authentication on the first voice input, receive a response message from the at least one external electronic device indicating whether the first voice input is authenticated under the second voiceprint authentication, receive a second voice input through the microphone, and transmit second data related to the second voice input to an external server through the communication circuit for execution of at least one of Automatic Speech Recognition (ASR) and Natural Language Understanding (NLU) on the second data related to the second voice input.

In accordance with another aspect of the present disclosure, a method of operating an electronic device is provided. The method includes: receiving a first voice input through a microphone, executing first voiceprint authentication on the first voice input including determining whether the first voice input matches voice information corresponding to a user stored in the electronic device, when the first voice input does not match the voice information, transmitting a request message including first data related to the first voice input to at least one external electronic device using the communication circuit for execution of a second voiceprint authentication on the first voice input, receiving a response message from the at least one external electronic device indicating whether the first voice input is authenticated under the second voiceprint authentication, receiving a second voice input through the microphone, and transmitting second data related to the second voice input to an external server for execution of at least one of Automatic Speech Recognition (ASR) and Natural Language Understanding (NLU) on the second data related to the second voice input.

In accordance with another aspect of the present disclosure, an electronic device is provided. The electronic device includes: at least one communication circuit, a microphone, at least one processor operationally connected to the communication circuit and the microphone, and a memory storing instructions executable by the at least one processor to cause the electronic device to: receive a first voice input through the microphone, execute first voiceprint authentication on the first voice input including determining whether the first voice input matches voice information corresponding to a user stored in the electronic device, when the first voice input does not correspond to the user registered in the electronic device, transmit, using the communication circuit, a request message including first data related to the first voice input to at least one external electronic device to cause the external electronic device to execute second voiceprint authentication processing for the first voice input, receive, using the communication circuit, a response message including an authentication result from the external electronic device, and execute an operation corresponding to the received first voice input or a second voice input received through the microphone, based on the authentication result. An electronic device according to various embodiments can perform voiceprint authentication on an utterance of a user who is not registered in the electronic device receiving the utterance and can perform an operation related to the utterance according to various embodiments.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
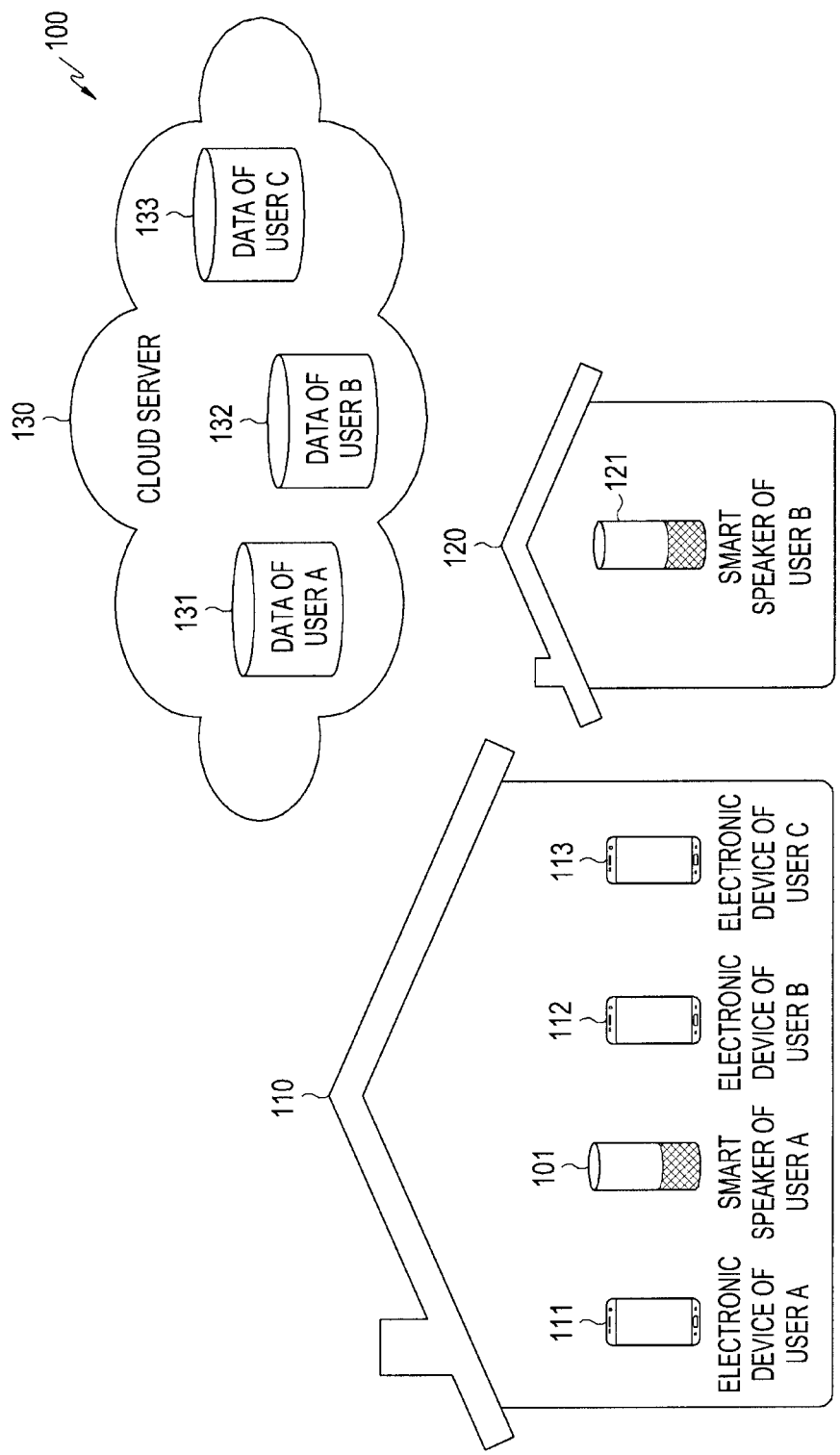
FIG. 1 illustrates a system environment according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element). The expression "a plurality of" may mean at least two. The expression "at least A, B or C" may include only A, only B, only C, both A and B, both A and C, both B and C, all of A, B, and E, or variations thereof.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include one or more of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. The HMD device may include one or more of an accessory type device (e.g., a watch, a ring, a bracelet, an ankle bracelet, a necklace, a pair of glasses, a contact lenses, a head mounted device (HMD), or a head mounted display (HMD)), a fabric or clothing integrated device (e.g., electronic clothing), a body attachment device (e.g., a skin pad or tattoo), and a bio-implantable circuit. In some embodiments, the electronic device may include one or more of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include one or more of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, an electronic device may include one or more of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the present disclosure is not limited to the above-described devices. In the present disclosure, the term "user" may indicate a person using an electronic device or a device (e.g., an artificial intelligence electronic device) using an electronic device.

FIG. 1 illustrates a network environment according to various embodiments of the present disclosure. Referring to FIG. 1, it is assumed that a system environment 100 according to various embodiments includes a home 110 of user A, a home 120 of user B, and a cloud server 130.

According to various embodiments, an electronic device 111 (hereinafter, referred to as a "first electronic device" for convenience of description) of user A, a smart speaker 101 (hereinafter, referred to as a "first smart speaker", a "smart speaker" or an "electronic device" for convenience of description) of user A, an electronic device 112 of user B (hereinafter, referred to as a "second electronic device" for convenience of description), and an electronic device 113 of user C (hereinafter, referred to as a "third electronic device" for convenience of description) may be located in the home 110 of user A. According to various embodiments, a smart speaker 121 of user B (hereinafter, referred to as a "second smart speaker" for convenience of description) may be located in the home 120 of user B.

According to various embodiments, the cloud server 130 may store data 131 of user A, data 132 of user B, or data 133 of user C.

Referring to the arrangement of each device illustrated in FIG. 1, it is assumed that user B or user C visits the home of user A, performs voiceprint authentication through the speaker (the first smart speaker 101) of user A, and then receives a service. According to various embodiments, the first smart speaker 101 may acquire an utterance from the user and analyze the acquired utterance so as to perform a relative operation or cause the operation to be performed. The first smart speaker 101 may register a plurality of user accounts and receive voice utterances of one or more users. The first smart speaker 101 may use an intelligent service (not shown) connected through a network to analyze the voice utterance.

The first smart speaker 101, according to various embodiments of the present disclosure, may acquire a user's utterance and acquire an utterance voiceprint from the acquired utterance. The first smart speaker 101 may store the utterance voiceprint as an authentication voiceprint for user authentication. For example, in order to perform a user registration operation, the first smart speaker 101 may receive an utterance from the user and generate and store an authentication voiceprint on the basis of the utterance voiceprint. Thereafter, the first smart speaker 101 may compare an utterance voiceprint acquired from an utterance of another user with the stored authentication voiceprint and acquire the similarity between the utterance voiceprint and the authentication voiceprint. The first smart speaker 101 may perform an operation included in the utterance or may cause the operation to be performed on the basis of the result of the similarity between the utterance voiceprint and the authentication voiceprint. The first smart speaker 101 may transmit a scan instruction for searching for an external electronic device to the external electronic device and receive a presence response corresponding to the scan instruction from one or more external device. The first smart speaker 101 may perform encryption communication with the external electronic device when transmitting and receiving information related to the execution of the operation included in the utterance.

The electronic devices 111, 112, and 113 (for example, smart phones) of users, according to various embodiments of the present disclosure, may transmit a presence response in response to the device scan instruction of the first smart speaker 101. According to various embodiments, each electronic device 111, 112, or 113 may acquire and transmit relevant information for performing the operation in response to a request from the first smart speaker 101 for information related to the operation based on the user's utterance. Each electronic device 111, 112, or 113 may perform the operation or cause the operation to be performed in response to the request from the first smart speaker 101 for information related to the operation based on the user's utterance. Each electronic device 111, 112, or 113 may perform encryption communication for information exchange with the first smart speaker 101.

The cloud server 130 may perform a function for storing and managing data of the user. Further, the cloud server 130 may perform a function for connection with another service (for example, an intelligent service). The cloud server 130, according to various embodiments of the present disclosure, may store and manage information related to users of the electronic devices 111, 112, and 113. The cloud server 130 may store and manage information related to devices within the home 110 of user A. The cloud server 130 may provide a music service through the first smart speaker 101 of user A or the electronic devices 111, 112, and 113 of the users.

User data 131, 132, and 133 may be stored in particular locations within the cloud server 130 may control user's access with reference to an account allocated to a user-specific space in the cloud server 130 or access authentication information (certificate).

Figure 2:
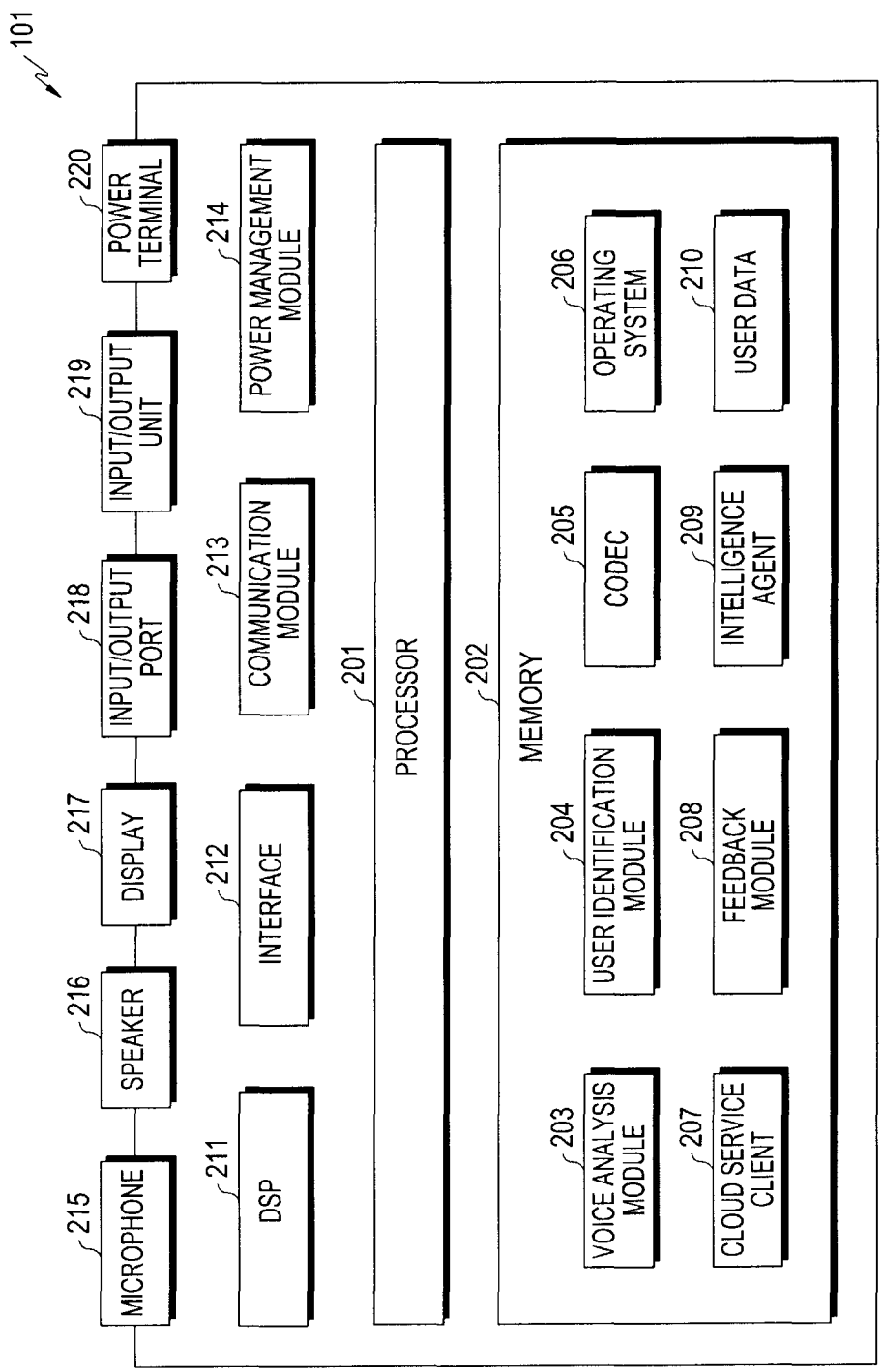
FIG. 2 is a block diagram illustrating a detailed configuration of an electronic device according to various embodiments of the present disclosure.

FIG. 2 is a block diagram illustrating the detailed configuration of the electronic device (for example, the smart speaker 101) according to various embodiments of the present disclosure.

According to an embodiment, the smart speaker 121 of user B in FIG. 1 may include the same elements or at least some elements which are the same as those of the electronic device (for example, the smart speaker 101).

A processor 201 (processing unit) may perform predetermined operations by controlling various elements of the smart speaker 101.

A memory 202 (memory unit) may include a voice analysis module 203, a user identification module 204, a codec 205, an operating system 206, a cloud service client 207, a feedback module 208, an intelligent agent 209, or user data 210. According to various embodiments, the memory 202 may store software for driving the smart speaker 101, data utilized for driving the software, and user data. The software may include one or more of an operating system, a framework, and an application. The data utilized for driving the software may include one or more piece of temporary data temporarily generated and used while driving the software and program data generated and stored by driving the software. The user data may be content of various types generated or acquired by the user. For example, the user data may include one or more of music, videos, photos, and documents.

The voice analysis module 203 may acquire and analyze a user's utterance. The analysis may include one or more of acquiring a voiceprint from the utterance, storing the acquired voiceprint as an authentication voiceprint, and comparing the stored authentication voiceprint with an utterance voiceprint. Further, the analysis may include one or more function of extracting text from the utterance (Speech-To-Text (STT)) and processing a natural language or a function of performing one or more function and identifying the result thereof.

The user identification module 204 may manage a user account by which the smart speaker 101 and a service linked to the smart speaker 101 can be used. The user identification module 204 may store the user account and relevant information for authentication of the user account. The user identification module 204 may perform an authentication procedure for a user who desires to use the smart speaker with reference to one or more of various authentication methods such as ID/password, device authentication, and voiceprint authentication. Further, the user identification module 204 may perform an authentication procedure for using an external electronic device connected to the smart speaker or an external service.

The codec 205 may perform an operation of compressing and storing (coder, encoding) images or voice data and decompressing (decoder, decoding) the compressed images or voice data to output an analog signal. The codec 205 may be stored in the memory 202 in the form of S/W and may be driven by the processor 201. The codec 205 may be stored in the DSP 211 in the form of firmware and driven. The codec 205 may include one or more codec selected from video codecs such as MPEG; Indeo, DivX, Xvid, H.264, WMV, RM, MOV, ASF, and RA or audio codecs such as MP3, AC3, AAC, OGG; WMA, FLAC, and DTS.

The operating system 206 may provide a basic function for the operation of the smart speaker 101 and may control the overall operation state thereof. The operating system 206 may detect various events and perform operations corresponding to the events. The operating system 206 may install a third application for performing an expansion function and may provide a driving environment.

The cloud service client 207 may connect the smart speaker 101 to the cloud server 130 and perform a relevant operation. The cloud service client 207 may perform a function of synchronizing data stored in the smart speaker 101 with data stored in the cloud server 130. Further, the cloud service client 207 may receive a cloud service from the cloud server 130. The cloud service may be an external third-party service having any of various forms including data storage or content streaming.

The feedback module 208 may create and generate feedback to be provided from the smart speaker 101 to the user of the smart speaker 101. The feedback may include one or more of sound feedback, LED feedback, vibration feedback, and a method of controlling part of the device.

The intelligent agent 209 may perform an intelligent function based on a user's utterance acquired through the smart speaker 101, or may acquire the result of execution of the intelligent function through a link with an external intelligent service. The intelligent function may include one or more of ASR, STT, NLU, NLG, TTS, Action Planning, and Reasoning functions for recognizing and processing the user's utterance. According to various embodiments, the intelligent agent 209 may recognize the user's utterance acquired through smart speaker 101 and may determine the category to which the corresponding instruction belongs on the basis of text extracted from the recognized utterance. For example, when the user speaks "play playlist remake 2", the intelligent agent 209 may analyze the utterance and determine that it is a category related to "music playback".

The user data 210 may be data generated or acquired by the user or data generated or acquired by a function performed by the user.

The Digital Signal Processor (DSP) 211 may convert an analog image or an analog voice signal into a digital signal that can be processed by the electronic device, or may convert a stored digital image or digital voice signal into an analog signal that can be recognized by the user. In order to perform the operation at high speed, the digital signal processor 211 may implement calculations required for the operation in the form of a circuit. The digital signal processor 211 may include the codec 205 or may perform an operation with reference to the codec 205.

An interface (interface unit) 212 may perform a function by which the smart speaker 101 acquires input from the user, outputs information for the user, or exchanges information with an external electronic device. More specifically, the interface 212 may operate while being functionally connected to a microphone 215 and a speaker 216 for sound signal processing. In another example, the interface 212 may operate while being functionally connected to a display 217 in order to output information to the user. Further, the interface 212 may operate while being functionally connected to an input/output port 218 and an input/output unit 219 in order to perform an input/output operation between the user or the external electronic device and the smart speaker in various forms.

A communication module (network unit) 213 may allow the smart speaker 101 to exchange information with an external device through a networking protocol. The networking protocol may include one or more of short-range communication protocols such as NFC, Bluetooth/BLE, ZigBee, and Z-Wave, and Internet Network Protocols such as TCP and UDP. The communication circuit (or module) 213 may support one or more of a wired communication network and a wireless communication network.

A power management module (or unit) 214 may acquire power for driving the smart speaker 101 from a power terminal 220 and supply power for driving the smart speaker 101 by controlling the same. The power management module 214 may charge a battery with power acquired from the power terminal 220. The power management module 214 may perform one or more operation among a change in voltage for power acquired for driving or charging the smart speaker 101, a DC/AC conversion, a current control, and a current circuit control.

The microphone (MIC) 215 may acquire a sound signal from the user or the surrounding environment. The speaker 216 may output a sound signal. The display 217 may output an image signal.

The input/output port (I/O port) 218 may provide an implement for connection with an external electronic device in order to expand the function of the smart speaker 101. The input/output port 218 may include one or more of an audio input port, an audio output port, a USB expansion port, and a LAN port.

The input/output unit (I/O unit) 219 may include various devices for acquiring input from the user and outputting information to the user. The input/output unit 219 may include one or more of a button, a touch panel, a wheel, a jog dial, a sensor, an LED, a vibration generation device, and a beep generation device. A power terminal 220 may receive AC/DC power for driving the smart speaker 101.

Figure 3:
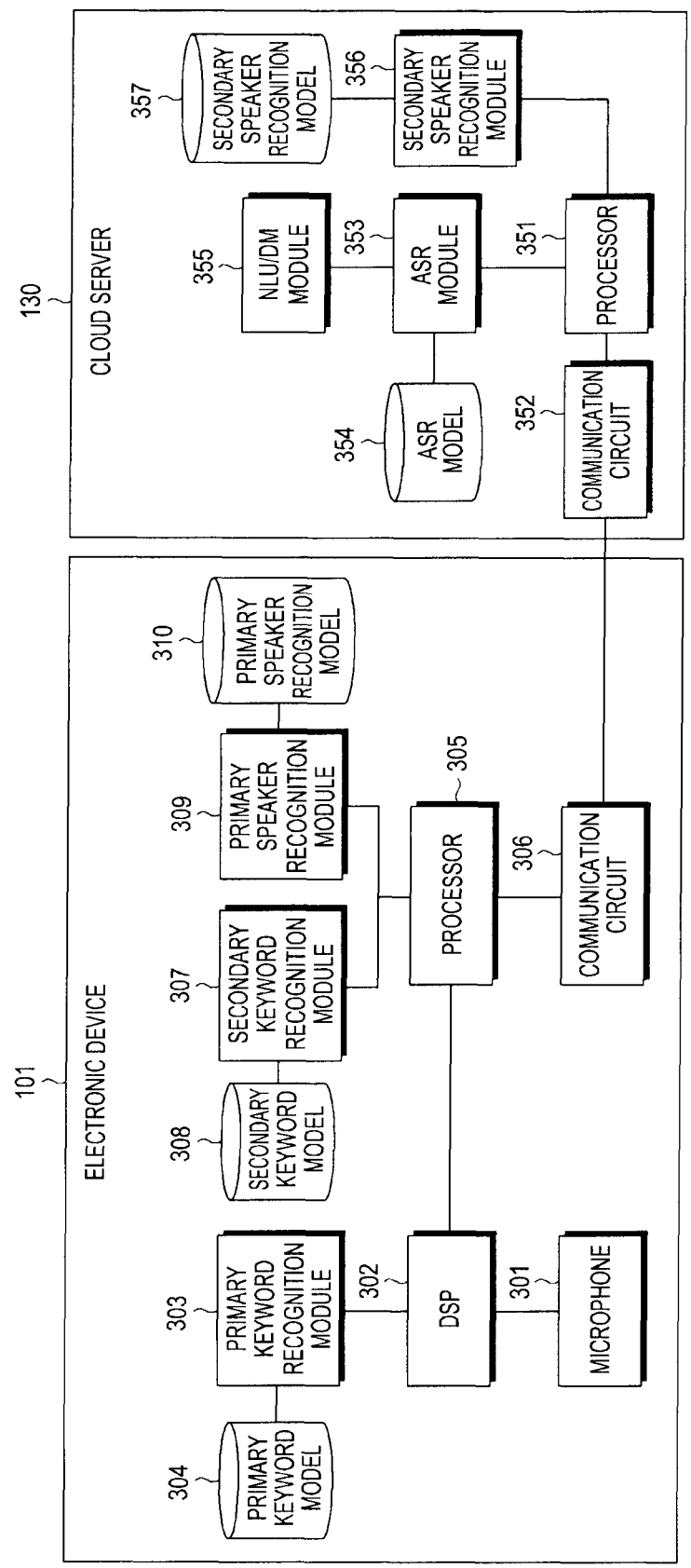
FIG. 3 is a block diagram illustrating a detailed configuration of an electronic device and a cloud server according to various embodiments of the present disclosure.

FIG. 3 is a block diagram illustrating the detailed configuration of an electronic device and a cloud server according to various embodiments of the present disclosure. Referring to FIG. 3, the electronic device 101 may include a microphone 301 (for example, the microphone 215 of FIG. 2), a DSP 302, a primary keyword recognition module 303, a primary keyword model database 304, a processor 305 (for example, the processor 201 of FIG. 2), a communication circuit (or module) 306 (for example, the communication module 213 of FIG. 2), a secondary keyword recognition module 307, a secondary speaker recognition model database 308, a primary speaker recognition module 309, or a primary speaker recognition model database 310, and the cloud server 130 may include a processor 351, a communication circuit 352, an ASR module 353, an ASR model database 354, a secondary speaker recognition module 356, an NLU/DM module 355, and a secondary speaker recognition model database 357.

The microphone 301 may receive a user's utterance. The Digital Signal Processor (DSP) 302 may include an audio codec (connected to a microphone or a speaker to perform simple sound preprocessing such as sound input/output, DA/AD conversion, or gain control). The processor 305 may include one or more processors and an Application Processor (AP).

The cloud server 130 may include a recognition server, and may perform more complex and accurate voice recognition. For example, the cloud server 130 may perform functions of large vocabulary utterance recognition, speaker verification/identification, and natural language understanding.

The primary keyword recognition module 303 (keyword recognition) may recognize a small number of words designated to a voice recognizer included in the DPS 302. The primary keyword model database 304 may include a recognition model which is referred to by the primary keyword recognition module 303 during recognition.

The secondary keyword recognition module 307 may recognize a small number of words designated to a voice recognizer included in the processor 305, and may be relatively more complex and accurate than the primary keyword recognition module 303. For example, the number of dimensions of a feature vector used for recognition may be higher, and a phoneme model used for recognition may be more complex (for example, the number of clusters of recognition may be larger or a dimension of phoneme n-gram may be higher). The secondary keyword model database 308 may include a recognition model which is referred to by the secondary keyword recognition module 307 during recognition.

The primary keyword recognition module 303 and the secondary keyword recognition module 307 may use the same decoding algorithm or different decoding algorithms. The secondary keyword model database 308 may include a recognition model which is referred to by the secondary keyword recognition module 307, and may include a model of which at least part is the same as that of the primary keyword model database 304 or may be the same as the primary keyword model database 304.

The primary speaker recognition module 309 and the secondary speaker recognition module 356 may perform a speaker authentication (verification)/recognition (identification) function. Each of the primary speaker recognition module 309 and the secondary speaker recognition module 356 may include text-independent speaker recognition (including a GMM-based or i-vector-based recognition method) and text-dependent speaker recognition (including an HMM-based method or DTW) with reference to data stored in the primary speaker recognition model database 310 or the secondary speaker recognition model database 357.

The ASR module 353 may recognize a relatively large number of words or combinations thereof through large vocabulary utterance recognition. The ASR model database 354 may include a recognition model which is referred to for large vocabulary utterance recognition during recognition. The NLU/DM module 355 may include a model for understanding human language expression through natural language understanding. For example, the NLU/DM module 355 may detect a user's intention to define an action to be performed for a voice instruction and cause the action to be performed by the device.

An electronic device, according to one of various embodiments of the present disclosure, may include: one or more communication circuit 213, a speaker 216, a microphone 326, a processor 201 operationally connected to the communication circuit 213, the speaker 216, and the microphone 215, and a memory 202 operationally connected to the processor 201, such that the memory 202 may store instructions causing the processor 201 to, when executed by the processor, receive a first voice input through the microphone, perform first voiceprint authentication (voice biometrics) processing in order to determine whether the first voice input corresponds to a user registered in the electronic device, transmit a request message including first data related to the first voice input to one or more external electronic device connected to the electronic device through the communication circuit in order to cause the external electronic device to perform second voiceprint authentication processing for the first voice input when the first voice input does not correspond to the user registered in the electronic device, receive a response message including an authentication result based on the second voiceprint authentication processing from the external electronic device through the communication circuit, receive a second voice input through the microphone, and transmit second data related to the second voice input to an external server through the communication circuit at least partially for Automatic Speech Recognition (ASR) and/or Natural Language Understanding (NLU).

According to various embodiments of the present disclosure, the instructions may cause the processor to perform the first voiceprint authentication at least partially through the external server.

According to various embodiments of the present disclosure, the one or more external electronic device may be connected to the electronic device through short-range communication including one or more of Wireless Fidelity (Wi-Fi), Light Fidelity (Li-Fi), Bluetooth, Bluetooth Low Energy (BLE), ZigBee, Near Field Communication (NFC), or magnetic secure transmission.

According to various embodiments of the present disclosure, the electronic device may be a smart speaker.

According to various embodiments of the present disclosure, the instructions may cause the processor to receive information for accessing the external server from the external electronic device and to access the external server based on the received information for accessing the external server.

According to various embodiments of the present disclosure, the instructions may cause the processor to determine the subject that is to perform an operation included in the first voice input by analyzing the first voice input and to determine whether voiceprint authentication is utilized based on the determined subject.

According to various embodiments of the present disclosure, the instructions may cause the processor to determine an operation included in the first voice input by analyzing the first voice input and to determine whether the determined operation utilizes voiceprint authentication.

According to various embodiments of the present disclosure, the instructions may cause the processor to determine the subject to perform an operation included in the first voice input by analyzing the first voice input, request operation-related information from the external electronic device when the subject to perform the operation is the electronic device, based on the result of the determination, and perform an operation corresponding to the first voice input based at least on the operation-related information received from the external electronic device.

According to various embodiments of the present disclosure, the instructions may cause the processor to determine the subject to perform an operation included in the first voice input by analyzing the first voice input and may transmit operation-related information to the external electronic device when the subject to perform the operation is the external electronic device based on the result of the determination.

An electronic device, according to one of various embodiments of the present disclosure, may include: one or more communication circuit 213, a microphone 215, a processor 201 operationally connected to the communication circuit 213 and the microphone 215, and a memory 202 operationally connected to the processor 201, such that the memory 202 may store instructions causing the processor 201 to, when executed, receive a first voice input through the microphone, perform first voiceprint authentication (voice biometrics) processing in order to determine whether the first voice input corresponds to a user registered in the electronic device, transmit a request message including first data related to the first voice input to one or more external electronic device connected to the electronic device through the communication circuit in order to cause the external electronic device to perform second voiceprint authentication processing for the first voice input when the first voice input does not correspond to the user registered in the electronic device, receive a response message including an authentication result based on the second voiceprint authentication processing from the external electronic device through the communication circuit, and perform an operation corresponding to the received first voice input or a second voice input, made through the microphone, based on the authentication result.

According to various embodiments of the present disclosure, the instructions may cause the processor to perform the first voiceprint authentication at least partially through the external server.

According to various embodiments of the present disclosure, the electronic device may be a smart speaker including one or more speaker 216.

Figure 4:
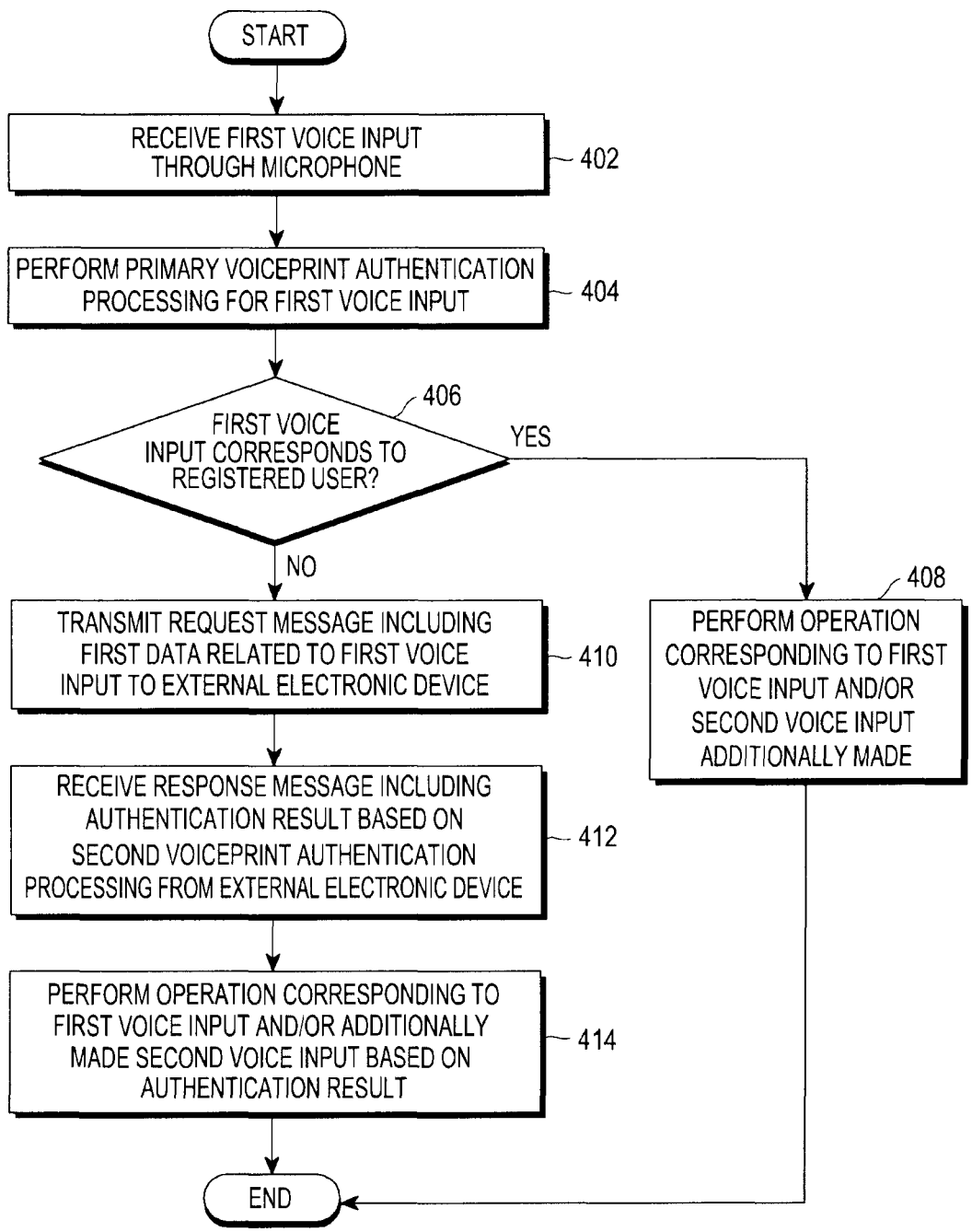
FIG. 4 is a flowchart illustrating a function execution procedure of the electronic device according to various embodiments of the present disclosure.

FIG. 4 is a flowchart illustrating a function execution procedure of the electronic device according to various embodiments of the present disclosure. Referring to FIG. 4, the electronic device 101 (for example, the smart speaker) may receive a first voice input through the microphone 215 in operation 402.

In operation 404, the electronic device may perform a first voiceprint authentication (voice biometrics) in order to determine whether the first voice input corresponds to a registered user of the electronic device.

When the electronic device determines that the first voice input corresponds to the registered user of the electronic device in operation 406, the electronic device may perform an operation corresponding to the first voice input and/or a second voice input which is additionally made in operation 408.

When the electronic device determines that the first voice input does not correspond to the registered user of the electronic device in operation 406, the electronic device may transmit a request message including first data related to the first voice input to one or more external electronic device connected to the electronic device through the communication circuit 213 in order to perform second voiceprint authentication processing for the first voice input through the external electronic device 111, 112, or 113 in operation 410.

In operation 412, the electronic device may receive a response message including the authentication result based on second voiceprint authentication processing from the external electronic device through the communication circuit.

In operation 414, the electronic device may perform an operation corresponding to the received first voice input and/or additional input made through the microphone on the basis of the authentication result. For example, the electronic device may receive second voice input from the user and perform an operation based on the second voice input.

A method of performing a function by an electronic device (for example, the processor 201), according to one of various embodiments of the present disclosure, may include an operation of receiving a first voice input through a microphone 215, an operation of performing first voiceprint authentication (voice biometrics) processing in order to determine whether the first voice input corresponds to a user registered in the electronic device, an operation of, when the first voice input does not correspond to a user registered in the electronic device, transmitting a request message including first data related to the first voice input to one or more external electronic device connected to the electronic device in order to cause the external electronic device to perform second voiceprint authentication processing for the first voice input, an operation of receiving a response message including an authentication result based on the second voiceprint authentication processing from the external electronic device through the communication circuit, an operation of receiving a second voice input through the microphone 215, and an operation of transmitting second data related to the second voice input to an external server at least partially for Automatic Speech Recognition (ASR) and/or Natural Language Understanding (NLU).

According to various embodiments of the present disclosure, the method may further include an operation of performing the first voiceprint authentication at least partially through the external server.

According to various embodiments of the present disclosure, the one or more external electronic device may be connected to the electronic device through short-range communication including one or more of Wireless Fidelity (Wi-Fi), Light Fidelity (Li-Fi), Bluetooth, Bluetooth Low Energy (BLE), ZigBee, Near Field Communication (NFC), or magnetic secure transmission.

According to various embodiments of the present disclosure, the method may further include an operation of receiving information for accessing the external server from the external electronic device and an operation of accessing the external server based on the received information for accessing the external server.

According to various embodiments of the present disclosure, the method may further include an operation of determining the subject to perform an operation included in the first voice input by analyzing the first voice input and an operation of determining whether voiceprint authentication is utilized based on the determined subject.

According to various embodiments of the present disclosure, the method may further include an operation of determining an operation included in the first voice input by analyzing the first voice input and an operation of determining whether the determined operation utilizes voiceprint authentication.

According to various embodiments of the present disclosure, the method may further include an operation of determining the subject to perform an operation included in the first voice input by analyzing the first voice input, an operation of making a request for operation-related information to the external electronic device when the subject to perform the operation is the electronic device, based on a result of the determination, and an operation of performing an operation corresponding to the first voice input based at least on the operation-related information received from the external electronic device.

According to various embodiments of the present disclosure, the method may further include an operation of determining the subject to perform an operation included in the first voice input by analyzing the first voice input and an operation of transmitting operation-related information to the external electronic device when the subject to perform the operation is the external electronic device based on the result of the determination.

The smart speaker 101, according to various embodiments of the present disclosure, may acquire an utterance from a user and identify an utterance voiceprint from the acquired utterance. The smart speaker 101 may compare the identified utterance voiceprint with one or more authentication voiceprint stored in the smart speaker 101 and identify similarities therebetween. The smart speaker 101 may determine whether authentication is to be performed on the basis of the identified similarity. When the similarity between the utterance voiceprint and the authentication voiceprint is larger than or equal to a threshold value in the authentication process, the smart speaker 101 may determine that the subject of the utterance is the subject of the authentication voiceprint. The voiceprint authentication may also be performed through a server.

Figure 5:
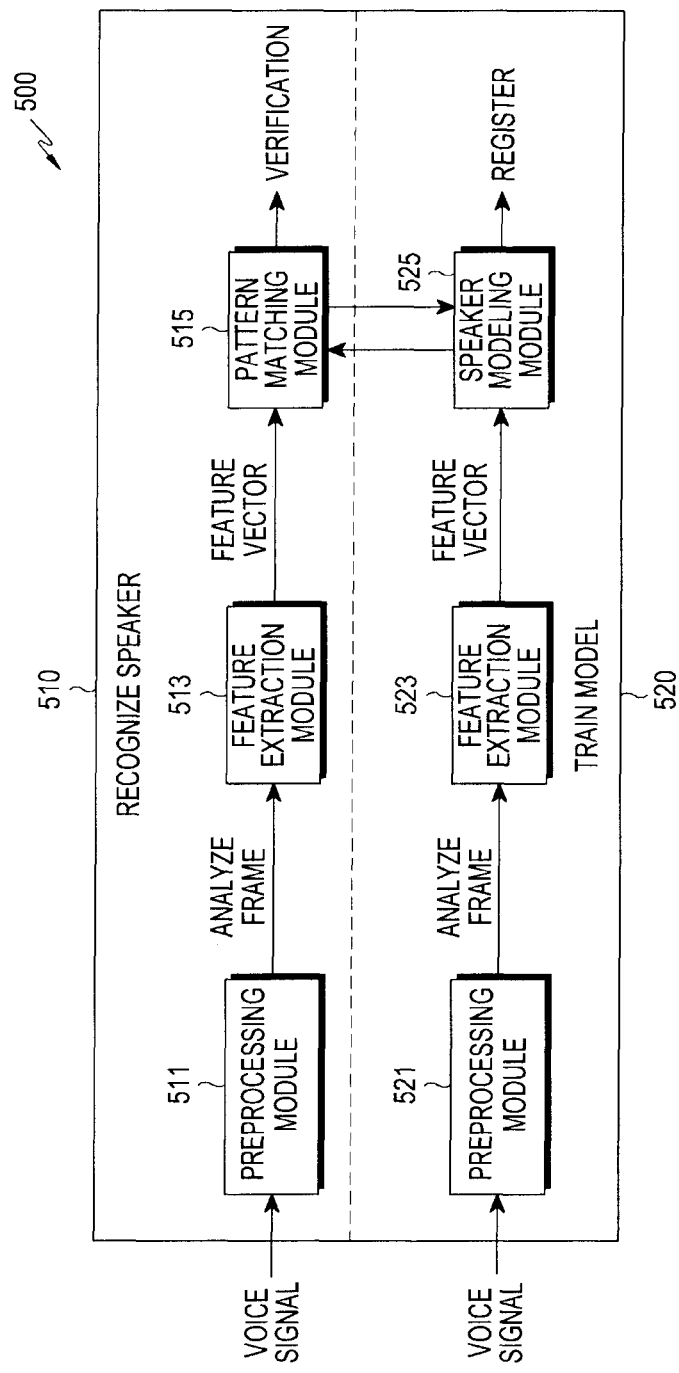
FIG. 5 illustrates a speaker recognition system according to various embodiments of the present disclosure.

FIG. 5 illustrates a speaker recognition system according to various embodiments of the present disclosure. Referring to FIG. 5, according to various embodiments, a speaker recognition system 500 may include a speaker recognition processing procedure 510 and a model-training processing procedure 520. The speaker recognition processing procedure 510 may use a preprocessing module 511, a feature extraction module 513, or a pattern-matching module 515. The model-training processing procedure 520 may use a preprocessing module 521, a feature extraction module 523, or a speaker-modeling module 525.

According to various embodiments, the speaker recognition processing procedure 510 may preprocess the input voice signal through the preprocessing module 511 and output an analysis frame. The feature extraction module 513 may extract features from the analysis frame output through the preprocessing module 511 and output a feature vector. The pattern-matching module 515 may verify the feature vector by comparing the feature vector with the result of the speaker-modeling module 525, and the verification result may be scored and output.

According to various embodiments, the model-training processing procedure 520 may preprocess the input voice signal through the preprocessing module 521 and output an analysis frame. The feature extraction module 523 may extract features from the analysis frame output through the preprocessing module 521 and output a feature vector. The speaker-modeling module 525 may model and register a speaker by the feature vector. According to various embodiments, the DSP (for example, the DSP 211 of FIG. 2) of the electronic device (for example, the smart speaker 101) may perform primary keyword recognition (for example, simple keyword recognition). When the user performs an utterance (for example, "Bixby Hong Gildong") for wakeup, the DSP may identify whether the input utterance is a predetermined keyword. In an identification method, the score (for example, $SCORE_{kw1}$) may be calculated by extracting features (X) from the input utterance and putting the features in the primary keyword recognition model as shown in Equation (1) below. When $SCORE_{kw1}$ exceeds $Th_{kw1}$ (Threshold$_{kw1}$), the next stage, which is the recognition step, may be performed.

$$SCORE_{kw1} = P(X|\lambda_{kw1})$$

Success if $SCORE_{kw1} > Th_{kw1}$ \hfill Equation (1)

The processor (for example, the processor 201 of FIG. 2) may transmit input voice data to the server. The server may more accurately analyze the corresponding voice data through the ASR, check the words, and identify whether the words correspond to a wakeup instruction.

Thereafter, the processor may finally determine whether to wake up the electronic device on the basis of the ASR result according to the analysis result.

The processor may finally determine whether to wake up the terminal by combining the keyword recognition result and the speaker recognition result. For example, when both the keyword recognition result and the speaker recognition result are positive, the processor may wake up the electronic device. On the other hand, when one or more of the keyword recognition result and the speaker recognition result is not positive, the electronic device may not be woken up.

The processor may perform secondary keyword recognition (for example, complex keyword recognition). Complex keyword recognition may use relatively larger resources for recognition and determination (for example, memories, calculations, or measurement of similarity) than primary keyword recognition (for example, simple keyword recognition), and it may have a higher recognition rate than primary keyword recognition.

The keyword recognition performed by the processor may be implemented as a recognition algorithm for extracting a target word on the basis of Viterbi decoding, and the processor may have a relatively smaller misrecognition rate for keyword recognition than the DSP.

The processor may calculate the score (for example, $SCORE_{kw2}$) through a feature value (X) newly extracted from the secondary keyword model (for example, the secondary keyword model database 308 of FIG. 3) or extracted by the DSP as shown in Equation (2) below. When $SCORE_{kw2}$ exceeds $Threshold_{kw2}$, the next stage, which is the recognition step, may be performed.

$$SCORE_{kw2} = P(X|\lambda_{kw2})$$

Success if $SCORE_{kw2} > Th_{kw2}$ \hfill Equation (2)

$Threshold_{kw1}$ may be different from $Threshold_{kw2}$. For example, primary keyword recognition and secondary keyword recognition may use the same keyword recognition model, which differs in $Threshold_{kw1}$, replaced with $Threshold_{kw2}$. In this case, through different calculations of the decoding algorithm, the two values may be different. According to another embodiment, the calculations may be the same and the reference values may be different. Alternatively, primary keyword recognition and secondary keyword recognition may use separate keyword recognition models. In this case, the score calculation method may be different depending on the model. $Th_{kw1}$ ($Threshold_{kw1}$) and $Th_{kw2}$ ($Threshold_{kw2}$) may have different values without any relationship therebetween.

The processor may perform speaker recognition together with keyword recognition.

In the model-training processing procedure illustrated in FIG. 5, when the preprocessing module 521 receives a voice signal, voice data may be preprocessed (for example, noise canceling) and a feature value may be extracted from the corresponding voice data. In order to generate an accurate model, an operation of inputting the voice signal may be performed several times. Through the extracted feature value, a speaker recognition model may be generated.

When a voice signal is received, the preprocessing module 521 may preprocess voice data (for example, noise canceling), the feature extraction module 523 may extract a feature value from the corresponding voice data, and the speaker-modeling module 525 may compare the feature value with the made speaker recognition model to identify how similar they are, output a score, and determine whether the speakers are the same speaker on the basis of the result.

Speaker recognition by the processor may be implemented as a combination of one or more of, for example, a deep-neural-network-based recognition algorithm, a multi-neural-network-based recognition algorithm, and a UBM-GMM-based recognition algorithm. The multi-neural-network-based recognition algorithm may determine authentication success/failure in consideration of multiple factors such as a keyword recognition result, a Signal-to-Noise Ratio (SNR), and background noise removal through a neural network in which a hidden layer exists. The UBM-GMM (Universal Background Model-Gaussian Mixture Model) algorithm may determine authentication success/failure by comparing a UBM value and a speaker model value in units of frames through a binary determination method of comparing a GMM-based background model score and a speaker model score.

The speaker recognition model may be expressed as a statistical model such as a Hidden Markov Model (HMM), a neural network or the like. When a recognition algorithm such as Dynamic Time Warping (DTW) or Vector Quantization (VQ) is used, the speaker recognition model may be expressed by a feature vector column of a voice signal. When a transform method such as dimensionality reduction or linear transformation is applied to the recognition process, the parameter used for the transformation may be model information. In addition to the listed speaker recognition models, there may be various recognition models, which include information representing a voice which may be commonly recognized. Further, the speaker recognition models may include attribute information of the input voice. For example, the attribute information may include one or more of the length and the size of the input voice, the number of phonemes, and the length of the phonemes.

$$SCORE_{SV} = \log\left(\frac{P(X|\lambda_S)}{P(X|\lambda_{UBM})}\right) \qquad \text{Equation (3)}$$

$$\begin{cases} \text{Fail} & \text{if } SCORE_{SV} < Th1_{SV} \\ \text{Server decision} & \text{if } Th1_{SV} \leq SCORE_{SV} < Th2_{SV} \\ \text{Success} & \text{if } Th2_{SV} \leq SCORE_{SV} \end{cases}$$

Figure 6:
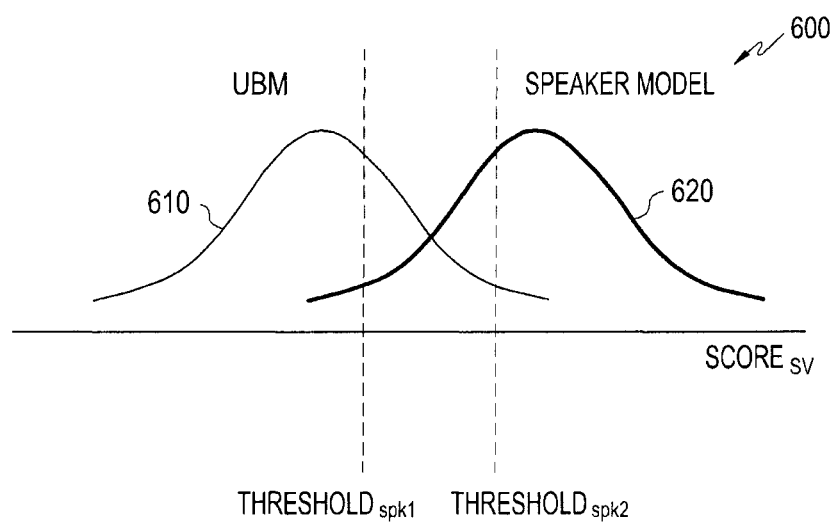
FIG. 6 is a graph illustrating a speaker recognition model according to various embodiments of the present disclosure.

FIG. 6 is a graph illustrating a speaker recognition model according to various embodiments of the present disclosure. Referring to the graph 600 illustrated in FIG. 6 using a UM-GMM-based recognition algorithm, a USB graph 610 and a speaker model graph 620 may overlap each other. For speaker recognition, two reference points may be used. The more similar the input utterance is to the speaker recognition model, the larger the speaker model value becomes. The more different the input utterance is from the speaker recognition model, the larger the UBM model value becomes. In an interval in which there is little difference between the two models, it may be difficult to accurately determine whether the input utterance is completely the same as the speaker recognition model. For example, when $SCORE_{SV}$ (a value corresponding to the horizontal axis in FIG. 6) is smaller than $Threshold_{spk1}$, it may be determined that the speakers are different. When $SCORE_{SV}$ is larger than $Threshold_{spk2}$, it may be determined that the speakers are the same. When $SCORE_{SV}$ is between $Threshold_{spk1}$ and $Threshold_{spk2}$, it may be difficult to determine whether they are the same speaker. In this case, the analysis result of voice data transmitted to the server may be cached and then used for finally determining the speaker.

According to various embodiments, in the model-training process, since models are different according to respective modules, a plurality of models may be trained for one utterance. For example, a primary keyword model, a secondary keyword model, and a speaker recognition model may be trained for one utterance. For example, when the user desires to register "Bixby Hong Gildong" as the utterance for wakeup, the user may register the same through a UI provided by an application. At this time, the user may speak the same utterance several times.

When the user speaks "Bixby Hong Gildong", the corresponding utterance is input through the microphone (for example, the microphone 215 of FIG. 2), the DSP may train the primary keyword model, and the processor may train the secondary keyword model and the speaker recognition model. Respective models may have different algorithms, or may have the same algorithm but different characteristic values extracted for calculations.

Further, the electronic device may transfer the input voice data to the server for the recognition model in the server. The ASR of the server may convert the voice data into text and transmit the result to the device, and the result may be stored in the electronic device. The electronic device may compare the stored result with a text value transmitted from the server and identify whether the keywords match.

Figure 7:
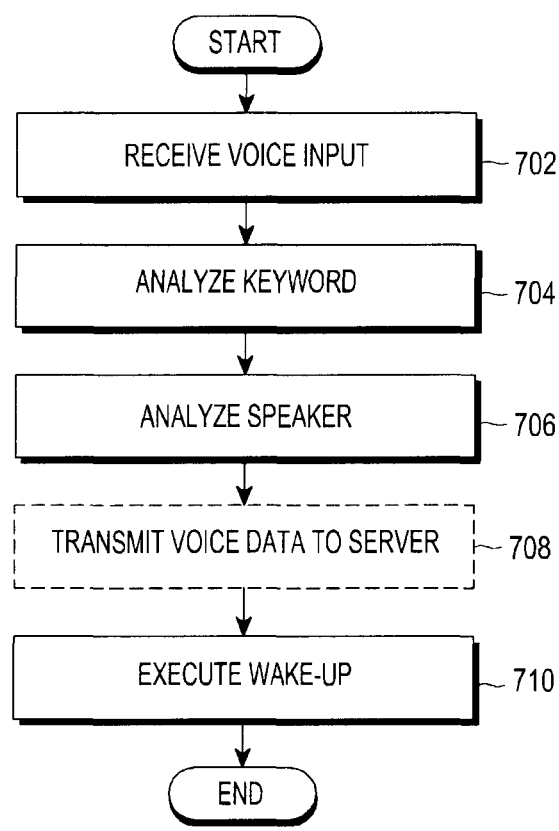
FIG. 7 is a flowchart illustrating the function of the electronic device through speaker recognition according to various embodiments of the present disclosure.

FIG. 7 is a flowchart illustrating the function of the electronic device through speaker recognition according to various embodiments of the present disclosure.

Referring to FIG. 7, the electronic device (for example, the smart speaker 101 of FIG. 2) may receive a voice (or utterance) for waking up the electronic device through the microphone (for example, the microphone 215 of FIG. 2) in operation 702. The electronic device may identify whether the corresponding utterance includes a particular word or phrase through keyword analysis in operation 704. For example, the operation may be performed by the DSP (for example, the DSP 211 of FIG. 2) and the processor (for example, the processor 201 of FIG. 2) of the electronic device. In operation 706, the electronic device may identify whether the corresponding speaker is a speaker who previously generated a model through speaker analysis. The speaker analysis operation may be performed by the processor. According to an embodiment, the processor may simultaneously perform keyword analysis and speaker analysis.

In operation 708, the electronic device may transmit the input voice data to the server for more accurate analysis. The server may perform keyword recognition and speaker recognition by analyzing the voice data received from the electronic device and may transmit the result thereof to the electronic device. According to various embodiments, operation 708 may be omitted when the keyword recognition result or the speaker recognition result is larger than a threshold value (for example, $Threshold_{kw2}$ or Threshold- $_{spk2}$). In operation 710, the electronic device may perform wakeup according to the voice data analysis result performed by the electronic device or the server.

Figure 8:
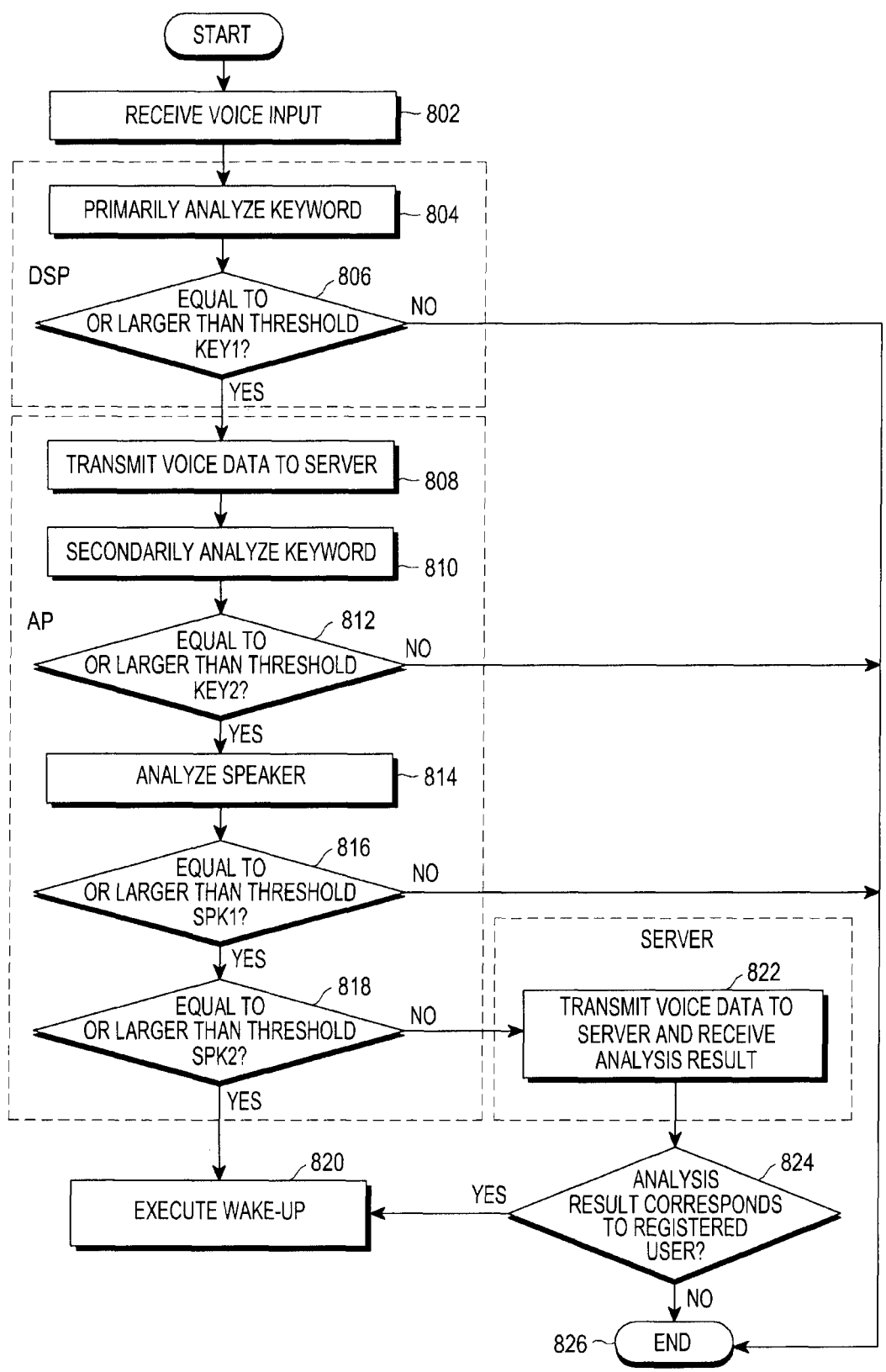
FIG. 8 is a flowchart illustrating a detailed function of the electronic device through speaker recognition according to various embodiments of the present disclosure.

FIG. 8 is a flowchart illustrating a detailed function of the electronic device through speaker recognition according to various embodiments of the present disclosure. Referring to FIG. 8, the electronic device (for example, the smart speaker 101 of FIG. 2) may receive voice data corresponding to a user's utterance (for example, Bixby Hong Gildong) through the microphone (for example, the microphone 215 of FIG. 2) in operation 802. In operation 804, the electronic device may perform primary keyword analysis of identifying whether voice data input through the DSP (for example, the DSP 211 of FIG. 2) matches a previously registered keyword. The electronic device may express whether they match each other in the identification operation through a score. When the score is larger than or equal to a predetermined value (for example, Threshold key1) in operation 806, the electronic device may proceed to the next stage of recognition. Otherwise, the electronic device may end the recognition operation.

In operation 808, the processor (for example, the processor 201 of FIG. 2) may transmit input voice data to the server. The server may convert the input voice data into text through ASR analysis and check whether the speaker is a registered person through a speaker recognition module.

In operation 810, the processor may perform keyword recognition on the input content. The keyword analysis by the processor may be secondary keyword analysis, which is keyword recognition performed through more complex calculations than primary keyword analysis performed by the DSP. According to various embodiments, the processor may perform keyword analysis using a model different from the model used for the keyword analysis performed by the DSP. According to an embodiment, the processor may perform secondary keyword analysis simultaneously with the transmission of voice data to the server.

When the keyword analysis is positive (for example, when the analysis score is larger than or equal to a predetermined value (for example, Threshold key2) in operation 812, the processor may perform speaker recognition of identifying whether the user corresponding to the utterance is a previously registered user in operation 814. In the case of speaker recognition, there are two reference values, in operations 816 and 818, the recognition operation may end when the score is smaller than a minimum value (for example, Threshold spk1), and the speaker may be determined to be a registered user when the score is larger than a maximum value (for example, Threshold spk2). When it is determined that the speaker of the received voice input is a registered user, the electronic device may perform a wakeup operation in operation 820. According to an embodiment, when the score is between the minimum value and the maximum value, the electronic device may perform an operation for transmitting voice data to the server and receiving the analysis result in operation 822. In operation 824, the electronic device may determine whether the speaker is the registered user on the basis of the analysis result. When the analysis result of the voice data received from the server corresponds to a registered user, the electronic device may perform the wakeup operation in operation 820. When the analysis result of the voice data received from the server does not correspond to a registered user in operation 824, the electronic device may end the operation in operation 826.

Figure 9:
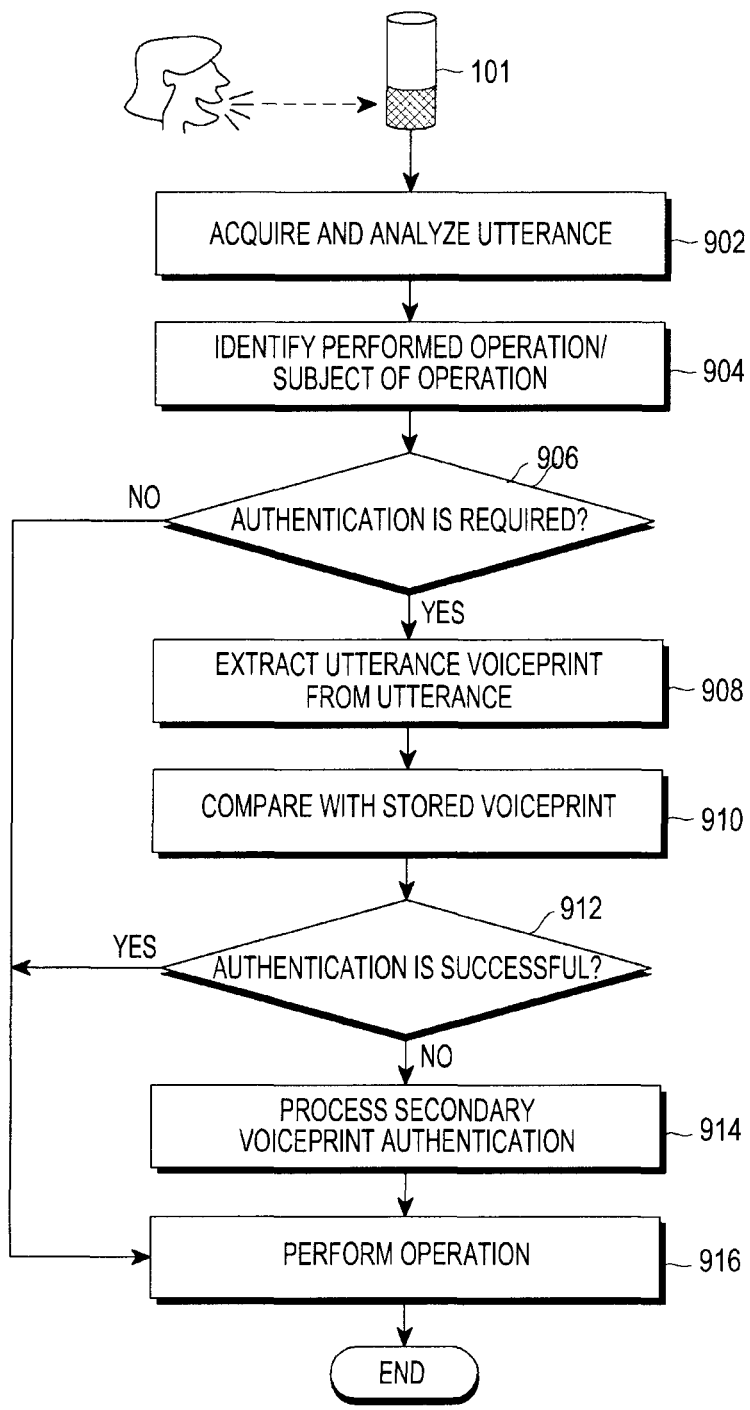
FIG. 9 is a flowchart illustrating a function execution procedure of the electronic device according to various embodiments of the present disclosure.

FIG. 9 is a flowchart illustrating a function execution procedure of the electronic device according to various embodiments of the present disclosure. Referring to FIG. 9, the electronic device 101 (for example, the smart speaker 101 of FIG. 2) may acquire an utterance from the user through the microphone (for example, the microphone 215 of FIG. 2) and analyze the acquired utterance through functions of ASR (STI) and NLU in operation 902.

In operation 904, the electronic device may identify an operation (for example, an operation to be performed) and a subject of the operation by analyzing the meaning of the utterance. According to various embodiments, the meaning of the user's utterance may include one or more of an instruction to be performed, an input parameter of the user, a result output method, a subject to execute an instruction, and conditions under which the instruction is to be executed. The conditions may include whether or not user authentication is utilized.

When the electronic device analyzes the meaning of the utterance and the instruction included in the user's utterance is an instruction utilizing user authentication (for example, an instruction for reproducing a playlist of a particular user or purchasing a product) in operation 906, the electronic device may perform an operation utilized for user authentication. In operation 908, the electronic device, according to various embodiments of the present disclosure, may extract an utterance voiceprint from the user's utterance and identify the utterance voiceprint for the user authentication. The voiceprint extraction may be performed by the electronic device or through a speaker recognition module of an external server.

In operation 910, the electronic device may perform a user authentication procedure by comparing the utterance voiceprint with an authentication voiceprint stored in the smart speaker 101. When the matching rate between the utterance voiceprint and the authentication voiceprint is found to be larger than or equal to a predetermined value through the user authentication procedure in operation 912, the electronic device may determine that the result of the user authentication procedure is "authenticated". When the matching rate between the utterance voiceprint and the authentication voiceprint is found to be smaller than (or equal to) a predetermined value through the user authentication procedure in operation 912, the electronic device may determine that the result of the user authentication procedure is "non-authenticated" When the matching rate between the utterance voiceprint and the authentication voiceprint does not reach the value for determination as "authenticated" but the difference between the matching index and the value is equal to or smaller than a predetermined value in the user authentication procedure, the electronic device may determine that the result of the user authentication result is "additional verification required".

When it is determined that the result of the user authentication procedure is "authenticated", the electronic device may execute the instruction included in the user's utterance.

When it is determined that the result of the user authentication procedure is "non-authenticated" or "additional verification required", the electronic device may perform a secondary utterance voiceprint verification operation in operation 914 and then perform the corresponding operation in operation 916. According to various embodiments, the secondary utterance voiceprint verification may be performed when primary verification fails. Even though the speaker is not the user of the electronic device, various services described below may be provided by performing the secondary voiceprint verification through another electronic device connected to the electronic device. According to various embodiments of the present disclosure, the electronic device may perform the secondary utterance voiceprint verification according to the user authentication procedure result of the primary utterance voiceprint verification. When the secondary utterance voiceprint verification fails, the electronic device may output the result corresponding to failure or may not perform an operation instructed through the utterance voiceprint.

Figure 10:
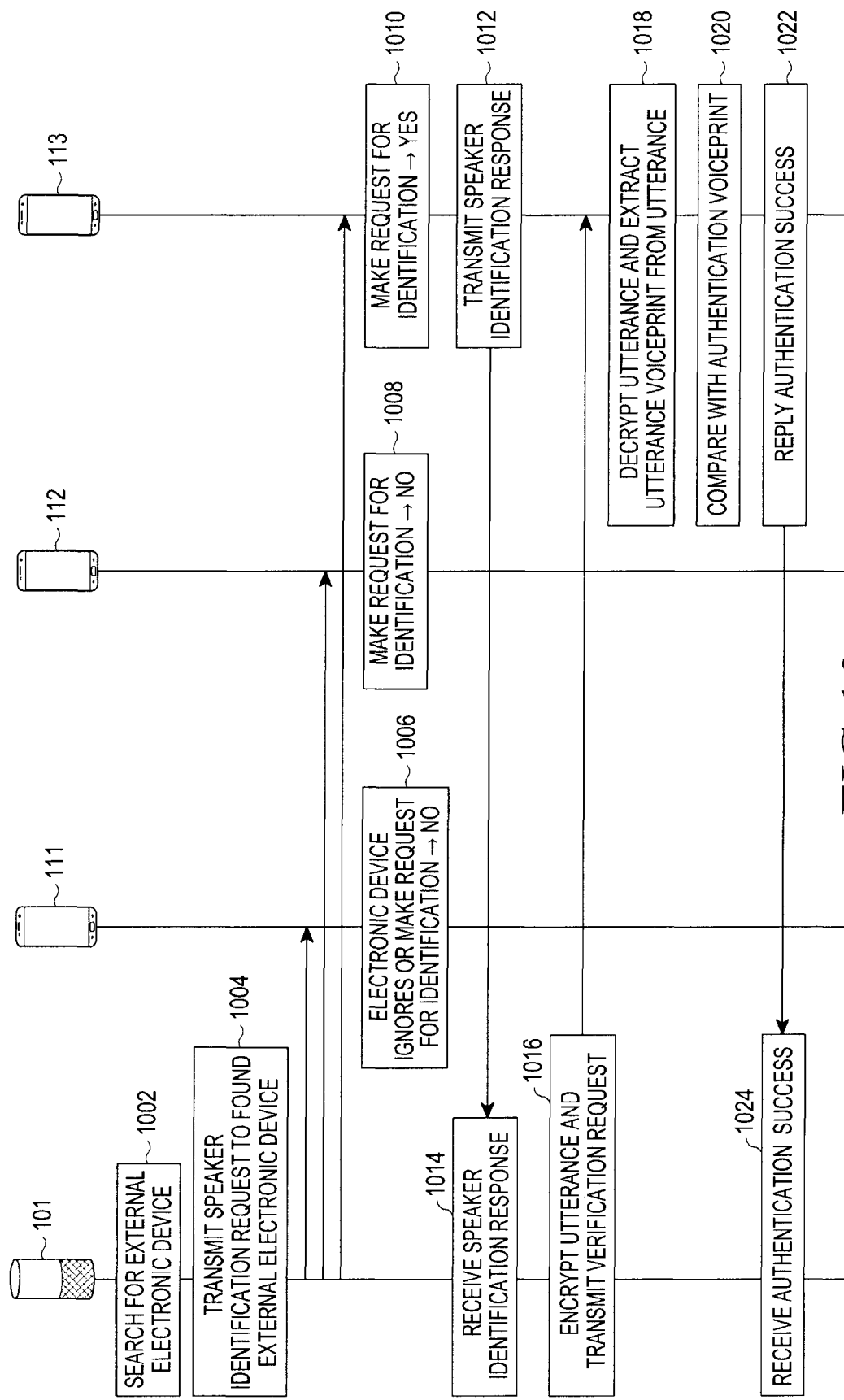
FIG. 10 is a signal flowchart illustrating a secondary voiceprint authentication execution procedure between devices according to various embodiments of the present disclosure.

FIG. 10 is a signal flowchart illustrating a secondary voiceprint authentication execution procedure between devices according to various embodiments of the present disclosure. Referring to FIG. 10, when the result of the user authentication procedure is "non-authenticated" or "additional verification required" as described in FIG. 9, the electronic device 101 (for example, the smart speaker) may search for one or more external electronic device (for example, the external electronic devices 111, 112, and 113) in order to perform secondary utterance voiceprint verification in the external electronic device in operation 1002. Searching for the external electronic device may include one or more of a method by which the external electronic device broadcasts a message for making a request for identifying presence to receive a response, a method of identifying information of the external electronic device stored in the electronic device 101, and a method of making a request for information of the external electronic device to the external device (IoT server/hub) functionally connected to the electronic device 101. The electronic device 101 may acquire a list of external electronic devices in response to searching for the external electronic devices.

In operation 1004, the electronic device 101 may transmit a speaker identification request message to electronic devices included in the list of external electronic devices. The message may be directly or indirectly transferred to the electronic device. The speaker identification request message may include at least part of the utterance. For example, the message may include the content of the instruction included in the utterance.

When the result of the user authentication procedure is "non-authenticated", the electronic device 101 may not transmit the message to other electronic devices owned by the user of the electronic device 101. When the result of the user authentication procedure is "additional verification required", the electronic device 101 may transmit the message to the acquired external electronic devices. The electronic device 101 may transmit the message to personal electronic devices which are not owned by the user of the electronic device 101, among the acquired external electronic devices.

The electronic device 101 may transmit the message to electronic devices existing in an area within a predetermined range from the electronic device 101 among the acquired external electronic devices. The determination of the area within the predetermined range may be made with reference to various methods using a Received Signal Strength Indicator (RSSI), and indoor positioning or transmission power may be controlled.

The external electronic device 111, 112, or 113 receiving the speaker identification request message from the electronic device 101 may display the speaker identification request message to the user and identify user input corresponding to the identification request in operations 1006, 1008, and 1010.

For example, the content of the user's utterance may be displayed in text or output through a voice, and a query about the subject of the corresponding utterance may be added. In another example, the content of the user's utterance and a description of an operation corresponding thereto may be displayed in text or output through a voice, and a query about the subject of the corresponding utterance and a query about whether to modify the corresponding utterance may be added. Further, as an example of a response to the query, there may be a user response corresponding to one or more of "Yes" and "No".

The speaker identification request message may be provided to the user in one or more of a visual type, such as a popup window, and an auditory type, such as a voice notification. The user input corresponding to the identification request may be one of a touch input, voice input, gesture input, and physical device control input.

After identifying the user response corresponding to "Yes" as the response to the speaker identification request in operation 1010, the external electronic device 113 may transmit a reply including at least the user response to the electronic device 101 in operation 1012. The electronic device may transmit the reply including a public key of the electronic device 113. The electronic device 113 may transmit the reply including recognition information (identification information: name, nickname, device name, account ID, or part of a phone number) of the user of the electronic device 113.

In operation 1014, the electronic device 101 may receive the reply including the user response and the public key from the external electronic device (for example, the electronic device 113). In response to the reception of the reply, the electronic device 101 may determine whether the reply is valid. Information on whether the reply is valid may include a determination of whether or not the number of reply messages is one. For example, a nearby user may transmit "Yes" in response to the speaker identification request, either by mistake or with malicious intent, even though the user did not actually speak. In this case, the electronic device 101 may receive two or more reply messages. The electronic device 101 receiving the two or more reply messages may transmit a speaker re-identification request message to electronic devices transmitting the reply messages. The speaker re-identification request message may include the speaker identification request message and recognition information of the user of the electronic device receiving the two or more reply messages. The two or more electronic devices receiving the speaker re-identification request message may identify a user response to the speaker re-identification request message according to the above-described process and reply to the electronic device 101. Finally, the electronic device 101 may determine that the external electronic device 113 transmitting the response is the electronic device 113 of the speaker.

In operation 1016, the electronic device 101 may encrypt the utterance. The electronic device 101 according to an embodiment of the present disclosure may encrypt the utterance through an asymmetric cryptosystem using a public key received from the external electronic device 113. The electronic device 101, according to another embodiment of the present disclosure, may encrypt the utterance through a symmetric cryptosystem using a secret key shared with the external electronic device 113. The electronic device 101 may transmit a verification request message including at least the encrypted utterance to the external electronic device 113. The verification request message may include the content of an instruction included in the utterance.

In operation 1018, the external electronic device 113 receiving the verification request message including the encrypted utterance from the electronic device 101 may decrypt the encrypted utterance so as to identify the utterance. The external electronic device 113, according to an embodiment of the present disclosure, may decrypt the encrypted utterance through an asymmetric cryptosystem using a private key of the external electronic device 113. The external electronic device 113, according to another embodiment of the present disclosure, may decrypt the encrypted utterance through a symmetric cryptosystem using a secret key shared with the electronic device 101.

The external electronic device 113 may extract an utterance voiceprint from the decrypted utterance.

In operation 1020, the external electronic device 113 may compare the extracted utterance voiceprint with one or more authentication voiceprint stored in the external electronic device 113 and identify similarities therebetween. The external electronic device 113 may determine whether authentication is successful on the basis of the identified similarity. When the similarity between the utterance voiceprint and the authentication voiceprint is found to be larger than or equal to a threshold value during the authentication process, the external electronic device 113 may determine that the subject of the utterance is the subject of the authentication voiceprint. When the similarity between the utterance voiceprint and the authentication voiceprint is found to be equal to or smaller than a threshold value during the authentication process, the external electronic device 113 may determine that the authentication for the subject of the utterance fails.

In operation 1022, the external electronic device 113 may transmit an authentication result reply message including at least the authentication result to the electronic device 101. When the authentication result included in the authentication result reply message corresponds to authentication failure, the electronic device 101 receiving the authentication result reply message may inform the user of authentication failure and may end the total process or make a request for additional user action. When the authentication result included in the authentication result reply message corresponds to authentication success in operation 1024, the electronic device 101 may continuously perform the operation utilized for executing an instruction included in the user's utterance.

The electronic device 101, according to various embodiments of the present disclosure, may perform a function included in the user's utterance according to the result of the secondary utterance voiceprint verification. The electronic device 101 may perform the function included in the user's utterance or may cause the external electronic device (for example, the external electronic device 113) to perform the function with reference to information on the subject in order to perform the function included in the user's utterance identified in FIG. 9.

Figure 11:
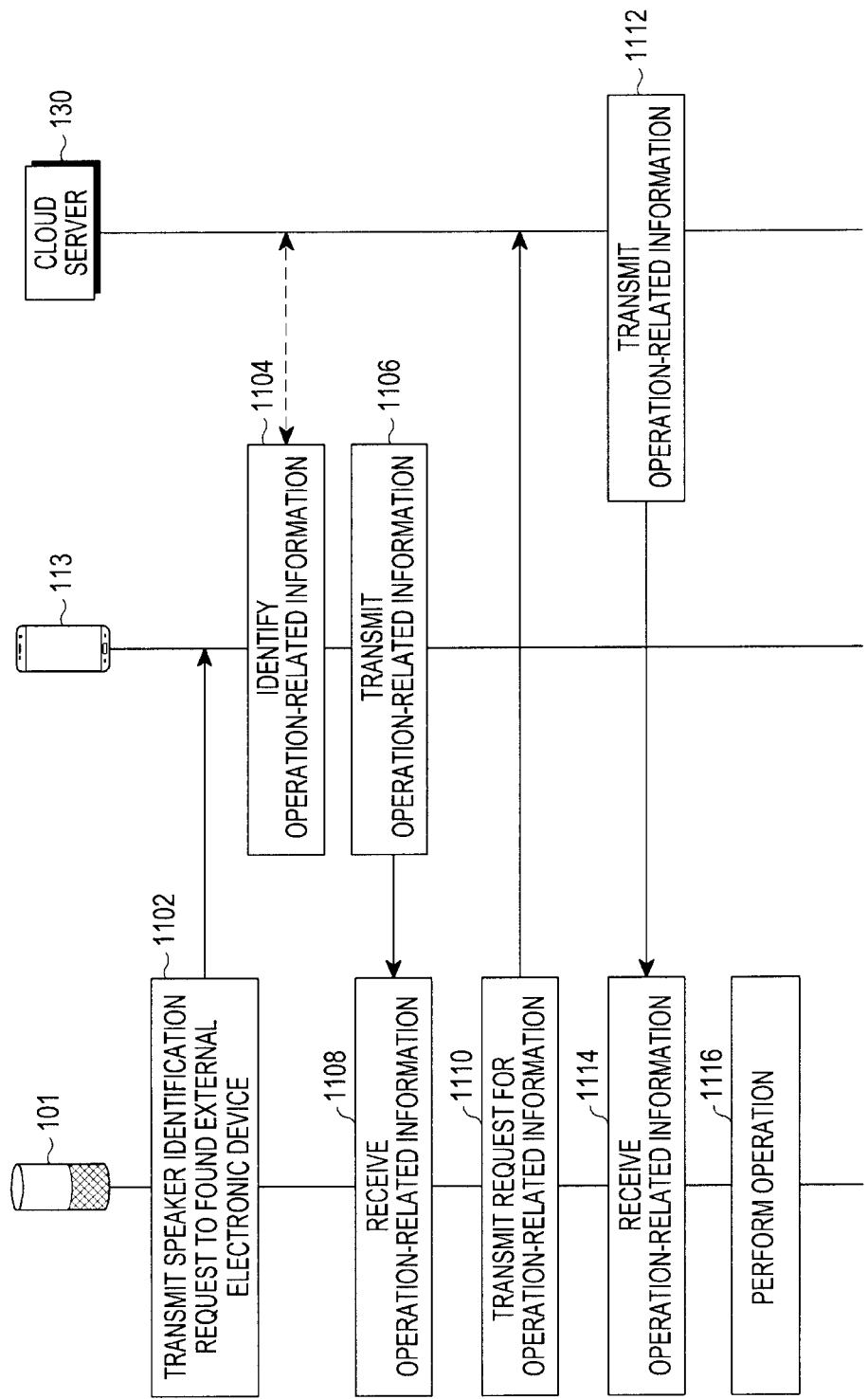
FIG. 11 is a signal flowchart illustrating an operation procedure between devices according to various embodiments of the present disclosure.

FIG. 11 is a signal flowchart illustrating an operation procedure between devices according to various embodiments of the present disclosure. According to various embodiments, FIG. 11 illustrates an embodiment corresponding to the case in which the electronic device (for example, the electronic device 101) is the subject that performs the operation. For example, when user C instructs playback of its own music playlist through the electronic device (for example, the first electronic device 101) of user A, the smart speaker of user A may perform secondary voiceprint authentication through the electronic device (for example, the external electronic device 113) of user C, as illustrated in FIG. 10. When the secondary voiceprint authentication is successful, the first electronic device 101 may receive information related to the operation (for example, information on the music playlist) from the electronic device (the external electronic device 113) of user C and reproduce the music playlist of user C through the first electronic device 101, as illustrated in FIG. 11.

Referring to FIG. 11, the electronic device 101 may transmit an operation-related information request message, which makes a request for information utilized for performing the function included in the user's utterance, to the external electronic device 113 in operation 1102. The operation-related information request message may include the type of information utilized for performing the operation. For example, the type of the information utilized for performing the operation may include one or more piece of user data utilized for performing the operation (for example, a music playlist) and user data storage space information (for example, music site access information) from which user data is acquired.

The external electronic device 113 receiving the operation-related information message may identify the operation-related information in operation 1104 and transmit the identified operation-related information to the electronic device 101 in operation 1106. According to various embodiments, the external electronic device 113 may request the operation-related information from the cloud server 130 and receive the same. The external electronic device 113 may receive the operation-related information from the cloud server 130 and transmit the same to the electronic device 101.

According to various embodiments, when the operation-related information request message includes user data utilized for performing the operation, the external electronic device 113 may directly transmit the user data to the electronic device 101. Alternatively, the external electronic device 113 may upload the user data to an external storage space (for example, the cloud server 130), as indicated by the dotted lines in FIG. 11, and transmit access information (URI and access right information) thereof to the electronic device 101.

When the operation-related information request message includes user data storage space information utilized for performing the operation, the external electronic device 113 may inquire about the user data storage space (for example, the cloud server 130) storing the user data of the user data access information as indicated by dotted lines in FIG. 11 and may transmit the user data access information (URI and access right information) stored in the user data storage space to the electronic device 101. In operation 1108, the electronic device 101 may receive operation-related information (for example, user data access information) from the external electronic device 113.

When the operation-related information corresponding to the operation-related information request message includes user data access information, the electronic device 101 may request user data from the cloud server 130 (for example, the user data storage space) with reference to the user data access information in operation 1110. The cloud server 130 may transmit the user data to the electronic device 101 with reference to access right information and user data URI information included in the user data access information in response to the user data request from the electronic device 101 in operation 1112.

In operation 1116, the electronic device 101 may perform the function included in the user's utterance with reference to the user data directly/indirectly acquired from the external electronic device 113.

Figure 12:
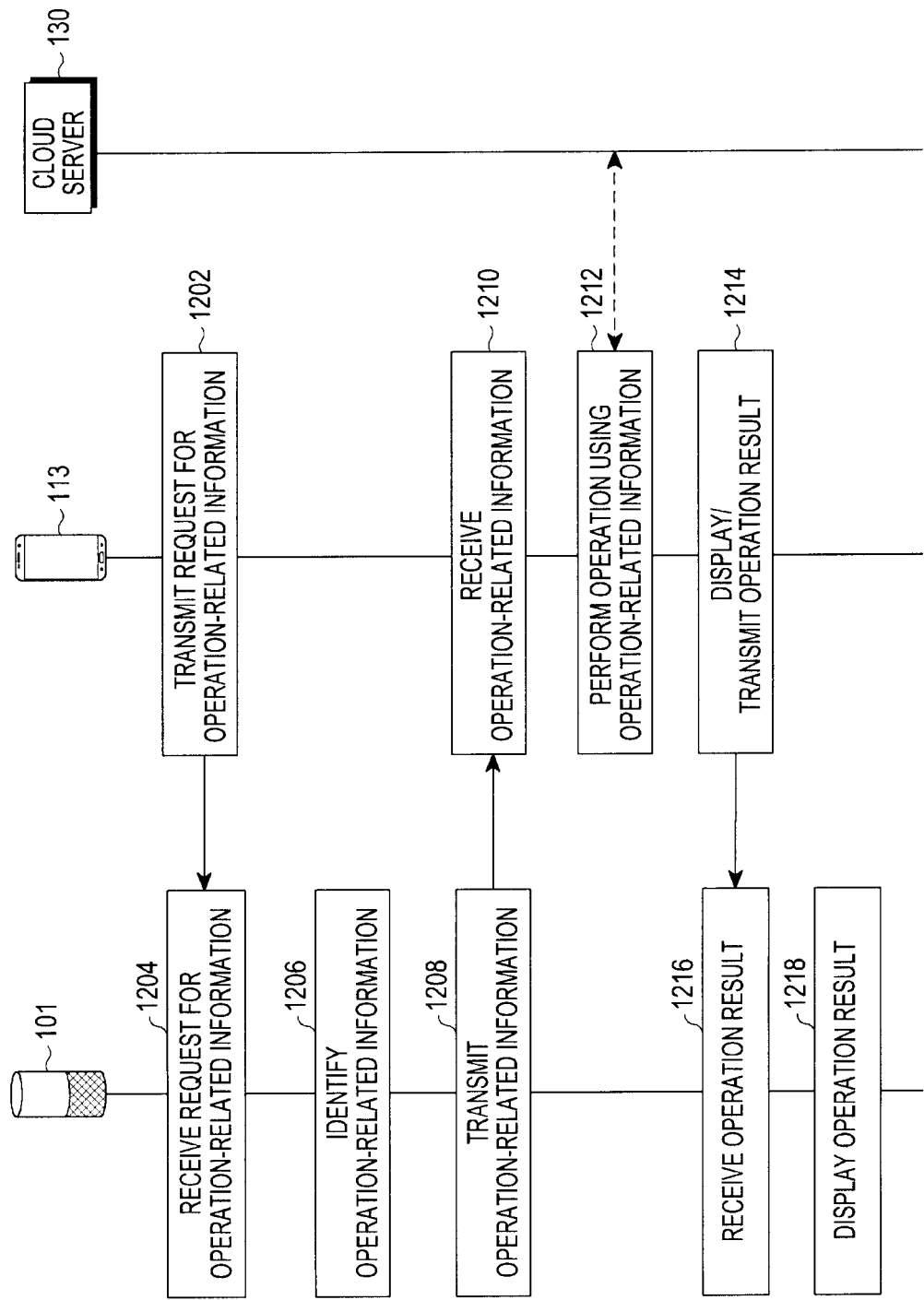
FIG. 12 is a signal flowchart illustrating an operation procedure between devices according to various embodiments of the present disclosure.

FIG. 12 is a signal flowchart illustrating an operation procedure between devices according to various embodiments of the present disclosure. According to various embodiments, FIG. 12 illustrates an embodiment corresponding to the case in which the subject to perform the operation is the external electronic device 113. For example, when user C instructs the electronic device 101 (for example, the smart speaker) of user A to purchase a product with his/her own account, the electronic device 101 of user A may perform secondary voiceprint authentication through the electronic device (for example, the external electronic device 113) of user C, as illustrated in FIG. 10. When the secondary voiceprint authentication is successful, the electronic device 101 may transmit operation-related information (for example, information on product purchase) to the electronic device (for example, the external electronic device 113) of user C and purchase the product requested by user C through the electronic device (the third electronic device 113) of user C, as illustrated in FIG. 12.

Referring to FIG. 12, the external electronic device 113 may transmit an operation-related information request which makes a request for information utilized for performing the operation included in the user's utterance to the electronic device 101 (for example, the smart speaker) in operation 1202. The external electronic device 113 may analyze the acquired user's utterance through an ASR (STT) or NLU function. The external electronic device 113 may request at least part of the information utilized for performing the analyzed utterance from the electronic device 101.

The electronic device 101 may receive the operation-related information request from the external electronic device 113 in operation 1204, identify the operation-related information in operation 1206, and transmit the operation-related information (for example, information on product purchase) to the external electronic device 113 in operation 1208.

The external electronic device 113 may receive the operation-related information in operation 1210 and perform the operation included in the user's utterance with reference to the user's utterance in operation 1212. For example, when receiving information on product purchase from the electronic device 101 as the operation-related information, the external electronic device 113 may purchase the product through the cloud server 130.

In operation 1214, the external electronic device 113 may inform the user of the result of the operation through the external electronic device 113 or may transmit the result of the operation to the electronic device 101, and thus the electronic device 101 may inform the user of the result of the operation.

The electronic device 101 may receive the operation result from the external electronic device 113 in operation 1216 and display the operation result in operation 1218. For example, the operation of displaying the operation result may include one or more of visual and auditory effects.

Figure 13:
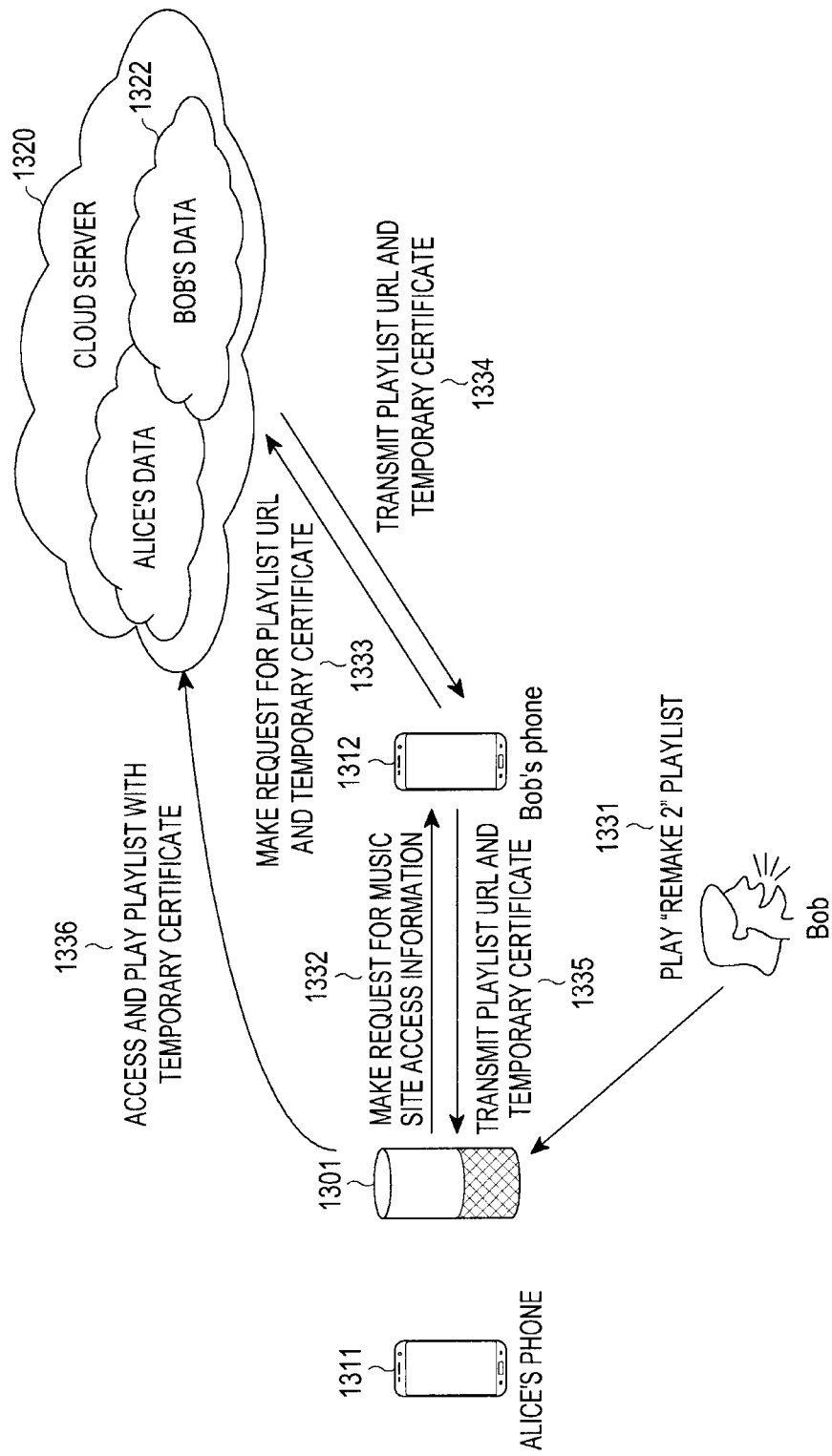
FIG. 13 is a system illustrating the operation between devices according to various embodiments of the present disclosure.

FIG. 13 is a system illustrating the operation between devices according to various embodiments of the present disclosure. Referring to FIG. 13, when a speaker (for example, Bob) says "play playlist remake 2" through a smart speaker 1301 (for example, the electronic device 101 of FIG. 1) in operation 1331, voiceprint authentication may be performed by a smart phone 1312 of the speaker rather than the smart speaker 1301 or a smart phone 1311 of a user of the smart speaker 1301 (for example, Alice) according to various embodiments, and a request for music site access information may be sent to the smart phone 1312 of the speaker in operation 1332.

In operation 1333, the smart phone 1312 of the speaker may request a playlist URL and a temporary certificate from a cloud server 1320 (for example, the cloud server 130 of FIG. 1). In operation 1334, the cloud server 1320 may identify pre-stored speaker's data 1322 and transmit the playlist URL and the temporary certificate to the smart phone 1312 of the speaker. In operation 1335, the smart phone 1312 may transmit the playlist URL and the temporary certificate to the smart speaker 1301.

According to various embodiments, the smart speaker 1301 may access the cloud server 1320 through the playlist URL and the temporary certificate received from the smart phone 1312 of the speaker and make a request for reproducing the playlist in operation 1336.

Figure 14:
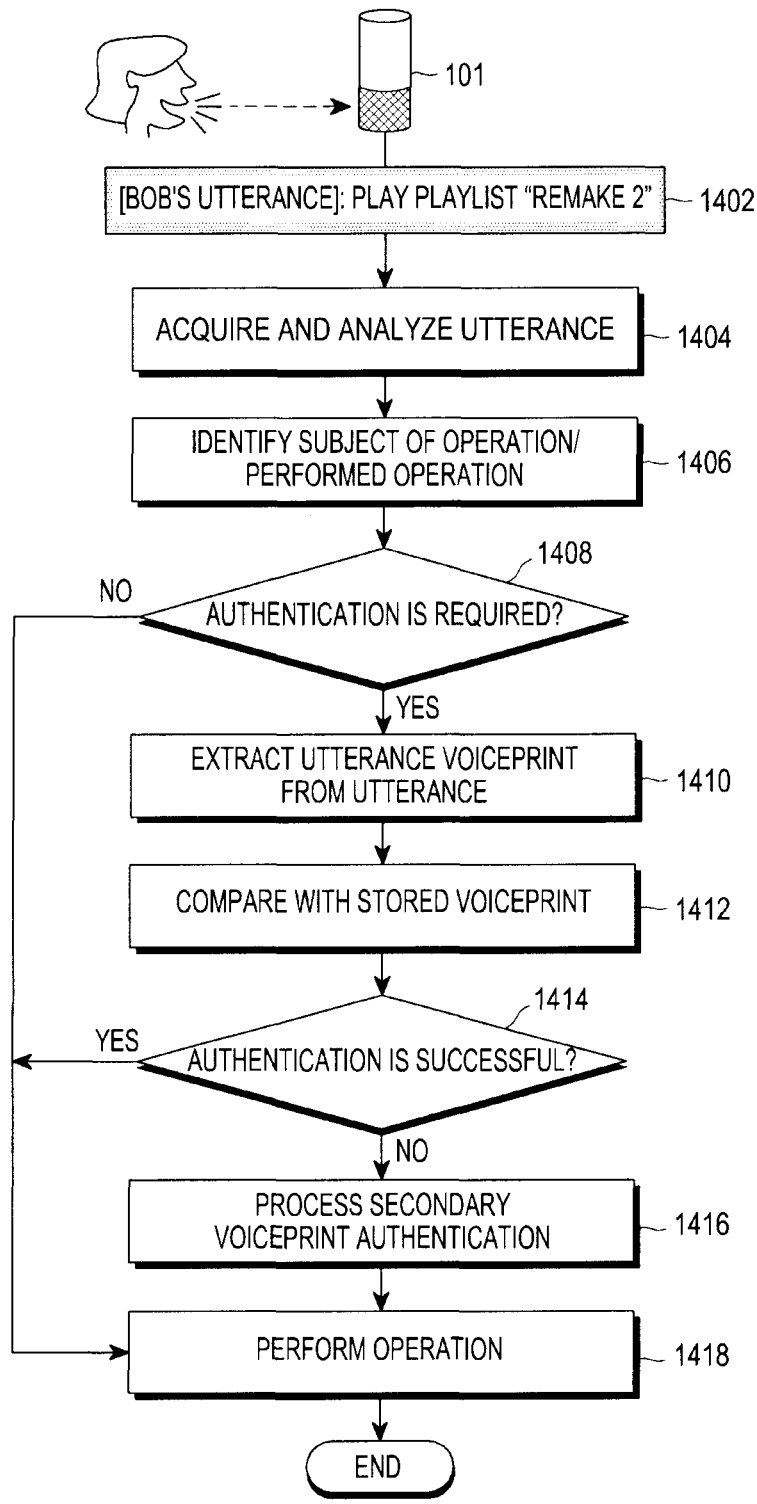
FIG. 14 is a flowchart illustrating a function execution procedure of the electronic device according to various embodiments of the present disclosure.

FIG. 14 is a flowchart illustrating a function execution procedure of the electronic device according to various embodiments of the present disclosure. Referring to FIG. 14, at a friend's home, the user may give an instruction to a friend's smart speaker and reproduce music in "my music library".

In operation 1402, the electronic device 101 (for example, the smart speaker), according to an embodiment of the present disclosure, may receive the utterance "play playlist remake 2" from the user.

The electronic device 101 may analyze the user's utterance in operation 1404 and may determine that the subject to perform the function included in the user's utterance is the electronic device 101 and that the operation to be performed is reproducing music included in the playlist in operation 1406.

In operation 1408, the electronic device 101 may determine whether the operation utilizes user authentication with reference to the operation of the analyzed utterance.

When the operation included in the user's utterance utilizes user authentication, the electronic device 101 may extract an utterance voiceprint from the utterance in operation 1410, compare the extracted utterance voiceprint with the authentication voiceprint registered in the electronic device 101, and identify the subject of the utterance in operation 1412.

When the utterance voiceprint matches one of the authentication voiceprints registered in the electronic device 101 in operation 1414, the smart speaker may determine that the subject of the utterance is the subject of the authentication voiceprint and perform the operation utilized for reproducing the music included in the playlist in the utterance with reference to user information of the subject of the authentication voiceprint.

When the utterance voiceprint does not match any of the authentication voiceprints registered in the electronic device 101 in operation 1414, the electronic device 101 may determine that the utterance is an utterance of a non-registered user and that additional authentication is utilized. When authentication of the utterance voiceprint fails in operation 1414, the electronic device 101 may perform secondary utterance voiceprint authentication through the external electronic device in operation 1416, and when the secondary authentication is successful, may perform the operation based on the utterance in operation 1418.

When the operation included in the user's utterance does not utilize user authentication in operation 1408, the electronic device 101 may perform the operation based on the utterance in operation 1418.

Figure 15:
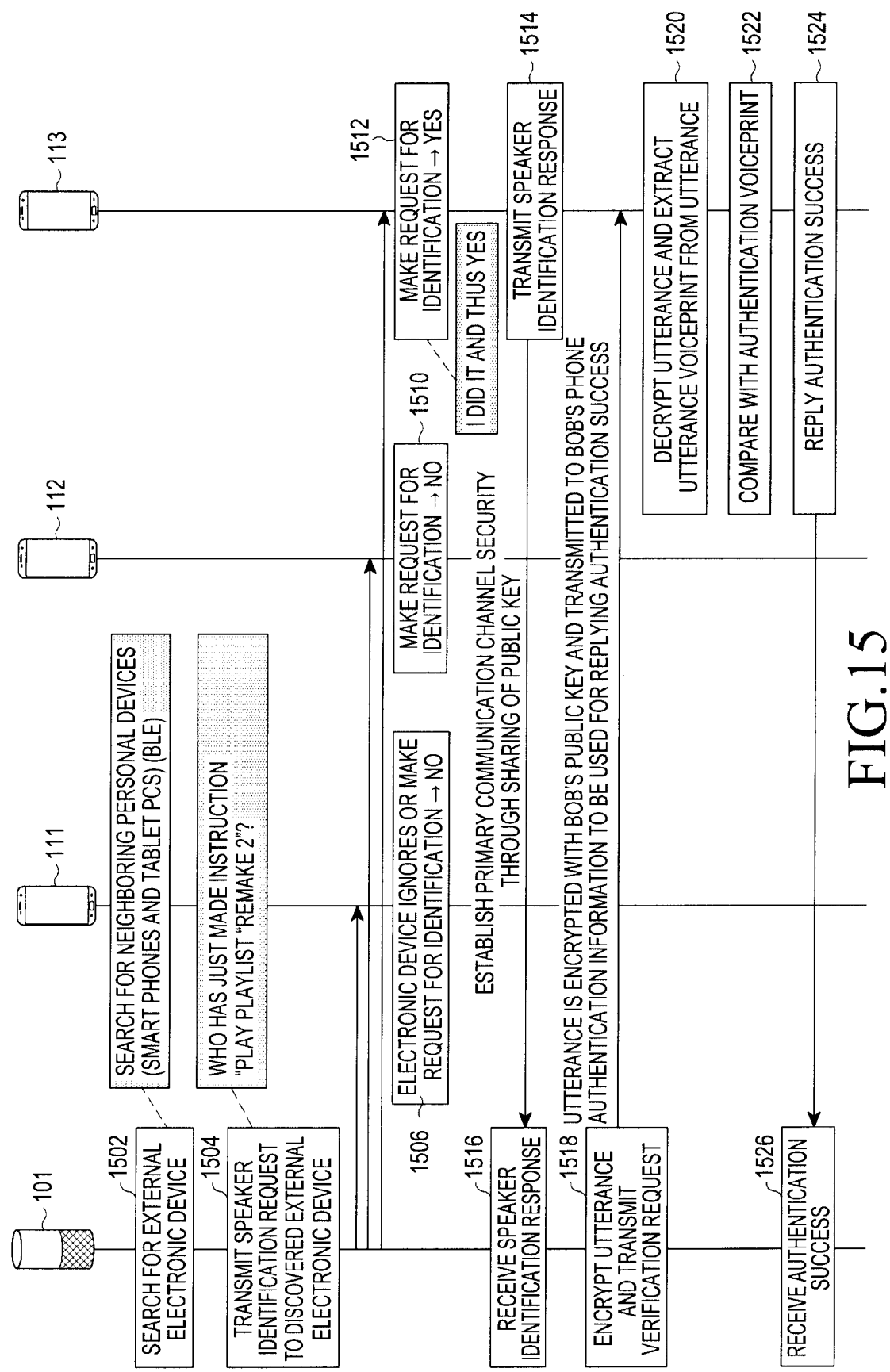
FIG. 15 is a signal flowchart illustrating a secondary voiceprint authentication execution procedure between devices according to various embodiments of the present disclosure.

FIG. 15 is a signal flowchart illustrating a secondary voiceprint authentication execution procedure between devices according to various embodiments of the present disclosure. Referring to FIG. 15, when authentication of the utterance voiceprint fails, the electronic device 101 (for example, the smart speaker 101 of FIG. 1) may search for or identify an external electronic device for the secondary utterance voiceprint verification in operation 1502. For example, the electronic device 101 may search for neighboring personal devices (for example, smart phones and tablet PCs) through Bluetooth Low Energy (BLE) communication. In operation 1504, the electronic device 101 may broadcast a speaker identification request which queries the external electronic devices as to whether the respective users thereof made the utterance corresponding to the utterance voiceprint.

In operations 1506, 1510, and 1512, the external electronic devices 111, 112, and 113 receiving the speaker identification request present the content of the utterance "Did you just say 'play playlist remake 2'?" to the users and receive a response thereto from the users. When the user of the predetermined external electronic device 113 inputs a response corresponding to "Yes", the external electronic device 113 may transmit the content of the response and its own public key to the electronic device 101 in operation 1514. The external electronic device 113 may transmit the reply including recognition information (identification information: name, nickname, device name, account ID, or part of a phone number) of the user of the external electronic device 113.

The electronic device 101 may receive a speaker identification response from the external electronic device 113 in operation 1516, and may encrypt the utterance with reference to the public key or a secret key shared on the basis of the public key and transmit the encrypted utterance to the external electronic device 113 in operation 1518.

In operation 1520, the external electronic device 113 may decrypt the encrypted utterance with reference to a private key corresponding to the public key or the secret key in order to identify the utterance and may extract the utterance voiceprint from the utterance. In operation 1522, the external electronic device 113 may compare the utterance voiceprint with the authentication voiceprint stored in the external electronic device 113 and identify the authentication result. When authentication is successful, the external electronic device 113 may transmit an authentication success reply message including whether authentication is successful to the electronic device 101 in operation 1524. In operation 1526, the electronic device 101 may receive the authentication success reply message from the external electronic device 113.

Figure 16:
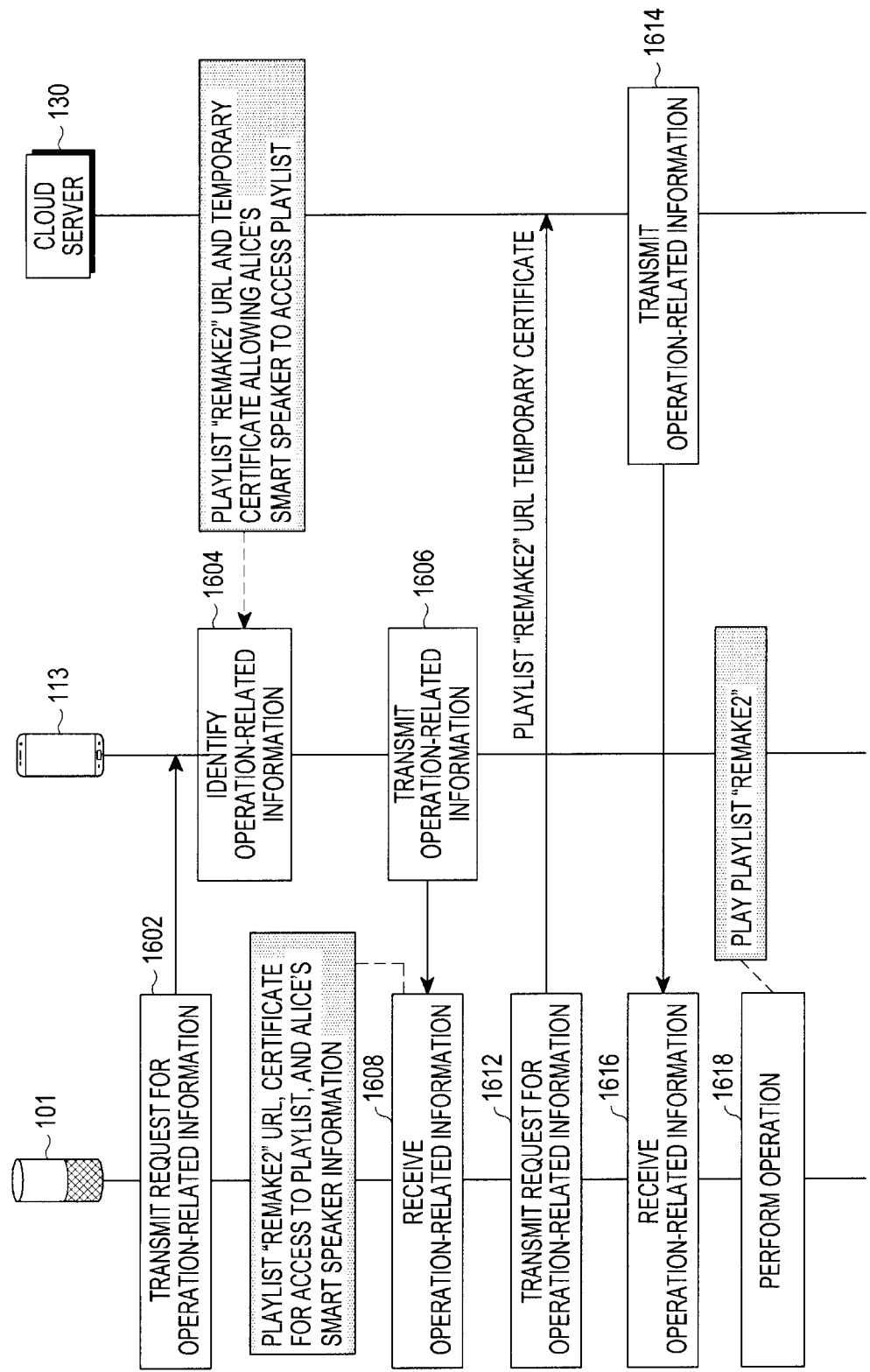
FIG. 16 is a signal flowchart illustrating an operation procedure between devices according to various embodiments of the present disclosure.

FIG. 16 is a signal flowchart illustrating an operation procedure between devices according to various embodiments of the present disclosure. Referring to FIG. 16, the electronic device 101 (for example, the smart speaker) receiving the authentication success reply message may identify information utilized for reproducing the playlist and transmit an operation-related information message including the information to the external electronic device 113 in operation 1602. The information utilized for reproducing the playlist may include one or more of a playlist provision service, information on a right to access the playlist provision service, and playlist ID information.

In operation 1604, the external electronic device 113 may identify operation-related information such as music site information (a name and a URL), music site access right information (a certificate and a token), and a playlist URL. For example, the playlist URL may be a URL for the playlist "remake 2", and the music site access right information may be a temporary certificate for allowing the electronic device 101 to access the playlist. In operation 1606, the external electronic device 113 may transmit the operation-related information message including the information to the electronic device 101. In order to acquire the music site access right information, the external electronic device 113 may send a request for generating temporary access right information (the certificate and the token) to the music site and acquire the same.

In operation 1608, the electronic device 101 may receive operation-related information from the external electronic device 113 and access the music site with reference to the received information so as to reproduce the playlist. According to various embodiments, the electronic device 101 may transmit an operation-related information request message to the cloud server 130 (for example, the cloud server 130 of FIG. 1) in operation 1612. For example, the electronic device 101 may request a temporary URL certificate for the playlist "remake 2" from the cloud server 130. In operation 1614, the cloud server 130 may transmit the operation-related information (for example, the temporary URL certificate) to the electronic device 101.

The electronic device 101 may receive the operation-related information from the cloud server 130 in operation 1616 and perform the corresponding operation (for example, the operation of reproducing the playlist "remake 2") in operation 1618.

Figure 17:
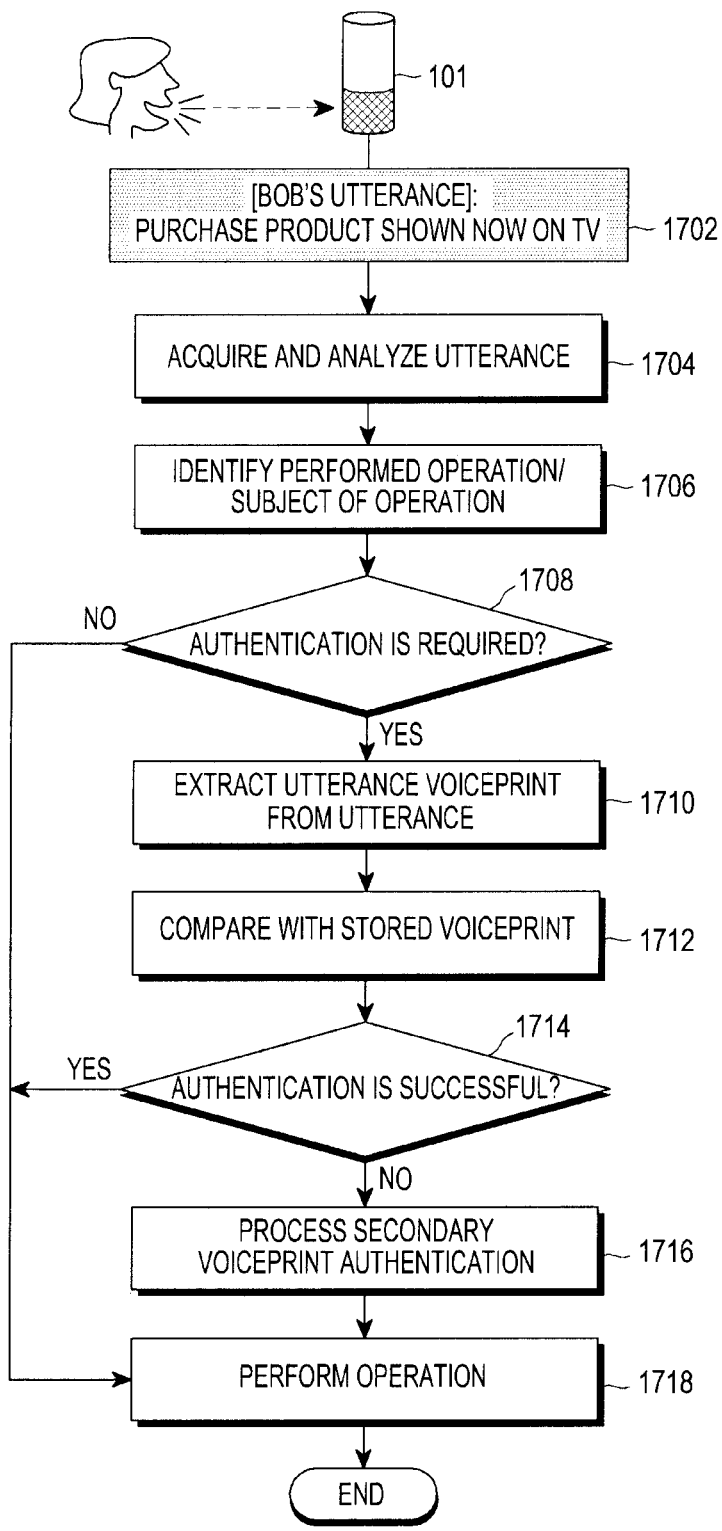
FIG. 17 is a flowchart illustrating a function execution procedure of the electronic device according to various embodiments of the present disclosure.

FIG. 17 is a flowchart illustrating a function execution procedure of the electronic device according to various embodiments of the present disclosure. Referring to FIG. 17, according to various embodiments, at a friend's home, the user may give an instruction to a friend's smart speaker and purchase a product through "my account".

In operation 1702, the electronic device 101 (for example, the electronic device 101 of FIG. 1), according to an embodiment of the present disclosure, may receive an utterance "purchase the product shown now on the TV" from the user through a microphone (for example, the microphone 215 of FIG. 2).

The electronic device 101 may analyze the user's utterance in operation 1704 and may determine that the subject to perform the function included in the user's utterance is a personal electronic device and that the operation to be performed is purchasing a product included in the utterance in operation 1706. According to various embodiments, the electronic device 101 may determine that the operation utilizes user authentication with reference to the operation in the analyzed utterance. In operation 1708, the electronic device 101 may determine whether the operation included in the user's utterance utilizes user authentication. When the operation utilizes user authentication, the electronic device 101 may extract an utterance voiceprint from the utterance in operation 1710 and may compare the extracted utterance voiceprint with the authentication voiceprint stored in the electronic device 101 so as to identify the subject of the utterance in operation 1712.

In operation 1714, the electronic device 101 may determine whether authentication for the subject of the utterance is successful. When the utterance voiceprint matches one of the authentication voiceprints registered in the electronic device 101, the smart speaker may determine that the subject of the utterance is the subject of the authentication voiceprint and may perform the operation utilized for reproducing music included in the playlist in the utterance with reference to user information of the subject of the authentication voiceprint in operation 1718.

When the utterance voiceprint does not match any of the authentication voiceprints registered in the electronic device 101 in operation 1714, the electronic device 101 may determine that the utterance is an utterance of a non-registered user and that additional authentication is utilized. When authentication of the utterance voiceprint fails in operation 1714, the electronic device 101 may perform secondary utterance voiceprint authentication through the external electronic device in operation 1716, and when the secondary authentication is completed, may perform a predetermined operation in operation 1718.

Figure 18:
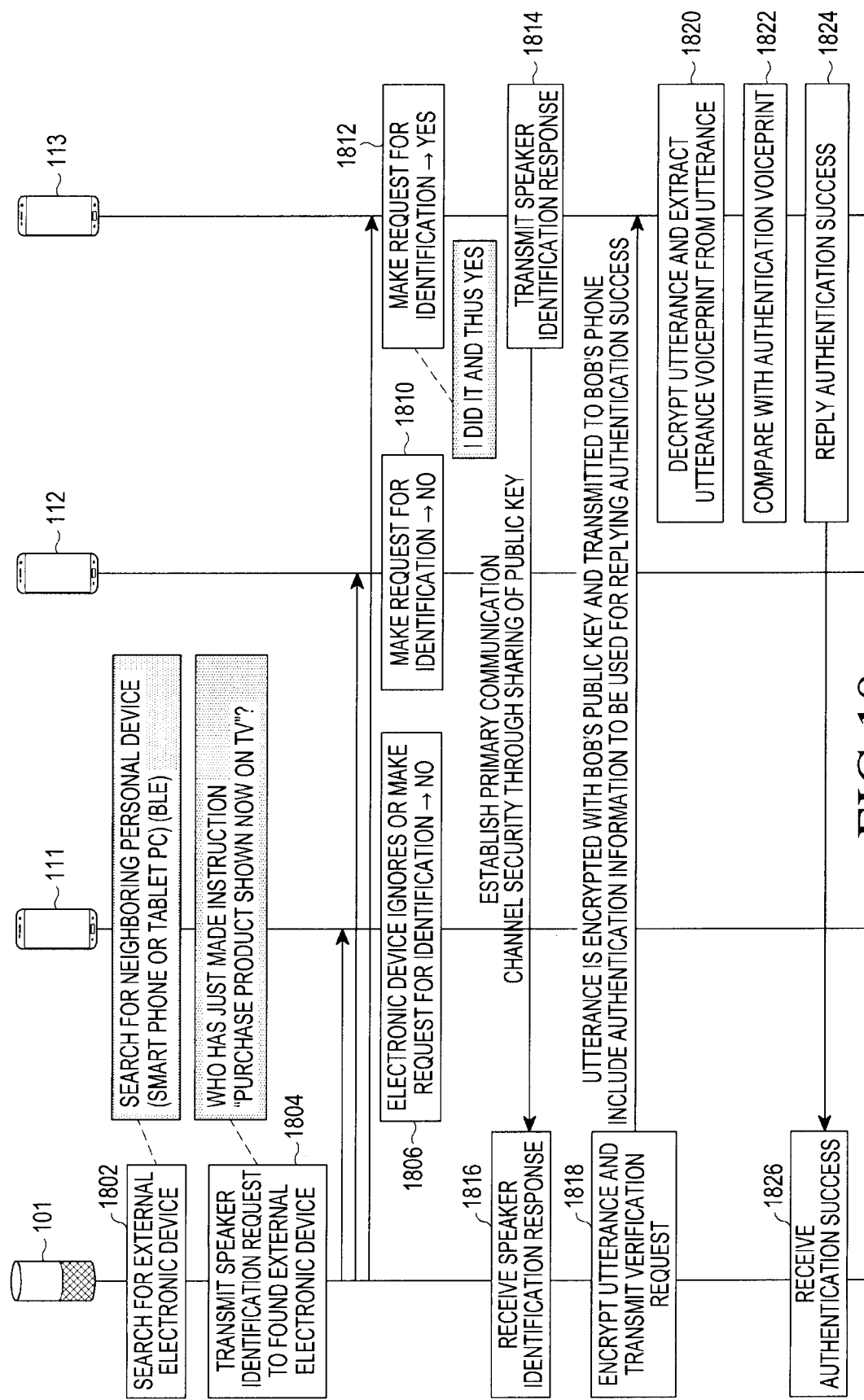
FIG. 18 is a signal flowchart illustrating a secondary voiceprint authentication execution procedure between devices according to various embodiments of the present disclosure.

FIG. 18 is a signal flowchart illustrating a secondary voiceprint authentication execution procedure between devices according to various embodiments of the present disclosure. Referring to FIG. 18, when authentication of the utterance voiceprint fails, the electronic device 101 (for example, the smart speaker) may identify external electronic devices for secondary utterance voiceprint verification in operation 1802 and broadcast a speaker identification request which queries the external electronic devices as to whether respective users thereof made the utterance corresponding to the utterance voiceprint in operation 1804.

In operations 1806, 1810, and 1812, the electronic devices 111, 112, and 113 receiving the speaker identification request may present the content of the utterance "Did you just say 'Purchase the product shown now on the TV'? purchase product: Samsung Level U/site:Amazon/price:70,000 won" to the users and may receive responses thereto from the users.

When the user of a predetermined external electronic device 113 inputs a response corresponding to "Yes" in operation 1812 (e.g., "I did it"), the external electronic device 113 may transmit the content of the response and its own public key to the electronic device 101 in operation 1814. For example, the external electronic device 113 may transmit its own public key to the electronic device 101 and may share the public key so as to establish primary communication channel security. According to various embodiments, the external electronic device 113 may transmit the reply including recognition information (identification information: name, nickname, device name, account ID, or part of a phone number) of the user of the external electronic device 113.

The electronic device 101 receiving a speaker identification response from the external electronic device 113 in operation 1816 may encrypt the utterance with reference to the public key or a secret key shared on the basis of the public key and transmit the encrypted utterance to the external electronic device 113 in operation 1818. According to various embodiments, when encrypting and transmitting the utterance, the electronic device 101 may also transmit authentication information to be used for an authentication success reply.

In operation 1820, the external electronic device 113 may decrypt the encrypted utterance with reference to a private key corresponding to the public key or the secret key in order to identify the utterance, and may extract the utterance voiceprint from the utterance. In operation 1822, the external electronic device 113 may compare the utterance voiceprint with the authentication voiceprint stored in the external electronic device 113 and identify the authentication result. When the authentication is successful, the external electronic device 113 may transmit an authentication success reply message including information on whether authentication is successful to the electronic device 101 in operation 1824. In operation 1826, the electronic device 101 may receive the authentication success reply message from the external electronic device 113.

Figure 19:
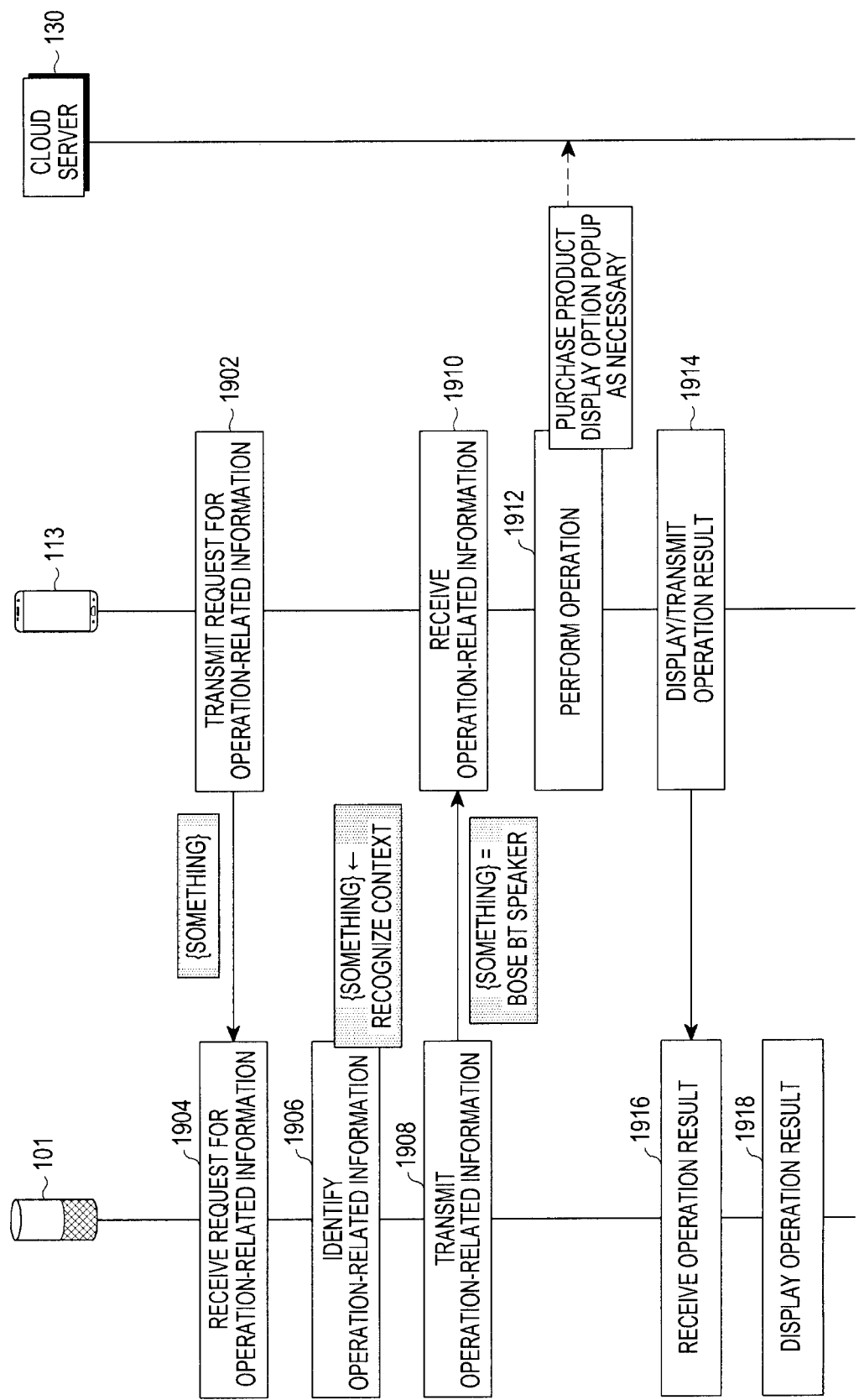
FIG. 19 is a signal flowchart illustrating an operation procedure between devices according to various embodiments of the present disclosure.

FIG. 19 is a signal flowchart illustrating an operation procedure between devices according to various embodiments of the present disclosure. Referring to FIG. 19, the external electronic device 113 transmitting the authentication success reply message may determine that product-purchase-related information is utilized in order to perform the operation included in the utterance and transmit an operation-related information request including the content of the request for the product-purchase-related information to the electronic device 101 (for example, the smart speaker) in operation 1902. The product-purchase-related information may include one or more piece of product information (a name, price, and attributes) and product advertisement information (a site and company information).

The electronic device 101 receiving the operation-related information request message including the product-purchase-related information request in operation 1904 may identify the product-purchase-related information with reference to the user's utterance and surrounding context information when the user's utterance is acquired in operation 1906. To this end, the smart speaker may store the surrounding context at the time point at which the user's utterance is acquired.

In operation 1908, the electronic device 101 identifying the product-purchase-related information may transmit an operation-related information message including the product-purchase-related information to the external electronic device 113.

In operation 1910, the external electronic device 113 receiving the operation-related information message may access a shopping mall site with reference to the product-purchase-related information, search for product information included in the product-purchase-related information, and purchase the corresponding product. In operation 1912, the external electronic device 113 may additionally perform a step for user input related to product purchase option information, shipping address information, or payment information.

When the product purchase is completed, the external electronic device 113 may inform the user of the result of the product purchase through the external electronic device 113 in operation 1914. In operation 1914, the external electronic device 113 may transmit an operation result message including the product purchase result to the electronic device 101 and the electronic device 101 may inform the user of the result of the product purchase.

The electronic device 101 may receive the operation result from the external electronic device 113 in operation 1916 and display the operation result in operation 1918.

Figure 20:
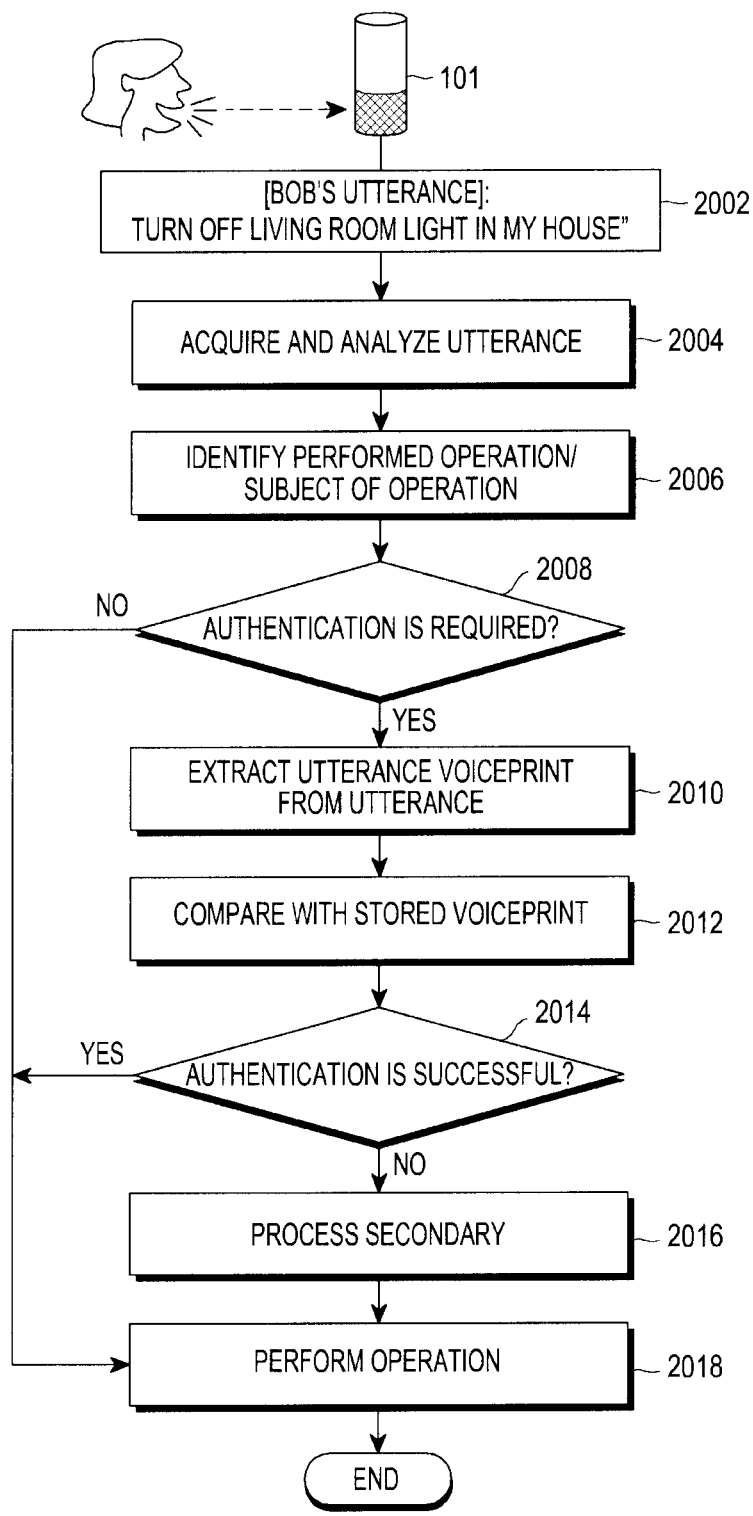
FIG. 20 is a flowchart illustrating a function execution procedure of the electronic device according to various embodiments of the present disclosure.

FIG. 20 is a flowchart illustrating a function execution procedure of the electronic device according to various embodiments of the present disclosure. Referring to FIG. 20, according to various embodiments, at a friend's home, the user may give an instruction to a friend's smart speaker and control IoT device information at the user's home.

In operation 2002, the electronic device 101 (for example, the smart speaker), according to an embodiment of the present disclosure, may receive an utterance "turn off a living room light in my house" from the user. The electronic device 101 may analyze the user's utterance in operation 2004, and determine that the subject to perform the function included in the user's utterance is an IoT cloud server (for example, the cloud server 130 of FIG. 1) linked to the electronic device of the speaker and that the operation to be performed is turning off a light in operation 2006. The electronic device 10 may identify either a operation and/or a subject of the operation, as in a function to be executed and a particular device with which to execute the function, as in operation 2006. According to various embodiments, the electronic device 101 may determine that the operation utilizes user authentication for the operation in the analyzed utterance.

When the operation included in the user's utterance utilizes user authentication in operation 2008, the electronic device 101 may extract an utterance voiceprint from the utterance in operation 2010 and may compare the extracted utterance voiceprint with the authentication voiceprint registered in the electronic device 101 in operation 2012 so as to identify the subject of the utterance.

When the utterance voiceprint matches one of the authentication voiceprints registered in the electronic device 101, the smart speaker may determine that the subject of the utterance is the subject of the authentication voiceprint and perform the operation of turning off the light included in the utterance with reference to user information of the subject of the authentication voiceprint.

When the utterance voiceprint is found to not match any of the authentication voiceprints registered in the electronic device 101 in operation 2014, the electronic device 101 may determine that the utterance is an utterance of a non-registered user and that additional authentication is utilized. When authentication of the utterance voiceprint fails in operation 2014, the electronic device 101 may perform secondary utterance voiceprint authentication through the external electronic device in operation 2016, and when the second authentication is completed, perform the operation (for example, the operation of controlling the light) based on the received utterance in operation 2018.

When it is determined that the operation included in the user's utterance does not utilize user authentication in operation 2008, the electronic device 101 may perform the operation based on the received utterance in operation 2018.

Figure 21:
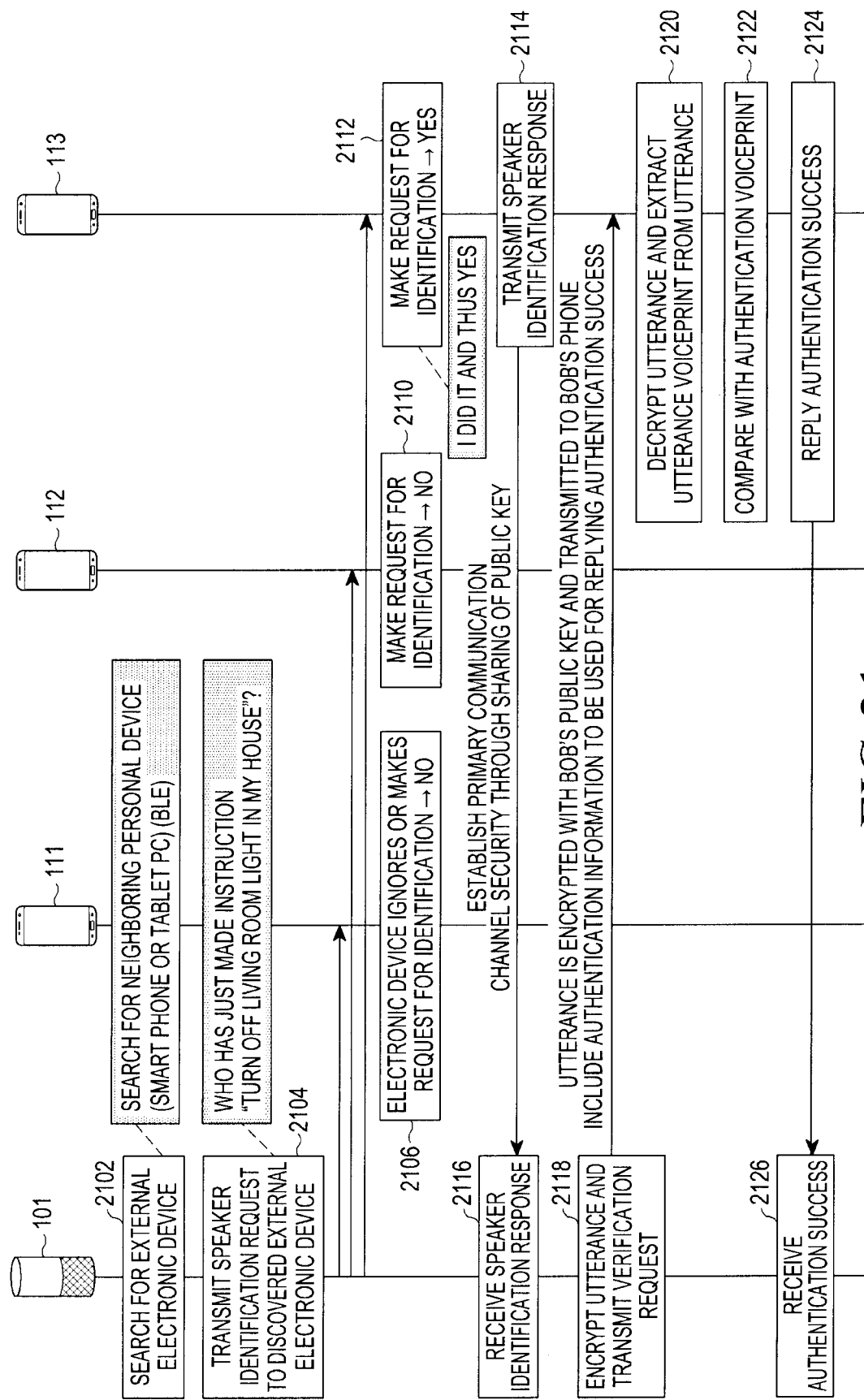
FIG. 21 is a signal flowchart illustrating a secondary voiceprint authentication execution procedure between devices according to various embodiments of the present disclosure.

FIG. 21 is a signal flowchart illustrating a secondary voiceprint authentication execution procedure between devices according to various embodiments of the present disclosure. Referring to FIG. 21, when authentication of the utterance voiceprint fails, the electronic device 101 (for example, the smart speaker) may identify external electronic devices for secondary utterance voiceprint verification in operation 2102 and may broadcast a speaker identification request which queries one or more external electronic devices 111, 112, and 113 as to whether the respective users thereof made the utterance corresponding to the utterance voiceprint in operation 2104.

In operations 2106, 2110, and 2112, the external electronic devices 111, 112, and 113 receiving the speaker identification request may present the content of the utterance "Did you just say 'Turn off the living room light in my house'?" to the users and receive responses thereto from the users. When the user of a predetermined external electronic device 113 inputs a response corresponding to "Yes" in operation 2112 (e.g., "I did it"), the external electronic device 113 may transmit the content of the response and its own public key to the electronic device 101 in operation 2114. For example, the external electronic device 113 may transmit its own public key to the electronic device 101 and share the public key so as to establish primary communication channel security. According to various embodiments, the external electronic device 113 may transmit the reply including recognition information (identification information: name, nickname, device name, account ID, or part of a phone number) of the user of the external electronic device 113.

The electronic device 101 receiving a speaker identification response from the external electronic device 113 in operation 2116 may encrypt the utterance with reference to the public key or to a secret key shared on the basis of the public key and transmit the encrypted utterance to the external electronic device 113 in operation 2118. According to various embodiments, when encrypting and transmitting the utterance, the electronic device 101 may also transmit authentication information to be used for an authentication success reply.

In operation 2120, the external electronic device 113 may decrypt the encrypted utterance with reference to a private key corresponding to the public key or the secret key to identify the utterance and may extract the utterance voiceprint from the utterance. In operation 2122, the electronic device 113 may compare the utterance voiceprint with the authentication voiceprint stored in the electronic device 113 and identify the authentication result. When authentication is successful, the electronic device 113 may transmit an authentication success reply message including information on whether authentication is successful to the electronic device 101 in operation 2124. In operation 2126, the electronic device 101 may receive the authentication success reply message from the electronic device 113. For example, the electronic device 101 may provide the result of authentication success to the speaker through one or more of visual and auditory effects.

Figure 22:
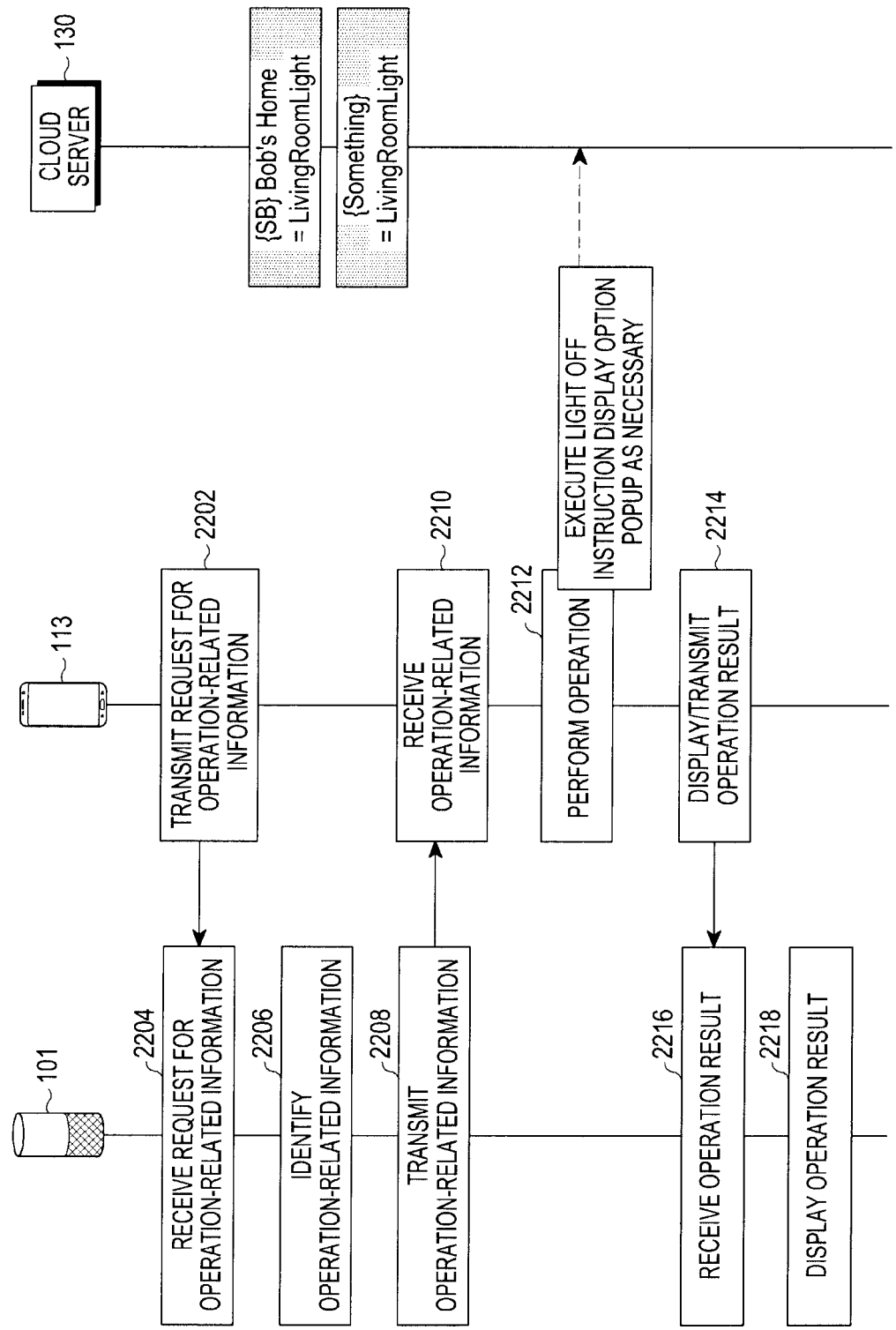
FIG. 22 is a signal flowchart illustrating an operation procedure between devices according to various embodiments of the present disclosure.

FIG. 22 is a signal flowchart illustrating an operation procedure between devices according to various embodiments of the present disclosure. Referring to FIG. 22, the external electronic device 113 (for example, the electronic device 113 of FIG. 1) transmitting the authentication success reply message may determine that device information and attribute information are needed in order to perform the operation included in the utterance and may perform the operation utilized for acquiring the same.

In operation 2202, the external electronic device 113 may transmit an operation-related information request including the content of the request for device information and attribute information to the electronic device 101. The electronic device 101 receiving the operation-related information request message including the request for the device information and the attribute information in operation 2204 may identify operation-related information including the device information and the attribute information with reference to the user's utterance in operation 2206.

The electronic device 101 identifying the device information (for example, a living room light) and the attribute information (for example, off) may transmit the operation-related information message including the device information and the attribute information to the electronic device 113 in operation 2208.

After receiving the operation-related information in operation 2210, then, according to various embodiments, the electronic device 113 may directly identify the device information and the attribute information through an external service included in the electronic device or functionally connected to the electronic device 113.

The electronic device 113 identifying the device information and the attribute information may transmit a request message for changing attributes of the device information (for example, the living room light) to the attribute information (for example, off) to the cloud server 130 (for example, the IoT service server) functionally connected to the electronic device 113 in operation 2212 (for example, the electronic device 113 may transmit a "light off instruction execution" message and may selectively display a pop-up message according to various embodiments).

When the light-off operation is completed, the electronic device 113 may inform the user of the operation result through the electronic device 112 in operation 2214. According to various embodiments, the electronic device 113 may transmit an operation result message including the operation result to the electronic device 101 and the electronic device 101 may inform the user of the operation result in operation 2214.

The electronic device 101 may receive the operation result from the electronic device 113 in operation 2216 and display the operation result in operation 2218. For example, the electronic device 101 may display the operation result through a user interface (for example, a display, a speaker, or an LED).

According to various embodiments, the electronic device 101 may return to an original account while using an account of another person. When detecting an utterance of the original user while executing an instruction of another user, who is not the user of the account registered in the smart speaker, the electronic device 101, according to an embodiment of the present disclosure, may respond to and may first operate the instruction from the original user. For example, the original user may be a user registered in the user account or a user whom the electronic device 101 registers through an authentication voiceprint.

According to various embodiments, an original user return policy, such as a policy of providing the highest priority to the original user, for example, unconditionally executing first the operation of the original user when detecting an utterance of the original user while using a smart speaker of another user, may be changed according to settings made by the user in advance.

The return policy may be performed as the smart speaker recognizes an operation of inputting an utterance indicating that another user has finished using the smart speaker of the original user.

The return policy may be performed when a signal (Ack/Ping) for identifying whether the smart speaker 101 and another user are within the same space through the smart speaker 101 of the original user and a network unit (for example, BT or Wi-Fi) of the electronic device 112 of the other user is not received within a predetermined reference (for example, after a predetermined number of attempts or within a predetermined time interval) through the smart speaker 101.

Figure 23:
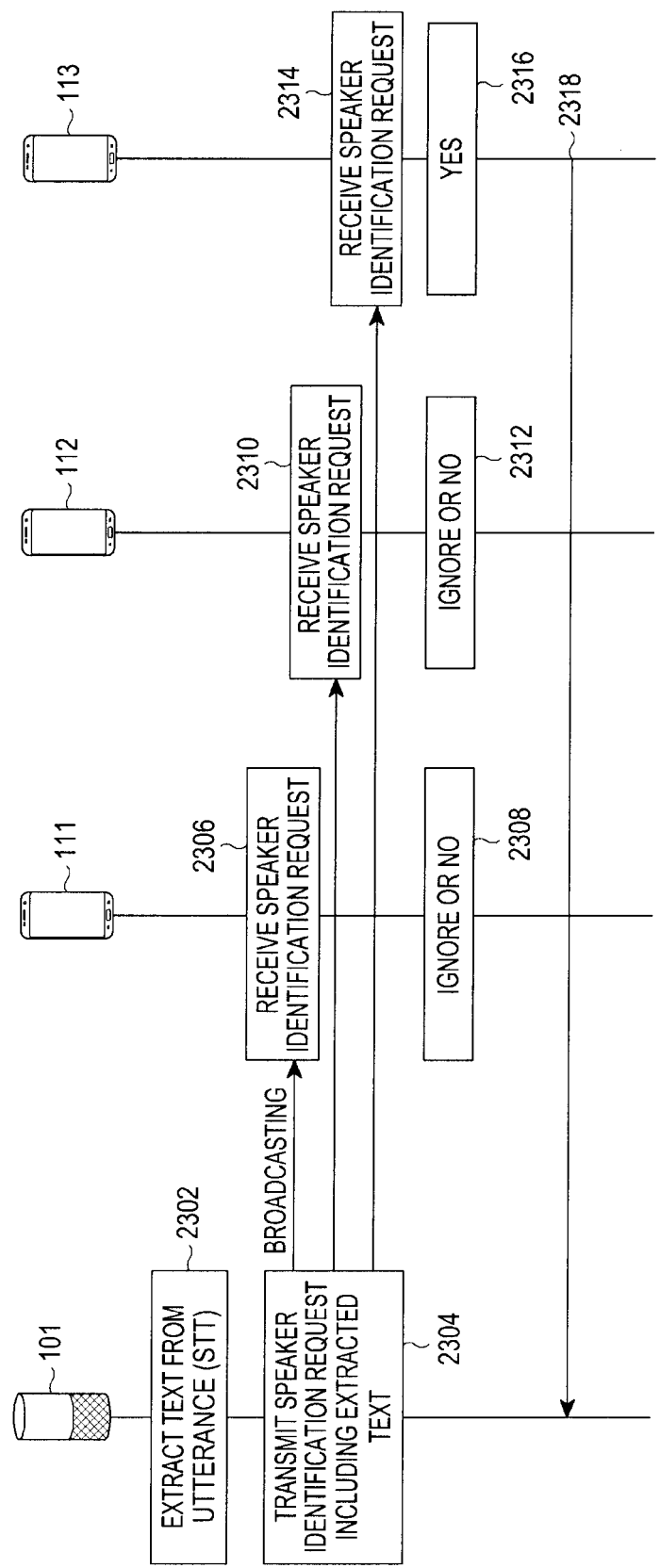
FIG. 23 is a signal flowchart illustrating an operation procedure between devices according to various embodiments of the present disclosure.

FIG. 23 is a signal flowchart illustrating an operation procedure between devices according to various embodiments of the present disclosure. Referring to FIG. 23, when the result of the user authentication procedure is "non-authenticated" or "additional verification required", the electronic device 101 (for example, the smart speaker) may search for an external electronic device in order to perform secondary utterance voiceprint verification in the external electronic device.

In operation 2302, the electronic device 101 may extract text from the input utterance. In operation 2304, the electronic device 101 may transmit a speaker identification request message to electronic devices included in the list of external electronic devices. The message may be directly or indirectly transferred to the electronic device. According to various embodiments, the speaker identification request message may include at least part of the text extracted in operation 2302. The message may include the content of an instruction included in the utterance.

The external electronic device 111, 112, or 113 receiving the speaker identification request message from the electronic device 101 may display the speaker identification request message to the user and identify user input corresponding to the identification request in operations 2306, 2310, and 2314.

For example, the content of the user's utterance may be displayed in text or output through a voice, and a query about the subject of the corresponding utterance may be added. In another example, the content of the user's utterance and a description of an operation corresponding thereto may be displayed in text or output through a voice, and a query about a subject of the corresponding utterance may be added. According to various embodiments, in operations 2308, 2312, and 2316, as an example of a response to the query, a user response corresponding to one or more of "Yes" and "No" may be identified.

The electronic device 113 identifying the user response corresponding to "Yes" in response to the speaker identification request in operation 2316 may transmit a reply including at least the user response to the electronic device 101 in operation 2318.

Figure 24:
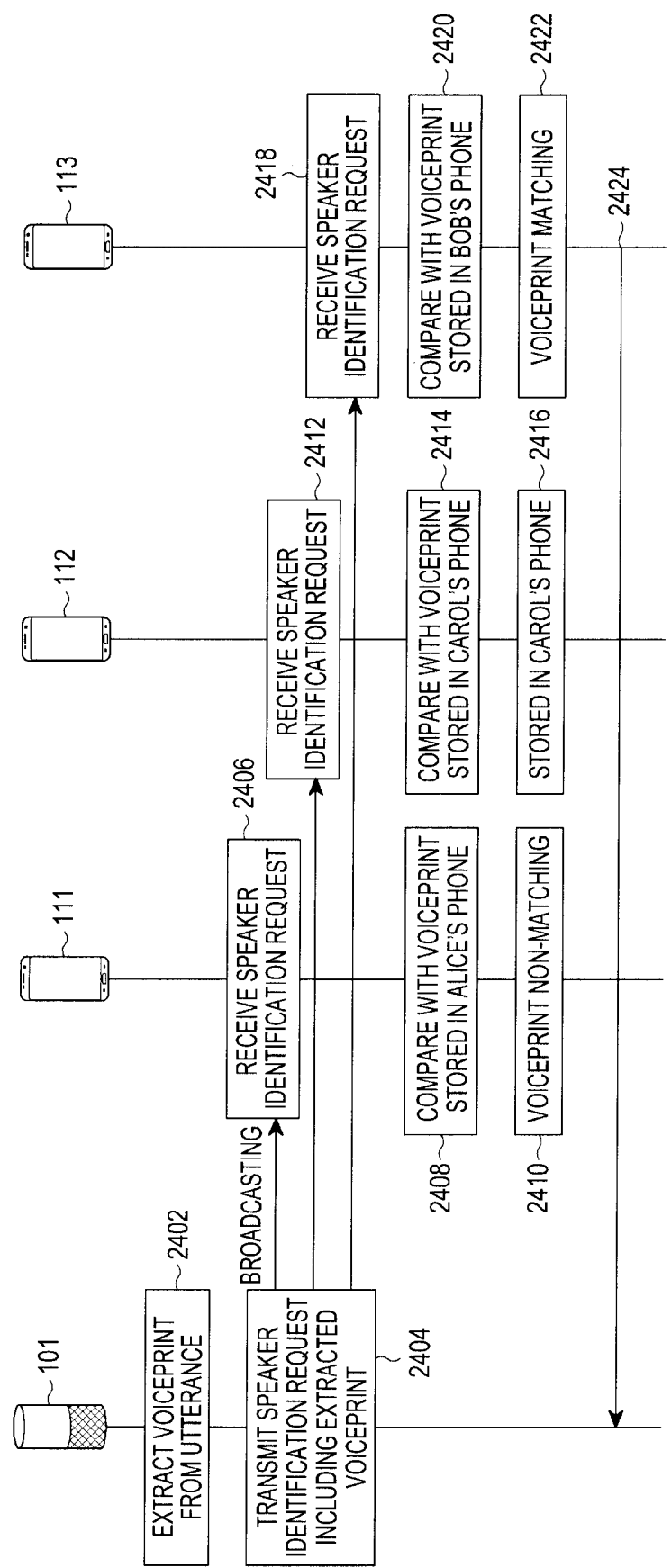
FIG. 24 is a signal flowchart illustrating an operation procedure between devices according to various embodiments of the present disclosure.

FIG. 24 is a signal flowchart illustrating an operation procedure between devices according to various embodiments of the present disclosure. Referring to FIG. 24, when the result of the user authentication procedure is "non-authenticated" or "additional verification required", the electronic device 101 (for example, the smart speaker) may search for an external electronic device in order to perform secondary utterance voiceprint verification in the external electronic device.

In operation 2402, the electronic device 101 may extract a voiceprint from the input utterance. In operation 2404, the electronic device 101 may transmit a speaker identification request message to electronic devices included in the list of external electronic devices. The message may be directly or indirectly transferred to the electronic device. According to various embodiments, the speaker identification request message may include one or more part of the voiceprint extracted in operation 2302. The message may include the content of an instruction included in the utterance.

In operations 2406, 2412, and 2418, the external electronic devices 111, 112, and 113 may receive the speaker identification request message from the electronic device 101, and in operations 2408, 2414 and 2420, compare the voiceprints stored therein with the voiceprint included in the received message. The first external electronic device 111 and the second external electronic device 112 indicate voiceprint mismatching on the basis of the comparison result in operations 2410 and 2416, and the third external electronic device 113 may display the voiceprint matching result on the screen, or may operate in the background, in operation 2422.

The electronic device 113 indicating the voiceprint matching in response to the speaker identification request in operation 2422 may transmit a reply including at least the user response to the electronic device 101 in operation 2424.

Figure 25:
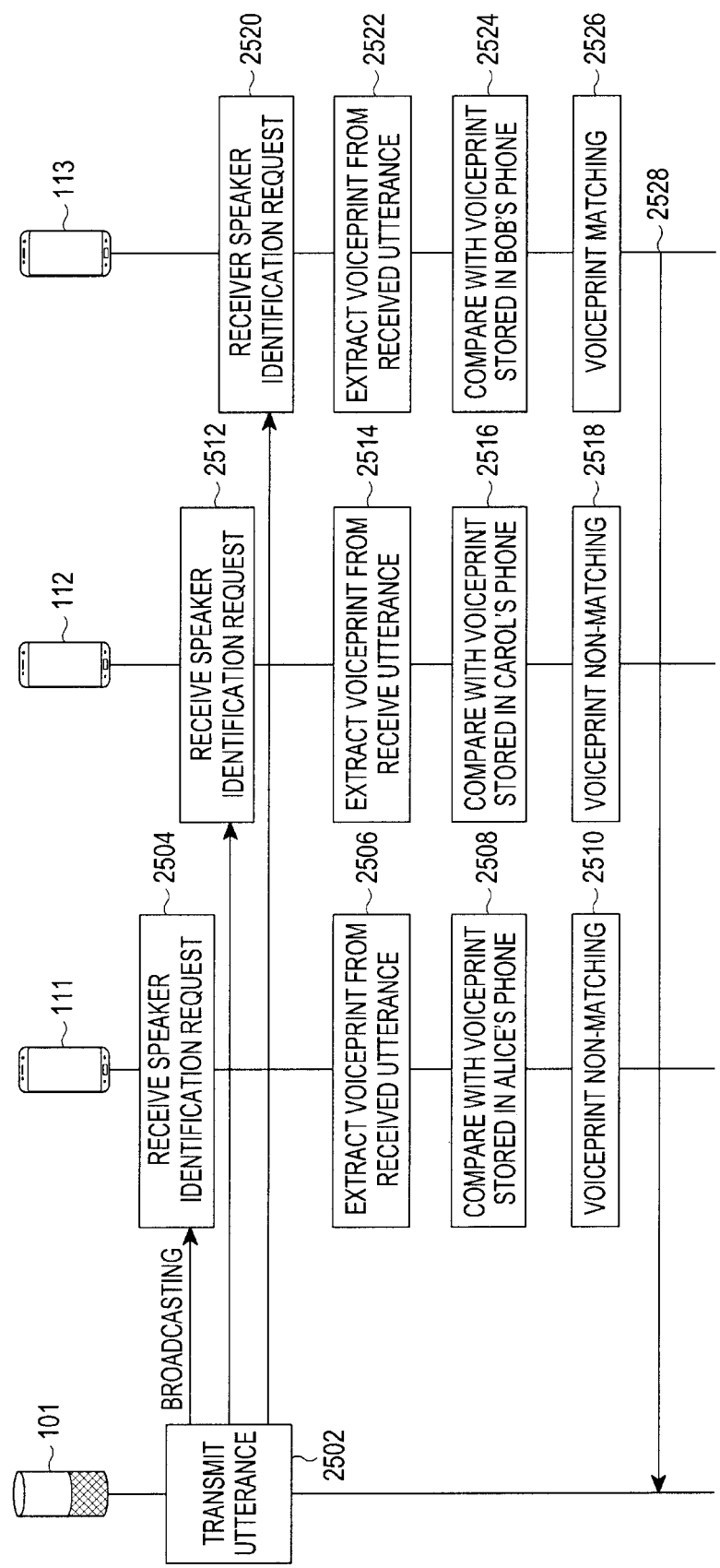
FIG. 25 is a signal flowchart illustrating an operation procedure between devices according to various embodiments of the present disclosure.

FIG. 25 is a signal flowchart illustrating an operation procedure between devices according to various embodiments of the present disclosure. Referring to FIG. 25, when the result of the user authentication procedure is "non-authenticated" or "additional verification required", the electronic device 101 (for example, the smart speaker) may search for an external electronic device in order to perform secondary utterance voiceprint verification in the external electronic device.

In operation 2502, the electronic device 101 may transmit at least part of the input utterance to an external electronic device included in a list of external electronic devices through an identification request message. The message may be directly or indirectly transferred to the external electronic device. According to various embodiments, the speaker identification request message may include at least part of the utterance input through the microphone (for example, the microphone 215 of FIG. 2) of the electronic device 101.

The message may include at least part of the content of an instruction included in the utterance.

The external electronic devices 111, 112, and 113 receiving the speaker identification request message from the electronic device 101 in operations 2504, 2512, and 2520 may extract the voiceprint from the utterance included in the received message in operations 2506, 2514, and 2522.

In operations 2508, 2516, and 2524, the electronic devices 111, 112, and 113 may compare the voiceprint stored therein with the voiceprint extracted from the utterance. The first electronic device 111 and the second electronic device 112 indicate voiceprint mismatching on the basis of the comparison result in operations 2510 and 2518, and the third electronic device 113 may display the voiceprint matching result on the screen, or may operate in the background, in operation 2526.

The electronic device 113 indicating the voiceprint matching in response to the speaker identification request in operation 2526 may transmit a reply including at least the user response to the electronic device 101 in operation 2528.

Figure 26:
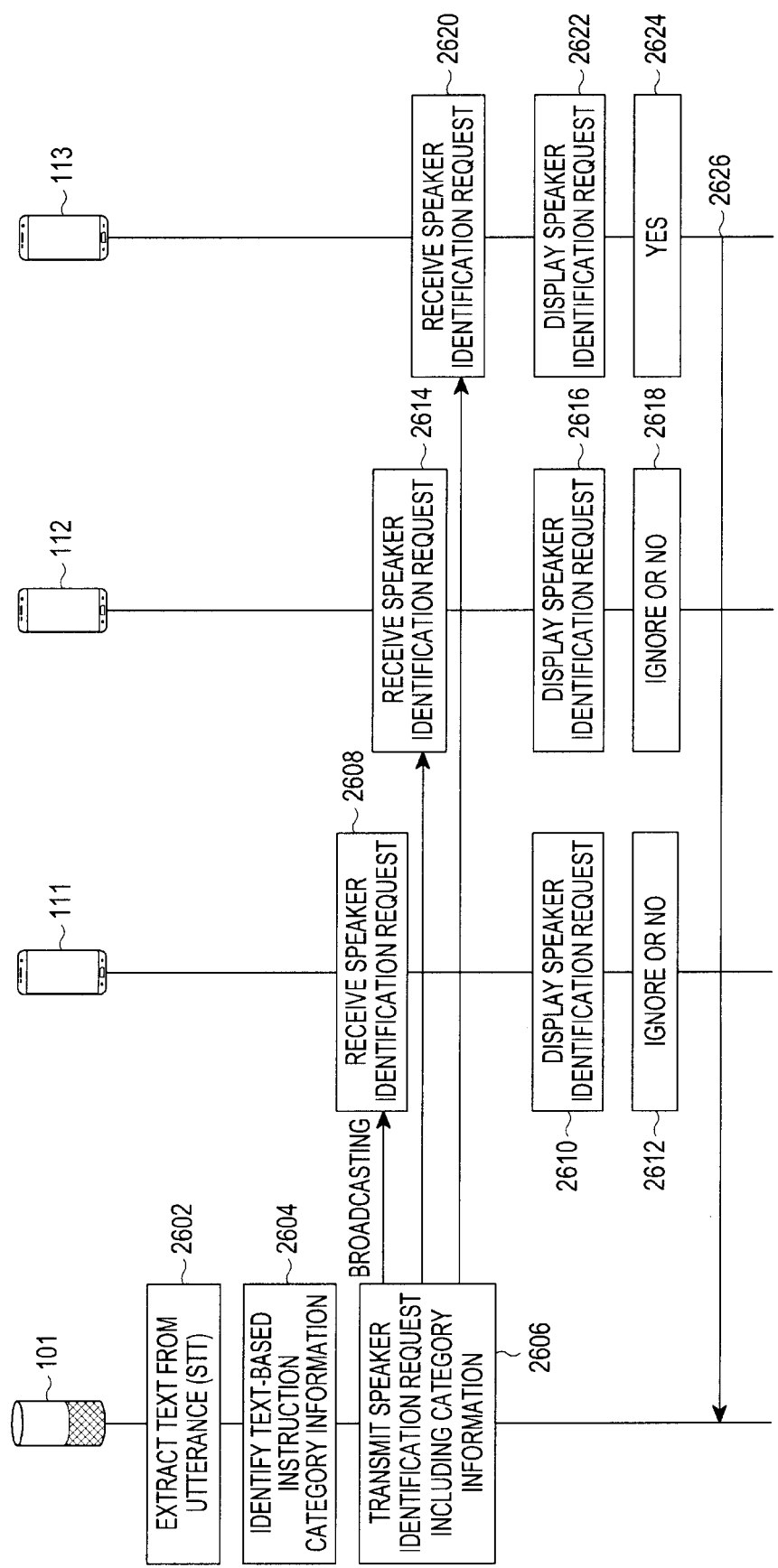
FIG. 26 is a signal flowchart illustrating an operation procedure between devices according to various embodiments of the present disclosure.

FIG. 26 is a signal flowchart illustrating an operation procedure between devices according to various embodiments of the present disclosure. Referring to FIG. 26, when the result of the user authentication procedure is "non-authenticated" or "additional verification required", the electronic device 101 (for example, the smart speaker) may search for an external electronic device in order to perform secondary utterance voiceprint verification in the external electronic device.

In operation 2602, the electronic device 101 may extract text from the input utterance. In operation 2604, the electronic device 101 may identify instruction category information on the basis of the extracted text. For example, the instruction category information may include music reproduction, product purchase, light control, or home appliance control.

In operation 2606, the electronic device 101 may transmit a speaker identification request message to electronic devices included in the list of external electronic devices. The message may be directly or indirectly transferred to the electronic device. According to various embodiments, the speaker identification request message may include the category information identified in operation 2604. The message may include at least part of the content of an instruction included in the utterance.

The external electronic devices 111, 112, and 113 receiving the speaker identification request message from the electronic device 101 in operations 2608, 2614, and 2620 may display the speaker identification request message to the users and identify user input corresponding to the identification request in operations 2610, 2616, and 2622.

For example, the content of the user's utterance may be displayed in text or output through a voice and a query about the subject of the corresponding utterance may be added. In another example, the content of the user's utterance and a description of an operation corresponding thereto may be displayed in text or may be output through a voice, and the query about the subject of the corresponding utterance and a query about whether to modify the corresponding utterance may be added. According to various embodiments, in operations 2612, 2618, and 2624, as an example of a response to the query, a user response corresponding to one or more of "Yes" and "No" may be identified.

The external electronic device 113, identifying the user response corresponding to "Yes" in response to the speaker identification request in operation 2624, may transmit a reply including at least the user response to the electronic device 101 in operation 2626.

Figure 27:
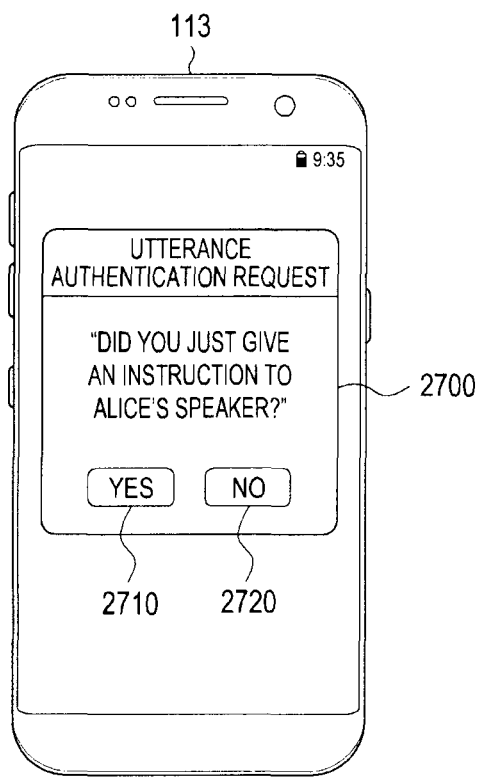
FIG. 27 illustrates an utterance authentication request screen displayed in a user terminal according to various embodiments of the present disclosure.
Figure 28:
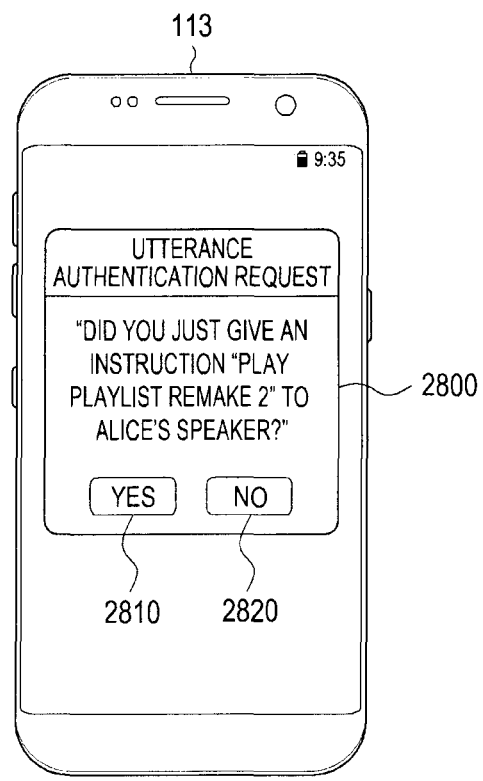
FIG. 28 illustrates an utterance authentication request screen displayed in a user terminal according to various embodiments of the present disclosure.
Figure 29:
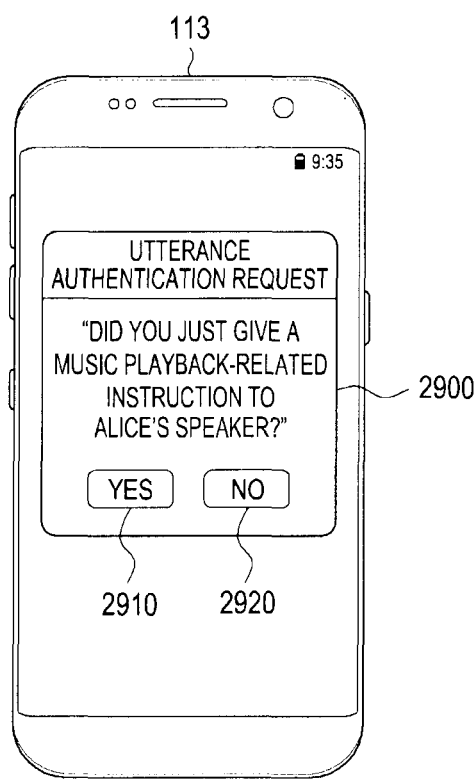
FIG. 29 illustrates an utterance authentication request screen displayed in a user terminal according to various embodiments of the present disclosure.

FIGS. 27, 28, and 29 illustrate utterance authentication request screens displayed in the user terminal according to various embodiments of the present disclosure. Referring to FIGS. 27, 28, and 29, according to various embodiments, when the electronic device 101 (for example, the smart speaker) transmits a speaker identification request to the found external electronic device for secondary voiceprint authentication, one or more external electronic device (for example, the electronic device 113) may make a request for identification as illustrated on the screens. For example, an utterance authentication request notification message "Did you just give an instruction to Alice's speaker?" may be displayed on a screen 2700 of FIG. 27. When a Yes button 2710 is selected on the screen 2700 of FIG. 27, utterance authentication may be identified and an identification response may be transmitted to the corresponding smart speaker. When a No button 2720 is selected on the screen 2700 of FIG. 27, authentication may not be performed and thus an identification response may not be transmitted to the corresponding smart speaker or a message related to authentication rejection may be transmitted.

According to various embodiments, an utterance authentication request notification message "Did you just give the instruction 'Play playlist remake 2' to Alice's speaker?" may be displayed on a screen 2800 of FIG. 28. When a Yes button 2810 is selected on the screen 2800 of FIG. 28, utterance authentication may be identified and an identification response may be sent to the corresponding smart speaker. When a No button 2820 is selected on the screen 2800 of FIG. 28, authentication may not be performed and thus an identification response may not be sent to the corresponding smart speaker, or a message related to authentication rejection may be sent.

According to various embodiments, an utterance authentication request notification message "Did you just give a music-playback-related instruction to Alice's speaker?" may be displayed on a screen 2900 of FIG. 29. When a Yes button 2910 is selected on the screen 2900 of FIG. 29, utterance authentication may be identified and an identification response may be sent to the corresponding smart speaker. When a No button 2920 is selected on the screen 2900 of FIG. 29, authentication may not be performed and thus an identification response may not be sent to the corresponding smart speaker, or a message related to authentication rejection may be sent. Hereinafter, an integrated intelligence system that can be applied to various embodiments of the present disclosure will be described.

Figure 30:
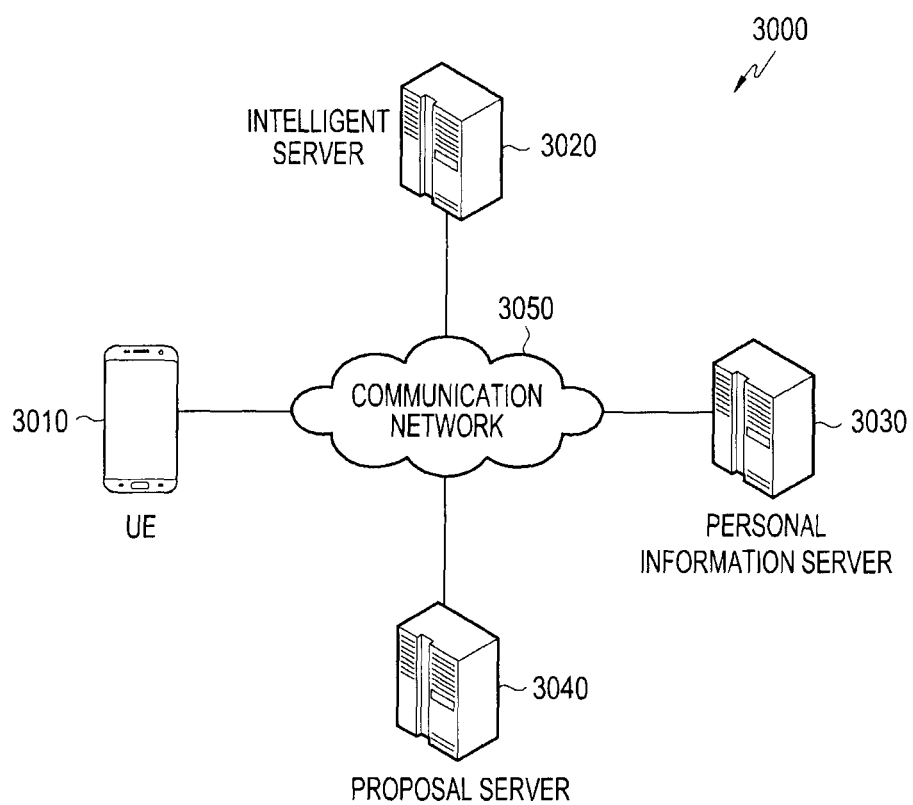
FIG. 30 illustrates an integrated intelligence system according to various embodiments of the present disclosure.

FIG. 30 illustrates an integrated intelligence system according to various embodiments of the present disclosure.

Referring to FIG. 30, an integrated intelligence system 3000 may include a user terminal 3010, an intelligent server 3020, a personal information server 3030, or an offer server 3040.

The user terminal 3010 may provide utilized services to the user through an app (or an application) (for example, an alarm app, a message app, or a photo (gallery) app) stored within the user terminal 3010. For example, the user terminal 3010 may execute and operate another app through an intelligent app (or a music recognition app) stored within the user terminal 3010. Through the intelligent app of the user terminal 3010, user input for executing the other app and performing an operation may be received. The user input may be received through, for example, a physical button, a touch pad, a voice input, or a remote input. According to an embodiment, the user terminal 3010 may correspond to various types of terminal devices (or electronic devices) capable of connecting to the Internet, such as a mobile phone, a smart phone, a Personal Digital Assistant (PDA), or a notebook computer.

According to an embodiment, the user terminal 3010 may receive a user's utterance as the user input. The user terminal 3010 may receive the user's utterance and generate an instruction for executing an app on the basis of the user's utterance. Accordingly, the user terminal 3010 may operate the app through the instruction.

The intelligent server 3020 may receive a user's voice input from the user terminal 3010 through a communication network 3050 and convert the voice input into text data. In another example, the intelligent server 3020 may generate (or select) a path rule on the basis of the text data. The path rule may include information on an action (or an operation) for performing a function of the app or information on a parameter utilized for performing the operation. Further, the path rule may include the sequence of operations of the app. The user terminal 3010 may receive the path rule, select an app according to the path rule, and perform an operation included in the path rule in the selected app.

The term "path rule" in this document may generally mean the sequence of states in which the electronic device performs tasks requested by the user, but is not limited thereto. In other words, the path rule may include information on the sequence of the states. The tasks may be, for example, actions that can be provided by the intelligent app. The tasks may include generation of a schedule, transmission of photos to a desired counterpart, or provision of weather information. The user terminal 3010 may sequentially have one or more states (for example, operation states of the user terminal 3010) and perform the tasks.

According to an embodiment, the path rule may be provided or generated by an Artificial Intelligence (AI) system. The AI system may be a rule-based system, a neural-network-based system (for example, a Feedforward Neural Network (FNN)), or a Recurrent Neural Network (RNN). Alternatively, the AI system may be a combination thereof or another AI system. According to an embodiment, the path rule may be selected from a set of predefined path rules, or may be generated in real time in response to a user request. For example, the AI system may select at least a path rule from among a plurality of predefined path rules or may generate a path rule dynamically (or in real time). Further, the user terminal 3010 may use a hybrid system for providing a path rule.

According to an embodiment, the user terminal 3010 may perform the operation and may display a screen corresponding to the state of the user terminal 3010 having performed the operation on the display. According to another embodiment, the user terminal 3010 may perform the operation and may not display the operation result on the display. The user terminal 3010 may perform, for example, a plurality of operations and display the result of some of the plurality of operations on the display. For example, the user terminal 3010 may display the result of the last operation on the display. According to another embodiment, the user terminal 3010 may receive user input and display the result of the operation on the display.

The personal information server 3030 may include a database storing user information. For example, the personal information server 3030 may receive user information (for example, context information and app execution) from the user terminal 3010 and store the user information in the database. The intelligent server 3020 may receive the user information from the personal information server 3030 through a communication network and use the same for generating a path rule for the user input. According to an embodiment, the user terminal 3010 may receive the user information from the personal information server 3030 through a communication network and use the same as information for managing the database.

The offer server 3040 may include a database storing introduction of a function or application within the terminal or information on a function to be provided. For example, the offer server 3040 may receive the user information of the user terminal 3010 from the personal information server 3030 and may include a database of functions that the user can use. The user terminal 3010 may receive information on the function to be provided from the offer server 3040 through the communication network and provide the information to the user.

Figure 31:
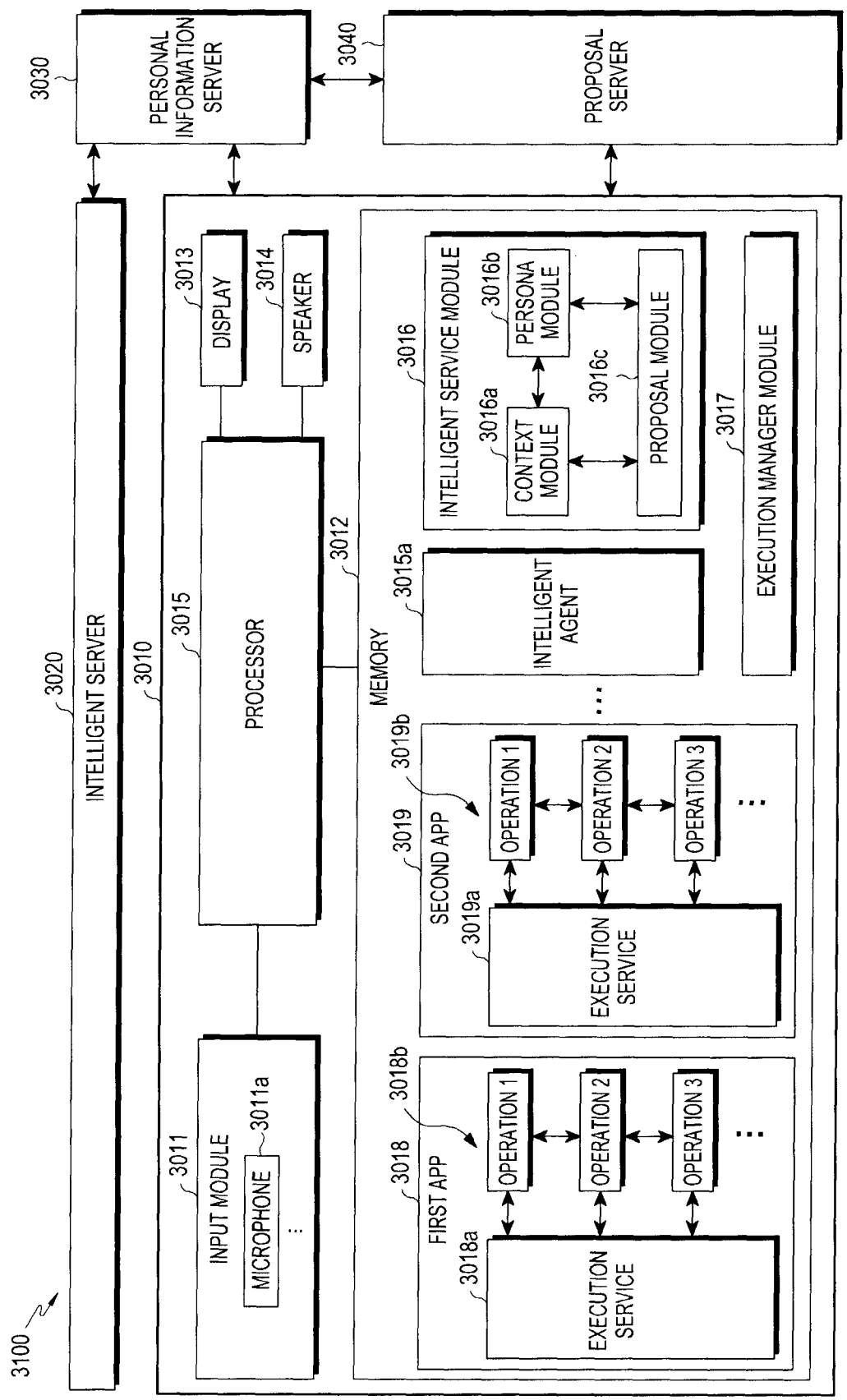
FIG. 31 is a block diagram illustrating a user terminal of an integrated intelligence system according to an embodiment of the present disclosure.

FIG. 31 is a block diagram 3100 illustrating a user terminal of an integrated intelligence system according to an embodiment of the present disclosure.

Referring to FIG. 31, the user terminal 3010 may include an input module 3011, a display 3013, a speaker 3014, a memory 3012, or a processor 3015. The user terminal 3010 may further include a housing, and the elements of the user terminal 3010 may be located within the housing or on the housing.

The input module 3011, according to an embodiment, may receive user input from the user. For example, the input module 3011 may receive user input from a connected external device (for example, a keyboard or a headset). In another example, the input module 3011 may include a touch screen (for example, a touch screen display) coupled to the display 3013. In another example, the input module 3011 may include a hardware key (or a physical key) located in the user terminal 3010 (or the housing of the user terminal 3010).

According to an embodiment, the input module 3011 may include a microphone 3011*a* for receiving a user's utterance as a voice signal. For example, the input module 3011 may include an utterance input system and receive a user's utterance as a voice signal through the utterance input system.

The display 3013, according to an embodiment, may display an image, a video, and/or an execution screen of an application. For example, the display 3013 may display a Graphic User Interface (GUI) of an app.

According to an embodiment, the speaker 3014 may output a voice signal. For example, the speaker 3014 may output a voice signal generated inside the user terminal 3010 to the outside.

According to an embodiment, the memory 3012 may store a plurality of apps (or applications 3018 and 3019). The plurality of apps 3018 and 3019 stored in the memory 3012 may be selected by the user input, and may be executed and operated.

According to an embodiment, the memory 3012 may include a database that may store information utilized for recognizing the user input. For example, the memory 3012 may include a log database for storing log information. In another example, the memory 3012 may include a personal database for storing user information.

According to an embodiment, the memory 3012 may store the plurality of apps 3018 and 3019, and the plurality of apps 3018 and 3019 may be loaded and operated. For example, the plurality of apps 3018 and 3019 stored in the memory 3012 may be loaded and operated by an execution manager module 3017 of the processor 3015. The plurality of apps 3018 and 3019 may include execution service modules 3018a and 3019a for performing functions. According to an embodiment, the plurality of apps 3018 and 3019 may perform a plurality of operations 3018b and 3019b (for example, the sequence of states) through the execution service modules 3018a and 3019a in order to perform the functions. That is, the execution service modules 3018a and 3019a may be activated by the execution manager module 3017 and may perform the plurality of operations 3018b and 3019b.

According to an embodiment, when the operations 3018b and 3019b of the apps 3018 and 3019 are executed, execution state screens according to the execution of the operations 3018b and 3019b may be displayed on the display 3013. The execution state screens may be, for example, screens in the state in which the operations 3018b and 3019b are completed. In another example, the execution state screens may be screens in the state in which execution of the operations 3018b and 3019b are stopped (partial landing) (for example, in the state in which a parameter utilized for the operations 3018b and 3019b is not input).

The execution service modules 3018a and 3019a, according to an embodiment, may perform the operations 3018b and 3019b according to a path rule. For example, the execution service modules 3018a and 3019a may be activated by the execution manager module 3017, may receive an execution request from the execution manager module 3017 according to the path rule, and may perform the operations 3018b and 3019b according to the execution request, so as to perform the functions of the apps 3018 and 3019. When the operations 3018b and 3019b are completely performed, the execution service modules 3018a and 3019a may transmit completion information to the execution manager module 3017.

According to an embodiment, when the plurality of operations 3018b and 3019b is executed in the apps 3018 and 3019, the plurality of operations 3018b and 3019b may be sequentially performed. When one operation (for example, operation 1 of the first app 3018 or operation 1 of the second app 3019) is completely performed, the execution service modules 3018a and 3019a may open the following operation (for example, operation 2 of the first app 3018 or operation 2 of the second app 3019) and transmit completion information to the execution manager module 3017. Here, opening a predetermined operation may be understood to be transitioning the predetermined operation to an executable state or preparing for the execution of the predetermined operation. In other words, when the predetermined operation is not open, the corresponding operation cannot be executed. When the completion information is received, the execution manager module 3017 may transmit a request for performing the following operation (operation 2 of the first app 3018 or operation 2 of the second app 3019) to the execution service modules 3018a and 3019a. According to an embodiment, when the plurality of apps 3018 and 3019 is executed, the plurality of apps 3018 and 3019 may be sequentially executed. For example, when the last operation of the first app 3018 (for example, operation 3 of the first app 3018) is completely performed and completion information is received, the execution manager module 3017 may transmit a request for performing the first operation of the second app 3019 (for example, operation 1 of the second app 3019) to the execution service module 3019a.

According to an embodiment, when the plurality of operations 3018b and 3019b is performed in the apps 3018 and 3019, the result screens, according to the execution of the plurality of performed operations 3018b and 3019b, may be displayed on the display 3013. According to an embodiment, some of the plurality of result screens according to the execution of the plurality of performed operations 3018b and 3019b may be displayed on the display 3013.

According to an embodiment, the memory 3012 may store an intelligent app (for example, a voice recognition app) linked to the intelligent agent 3015a. The app linked to the intelligent agent 3015a may receive and process a user's utterance as a voice signal. According to an embodiment, the app linked to the intelligent agent 3015a may be operated by a particular input (for example, input through a hardware key, input through a touch screen, or a particular voice input) made through the input module 3011.

According to an embodiment, the processor 3015 may control the overall operation of the user terminal 3010. For example, the processor 3015 may receive a user input by controlling the input module 3011. The processor 3015 may display an image by controlling the display 3013. The processor 3015 may output a voice signal by controlling the speaker 3014. The processor 3015 may load or store utilized information by controlling the memory 3012.

According to an embodiment, the processor 3015 may include the intelligent agent 3015a, the execution manager module 3017, or the intelligent service module 3016. According to an embodiment, the processor 3015 may drive the intelligent agent 3015a, the execution manager module 3017, or the intelligent service module 3016 by executing instructions stored in the memory 3012. Various modules mentioned in various embodiments of the present disclosure may be implemented in hardware or software. The operation performed by the intelligent agent 3015a, the execution manager module 3017, or the intelligent service module 3016 in various embodiments of the present disclosure may be understood as an operation that is performed by the processor 3015.

The intelligent agent 3015a, according to an embodiment, may generate an instruction for executing an app on the basis of the voice signal received as the user input. The execution manager module 3017, according to an embodiment, may receive the generated instruction from the intelligent agent 3015a and select, execute, and operate the apps 3018 and 3019 stored in the memory 3012. According to an embodiment, the intelligent service module 3016 may manage user information and use the same for processing the user input.

The intelligent agent 3015a may process the user input received through the input module 3011 by transmitting the same to the intelligent server 3020.

According to an embodiment, the intelligent agent 3015a may preprocess the user input before transmitting the user input to the intelligent server 3020. According to an embodiment, in order to preprocess the user input, the intelligent agent 3015a may include an Adaptive Echo Canceller (AEC) module, a Noise Suppression (NS) module, an End-Point Detection (EPD) module, or an Automatic Gain Control (AGC) module. The AEC may remove an echo from the user input. The NS module may suppress background noise included in the user input. The EPD module may detect the end point of the user's voice included in the user input and may find the part in which the user's voice exists. The AGC module may recognize the user input and control the volume of the user input so as to be suitable for processing. According to an embodiment, the intelligent agent 3015a may include all of the preprocessing elements for performance, but also may include some of the preprocessing elements in order to operate with low power according to another embodiment.

According to an embodiment, the intelligent agent 3015a may include a wakeup recognition module for recognizing a user's call. The wakeup recognition module may recognize a wakeup instruction by the user through the voice recognition module, and when receiving the wakeup instruction, may activate the intelligent agent 3015a to receive the user input. According to an embodiment, the wakeup recognition module of the intelligent agent 3015a may be implemented as a low-power processor (for example, a processor included in an audio codec). According to an embodiment, the intelligent agent 3015a may be activated according to the user input through a hardware key. When the intelligent agent 3015a is activated, an intelligent app (for example, a voice recognition app) linked to the intelligent agent 3015a may be executed.

According to an embodiment, the intelligent agent 3015a may include a voice recognition module for executing the user input. The voice recognition module may recognize the user input for performing the operation in the app. For example, the voice recognition module may recognize a limited range of user (voice) input (for example, an utterance such as "click" for performing a photographing operation when a camera app is executed) for performing the operation such as the wakeup instruction in the apps 3018 and 3019. The voice recognition module for assisting the intelligent server 3020 in recognizing the user input may recognize, for example, a user's instruction that can be processed by the user terminal 3010, and may rapidly process the user's instruction. According to an embodiment, the voice recognition module of the intelligent agent 3015a for executing the user input may be implemented by an app processor.

According to an embodiment, the voice recognition module (including the voice recognition module of the wakeup module) of the intelligent agent 3015a may recognize the user input through an algorithm for recognizing the voice. The algorithm used for recognizing the voice may be one or more of, for example, a Hidden Markov Model (HMM) algorithm, an Artificial Neural Network (ANN) algorithm, or a Dynamic Time Warping (DTW) algorithm.

According to an embodiment, the intelligent agent 3015a may convert the user voice input into text data. According to an embodiment, the intelligent agent 3015a may transfer the user's voice to the intelligent server 3020 and receive converted text data. Accordingly, the intelligent agent 3015a may display the text data on the display 3013.

According to an embodiment, the intelligent agent 3015a may receive a path rule from the intelligent server 3020. According to an embodiment, the intelligent agent 3015a may transmit the path rule to the execution manager module 3017.

According to an embodiment, the intelligent agent 3015a may transmit an execution result log according to the path rule received from the intelligent server 3020 to the intelligent service module 3016, and the transmitted execution result log may be accumulated and managed in user preference information of the personal module 3016b.

The execution manager module 3017, according to an embodiment, may receive the path rule from the intelligent agent 3015a and execute the app 3018 or 3019, and thus the app 3018 or 3019 may perform the operation 3018b or 3019b included in the path rule. For example, the execution manager module 3017 may transmit instruction information (for example, path rule information) for performing the operations 3018b and 3019b to the apps 3018 and 3019 and receive completion information of the operations 3018b and 3019b from the apps 3018 and 3019.

According to an embodiment, the execution manager module 3017 may transmit and receive instruction information (for example, path rule information) for performing the operations 3018b and 3019b of the apps 3018 and 3019 between the intelligent agent 3015a and the apps 3018 and 3019. The execution manager module 3017 may bind the apps 3018 and 3019 to be executed according to the path rule and transmit instruction information (for example, path rule information) of the operations 3018b and 3019b included in the path rule to the apps 3018 and 3019. For example, the execution manager module 3017 may sequentially transmit the operations 3018b and 3019b included in the path rule to the apps 3018 and 3019 and sequentially perform the operations 3018b and 3019b of the apps 3018 and 3019 according to the path rule.

According to an embodiment, the execution manager module 3017 may manage execution states of the operations 3018b and 3019b of the apps 3018 and 3019. For example, the execution manager module 3017 may receive information on the execution states of the operations 3018b and 3019b from the apps 3018 and 3019. When the execution states of the operations 3018b and 3019b are, for example, stopped states (partial landing) (for example, the states in which a parameter utilized for the operations 3018b and 3019b is not input), the execution manager module 3017 may transmit information on the stopped states to the intelligent agent 3015a. The intelligent agent 3015a may send a request for inputting utilized information (for example, parameter information) to the user on the basis of the received information. When the execution states of the operations 3018b and 3019b are, for example, operation states, the utterance may be received from the user and the execution manager module 3017 may transmit information on the apps 3018 and 3019 that are being executed and the execution states of the apps 3018 and 3019 to the intelligent agent 3015a. The intelligent agent 3015a may receive parameter information of the user's utterance through the intelligent server 3020 and transmit the received parameter information to the execution manager module 3017. The execution manager module 3017 may change the parameter of the operations 3018b and 3019b to a new parameter on the basis of the received parameter information.

According to an embodiment, the execution manager module 3017 may transfer parameter information included in the path rule to the apps 3018 and 3019. When the plurality of apps 3018 and 3019 is sequentially executed according to the path rule, the execution manager module 3017 may transfer parameter information included in the path rule from one app to another app.

According to an embodiment, the execution manager module 3017 may receive a plurality of path rules. The execution manager module 3017 may select a plurality of path rules on the basis of the user's utterance. For example, when the user's utterance specifies a predetermined app 3018 for performing a predetermined operation 3018b and does not specify another app 3019 for performing the remaining operation 3019b, the execution manager module 3017 may receive a plurality of different path rules for executing the same app 3018 (for example, a gallery app) for performing the predetermined operation 3018b and executing the other app 3019 (for example, a message app or a telegram app) for performing the remaining operation 3019b. The execution manager module 3017 may perform, for example, the same operations 3018b and 3019b of the plurality of path rules (for example, the same successive operations 3018b and 3019b). When the same operations are executed, the execution manager module 3017 may display a state screen for selecting different apps 3018 and 3019 included in the plurality of path rules on the display 3013.

According to an embodiment, the intelligent service module 3016 may include a context module 3016a, a personal module 3016b, or an offer module 3016c.

The context module 3016a may collect the current states of the apps 3018 and 3019 from the apps 3018 and 3019. For example, the context module 3016a may receive context information indicating the current states of the apps 3018 and 3019 and collect the current states of the apps 3018 and 3019.

The personal module 3016b may manage the personal information of the user who uses the user terminal 3010. For example, the personal module 3016b may collect usage information of the user terminal 3010 and the execution result, and may manage the personal information of the user.

The offer module 3016c may predict a user's intent and recommend an instruction to the user. For example, the offer module 3016c may recommend the instruction to the user in consideration of the current state of the user (for example, the time, place, situation, and app).

Figure 32:
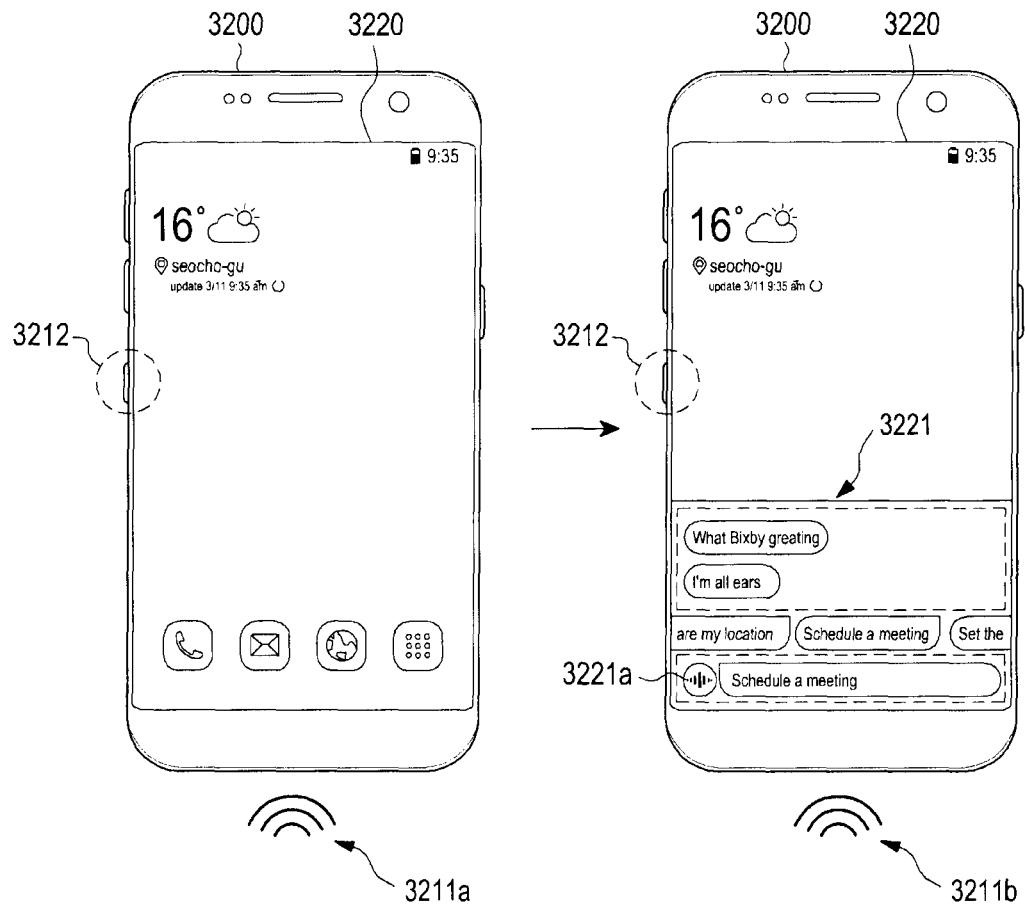
FIG. 32 illustrates execution of an intelligent app of the user terminal according to an embodiment of the present disclosure.

FIG. 32 illustrates execution of an intelligent app of the user terminal according to an embodiment of the present disclosure.

Referring to FIG. 32, it is illustrated that a user terminal 3200 receives a user input and executes an intelligent app (for example, a voice recognition app) linked to the intelligent agent 3015a.

According to an embodiment, the user terminal 3200 may execute an intelligent app for recognizing a voice through a hardware key 3212. For example, when receiving the user input through the hardware key 3212, the user terminal 3200 may display a user interface 3221 of the intelligent app on a display 3220. The user may touch a voice recognition button 3221a in the UI 3221 of the intelligent app in order to input a voice, as indicated by reference numeral 3211b, in the state in which the UI 3221 of the intelligent app is displayed on the display 3220. In another example, in order to input the voice as indicated by reference numeral 3211b, the user may input the voice as indicated by reference numeral 3211b by continuously pressing the hardware key 3212.

According to an embodiment, the user terminal 3200 may execute the intelligent app for recognizing the voice through a microphone (for example, the microphone 215 of FIG. 2). For example, when a predetermined voice (for example, "wake up!") is input as indicated by reference numeral 3211a through the microphone (for example, the microphone 215 of FIG. 2), the user terminal 3200 may display the UI 3221 of the intelligent app on the display 3220.

Figure 33:
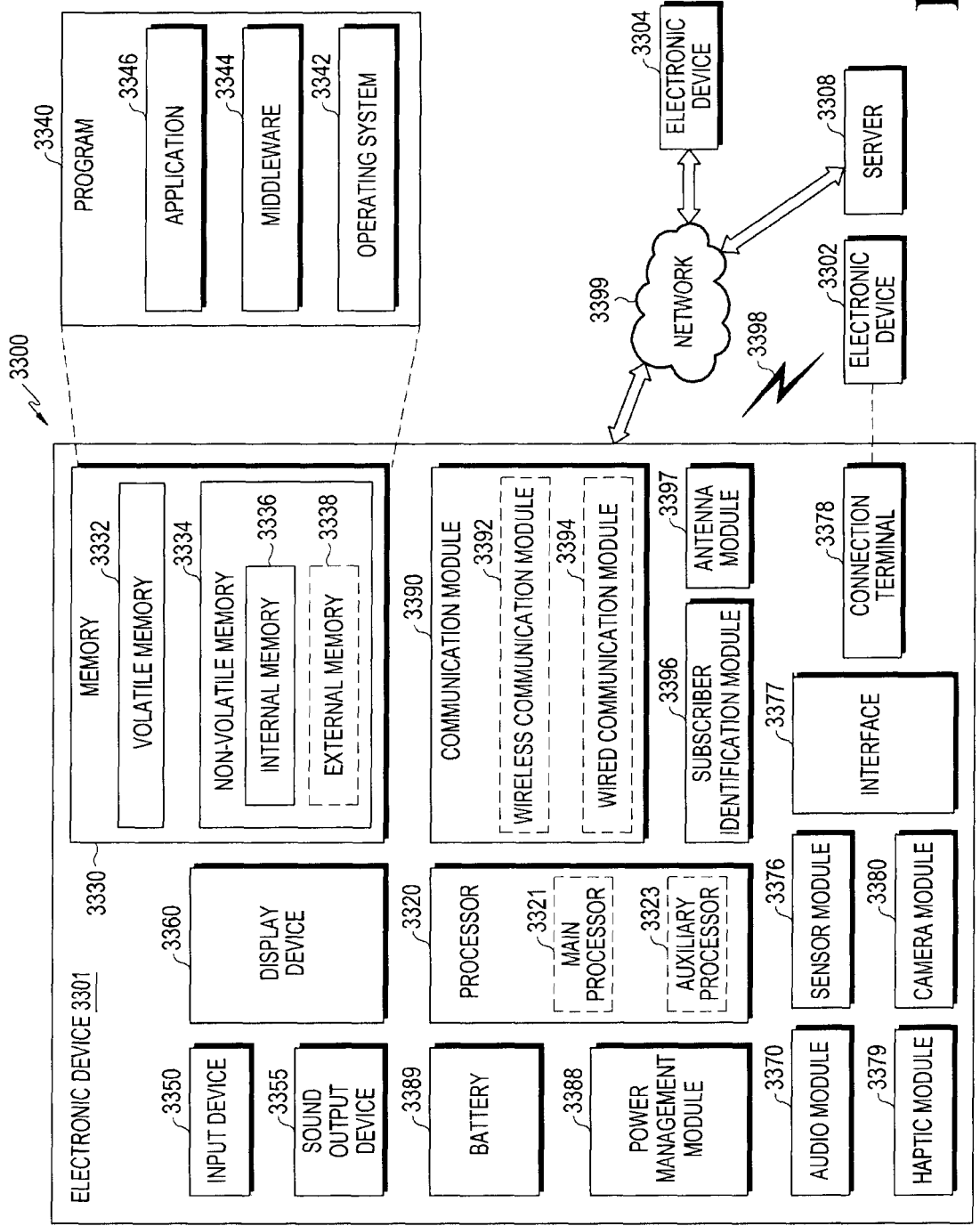
FIG. 33 is a block diagram illustrating an electronic device according to various embodiments of the present disclosure.

FIG. 33 is a block diagram illustrating an electronic device 3301 in a network environment 3300 according to various embodiments. Referring to FIG. 33, the electronic device 3301 in the network environment 3300 may communicate with an electronic device 3302 via a first network 3398 (e.g., a short-range wireless communication network), or an electronic device 3304 or a server 3308 via a second network 3399 (e.g., a long-range wireless communication network). According to an embodiment, the electronic device 3301 may communicate with the electronic device 3304 via the server 3308. According to an embodiment, the electronic device 3301 may include a processor 3320, memory 3330, an input device 3350, a sound output device 3355, a display device 3360, an audio module 3370, a sensor module 3376, an interface 3377, a haptic module 3379, a camera module 3380, a power management module 3388, a battery 3389, a communication module 3390, a subscriber identification module (SIM) 3396, or an antenna module 3397. In some embodiments, at least one (e.g., the display device 3360 or the camera module 3380) of the components may be omitted from the electronic device 3301, or one or more other components may be added in the electronic device 3301. In some embodiments, some of the components may be implemented as single integrated circuitry. For example, the sensor module 3376 (e.g., a fingerprint sensor, an iris sensor, or an illuminance sensor) may be implemented as embedded in the display device 3360 (e.g., a display).

The processor 3320 may execute, for example, software (e.g., a program 3340) to control at least one other component (e.g., a hardware or software component) of the electronic device 3301 coupled with the processor 3320, and may perform various data processing or computation. According to one embodiment, as at least part of the data processing or computation, the processor 3320 may load a command or data received from another component (e.g., the sensor module 3376 or the communication module 3390) in volatile memory 3332, process the command or the data stored in the volatile memory 3332, and store resulting data in non-volatile memory 3334. According to an embodiment, the processor 3320 may include a main processor 3321 (e.g., a central processing unit (CPU) or an application processor (AP)), and an auxiliary processor 3323 (e.g., a graphics processing unit (GPU), an image signal processor (ISP), a sensor hub processor, or a communication processor (CP)) that is operable independently from, or in conjunction with, the main processor 3321. Additionally or alternatively, the auxiliary processor 3323 may be adapted to consume less power than the main processor 3321, or to be specific to a specified function. The auxiliary processor 3323 may be implemented as separate from, or as part of the main processor 3321.

The auxiliary processor 3323 may control at least some of functions or states related to at least one component (e.g., the display device 3360, the sensor module 3376, or the communication module 3390) among the components of the electronic device 3301, instead of the main processor 3321 while the main processor 3321 is in an inactive (e.g., sleep) state, or together with the main processor 3321 while the main processor 3321 is in an active state (e.g., executing an application). According to an embodiment, the auxiliary processor 3323 (e.g., an image signal processor or a communication processor) may be implemented as part of another component (e.g., the camera module 3380 or the communication module 3390) functionally related to the auxiliary processor 3323.

The memory 3330 may store various data used by at least one component (e.g., the processor 3320 or the sensor module 3376) of the electronic device 3301. The various data may include, for example, software (e.g., the program 3340) and input data or output data for a command related thererto. The memory 3330 may include the volatile memory 3332 or the non-volatile memory 3334. The non-volatile memory may include internal memory 3336 and external memory 3338.

The program 3340 may be stored in the memory 3330 as software, and may include, for example, an operating system (OS) 3342, middleware 3344, or an application 3346.

The input device 3350 may receive a command or data to be used by other component (e.g., the processor 3320) of the electronic device 3301, from the outside (e.g., a user) of the electronic device 3301. The input device 3350 may include, for example, a microphone, a mouse, a keyboard, or a digital pen (e.g., a stylus pen).

The sound output device 3355 may output sound signals to the outside of the electronic device 3301. The sound output device 3355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 3360 may visually provide information to the outside (e.g., a user) of the electronic device 3301. The display device 3360 may include, for example, a display, a hologram device, or a projector and control circuitry to control a corresponding one of the display, hologram device, and projector. According to an embodiment, the display device 3360 may include touch circuitry adapted to detect a touch, or sensor circuitry (e.g., a pressure sensor) adapted to measure the intensity of force incurred by the touch.

The audio module 3370 may convert a sound into an electrical signal and vice versa. According to an embodiment, the audio module 3370 may obtain the sound via the input device 3350, or output the sound via the sound output device 3355 or a headphone of an external electronic device (e.g., an electronic device 3302) directly (e.g., wiredly) or wirelessly coupled with the electronic device 3301.

The sensor module 3376 may detect an operational state (e.g., power or temperature) of the electronic device 3301 or an environmental state (e.g., a state of a user) external to the electronic device 3301, and then generate an electrical signal or data value corresponding to the detected state. According to an embodiment, the sensor module 3376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3377 may support one or more specified protocols to be used for the electronic device 3301 to be coupled with the external electronic device (e.g., the electronic device 3302) directly (e.g., wiredly) or wirelessly. According to an embodiment, the interface 3377 may include, for example, a high definition multimedia interface (HDMI), a universal serial bus (USB) interface, a secure digital (SD) card interface, or an audio interface.

A connecting terminal 3378 may include a connector via which the electronic device 3301 may be physically connected with the external electronic device (e.g., the electronic device 3302). According to an embodiment, the connecting terminal 3378 may include, for example, a HDMI connector, a USB connector, a SD card connector, or an audio connector (e.g., a headphone connector).

The haptic module 3379 may convert an electrical signal into a mechanical stimulus (e.g., a vibration or a movement) or electrical stimulus which may be recognized by a user via his tactile sensation or kinesthetic sensation. According to an embodiment, the haptic module 3379 may include, for example, a motor, a piezoelectric element, or an electric stimulator.

The camera module 3380 may capture a still image or moving images. According to an embodiment, the camera module 3380 may include one or more lenses, image sensors, image signal processors, or flashes.

The power management module 3388 may manage power supplied to the electronic device 3301. According to one embodiment, the power management module 3388 may be implemented as at least part of, for example, a power management integrated circuit (PMIC).

The battery 3389 may supply power to at least one component of the electronic device 3301. According to an embodiment, the battery 3389 may include, for example, a primary cell which is not rechargeable, a secondary cell which is rechargeable, or a fuel cell.

The communication module 3390 may support establishing a direct (e.g., wired) communication channel or a wireless communication channel between the electronic device 3301 and the external electronic device (e.g., the electronic device 3302, the electronic device 3304, or the server 3308) and performing communication via the established communication channel. The communication module 3390 may include one or more communication processors that are operable independently from the processor 3320 (e.g., the application processor (AP)) and supports a direct (e.g., wired) communication or a wireless communication. According to an embodiment, the communication module 3390 may include a wireless communication module 3392 (e.g., a cellular communication module, a short-range wireless communication module, or a global navigation satellite system (GNSS) communication module) or a wired communication module 3394 (e.g., a local area network (LAN) communication module or a power line communication (PLC) module). A corresponding one of these communication modules may communicate with the external electronic device via the first network 3398 (e.g., a short-range communication network, such as Bluetooth™, wireless-fidelity (Wi-Fi) direct, or infrared data association (IrDA)) or the second network 3399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 3392 may identify and authenticate the electronic device 3301 in a communication network, such as the first network 3398 or the second network 3399, using subscriber information (e.g., international mobile subscriber identity (IMSI)) stored in the subscriber identification module 3396.

The antenna module 3397 may transmit or receive a signal or power to or from the outside (e.g., the external electronic device) of the electronic device 3301. According to an embodiment, the antenna module 3397 may include an antenna including a radiating element composed of a conductive material or a conductive pattern formed in or on a substrate (e.g., PCB). According to an embodiment, the antenna module 3397 may include a plurality of antennas. In such a case, at least one antenna appropriate for a communication scheme used in the communication network, such as the first network 3398 or the second network 3399, may be selected, for example, by the communication module 3390 (e.g., the wireless communication module 3392) from the plurality of antennas. The signal or the power may then be transmitted or received between the communication module 3390 and the external electronic device via the selected at least one antenna. According to an embodiment, another component (e.g., a radio frequency integrated circuit (RFIC)) other than the radiating element may be additionally formed as part of the antenna module 3397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 3301 and the external electronic device 3304 via the server 3308 coupled with the second network 3399. Each of the electronic devices 3302 and 3304 may be a device of a same type as, or a different type, from the electronic device 3301. According to an embodiment, all or some of operations to be executed at the electronic device 3301 may be executed at one or more of the external electronic devices 3302, 3304, or 3308. For example, if the electronic device 3301 should perform a function or a service automatically, or in response to a request from a user or another device, the electronic device 3301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3301. The electronic device 3301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 3340) including one or more instructions that are stored in a storage medium (e.g., internal memory 3336 or external memory 3338) that is readable by a machine (e.g., the electronic device 101). For example, a processor (e.g., the processor 3320) of the machine (e.g., the electronic device 3301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements, according to various embodiments of the present disclosure, may be executed sequentially, in parallel, repeatedly, or in a heuristic manner. Furthermore, some operations may be executed in a different order or may be omitted, or other operations may be added.

According to various embodiments, a storage medium storing instructions is provided. The instructions may be configured to cause at least one processor to, when executed by the at least one processor, perform at least one operation. In a method of executing functions by an electronic device, the at least one operation may include an operation of receiving a first voice input through a microphone, an operation of performing first voiceprint authentication (voice biometrics) processing in order to determine whether the first voice input corresponds to a user registered in the electronic device, an operation of, when the first voice input does not correspond to the user registered in the electronic device, transmitting a request message including first data related to the first voice input to at least one external electronic device connected to the electronic device in order to cause the external electronic device to perform second voiceprint authentication processing for the first voice input, an operation of receiving a response message including an authentication result based on the second voiceprint authentication processing from the external electronic device, an operation of receiving a second voice input through the microphone, and an operation of transmitting second data related to the second voice input to an external server at least partially for Automatic Speech Recognition (ASR) and/or Natural Language Understanding (NLU).

The embodiments of the present disclosure disclosed in the specification and the drawings are particular examples proposed in order to easily describe the technical matters of the present disclosure and help with comprehension of the present disclosure, and do not limit the present disclosure. Therefore, in addition to the embodiments disclosed herein, the various embodiments of the present disclosure should be construed to include all modifications or modified forms drawn based on the technical idea of the various embodiments of the present disclosure.

What is claimed is:

1. An electronic device comprising:
   at least one communication circuit;
   a speaker;
   a microphone;
   at least one processor operationally connected to the communication circuit, the speaker, and the microphone; and
   a memory storing instructions,
   wherein the instructions are executable by the at least one processor to cause the electronic device to:
      receive a first voice input through the microphone,
      execute first voiceprint authentication on the first voice input including determining whether the first voice input matches voice information corresponding to a user stored in the electronic device,
      when the first voice input does not match the voice information, transmit a request message including first data related to the first voice input to at least one external electronic device using the communication circuit for execution of a second voiceprint authentication on the first voice input,
      receive a response message from the at least one external electronic device indicating whether the first voice input is authenticated under the second voiceprint authentication,
      receive a second voice input through the microphone;
      receive access information for accessing an external server from the at least one external electronic device and access an external server based on the received access information; and
      transmit second data related to the second voice input to the external server through the communication circuit for execution of at least one of Automatic Speech Recognition (ASR) or Natural Language Understanding (NLU) on the second data related to the second voice input.

2. The electronic device of claim 1, wherein the first voiceprint authentication further includes transmitting the first data related to the first voice input to the external server such that the first voiceprint authentication is executed at least partially through the external server.

3. The electronic device of claim 1, wherein the at least one external electronic device is communicatively coupled to the electronic device through at least one of Wireless Fidelity (Wi-Fi), Light Fidelity (Li-Fi), Bluetooth, Bluetooth Low Energy (BLE), ZigBee, Near Field Communication (NFC), or magnetic secure transmission.

4. The electronic device of claim 1, wherein the electronic device further comprises a smart speaker.

5. The electronic device of claim 1, wherein the instructions are further executable by the at least one processor to:
   identify a particular device that is requested for execution of a function as indicated in the first voice input by analyzing the first voice input; and
   determine whether to execute voiceprint authentication based at least in part on the identified particular device.

6. The electronic device of claim 1, wherein the instructions are further executable by the at least one processor to:
   identify an operation indicated in the first voice input by analyzing the first voice input; and
   determine whether to execute voiceprint authentication based on the identified operation.

7. The electronic device of claim 1, wherein the instructions are further executable by the at least one processor to:
   identify a particular device that is requested for execution of a function as indicated in the first voice input by analyzing the first voice input,
   when the particular device is the electronic device, transmit a request for operation-related information to the at least one external electronic device, and
   execute the function identified in the first voice input, based at least on the operation-related information received from the at least one external electronic device.

8. The electronic device of claim 1, wherein the instructions are further executable by the at least one processor to:
   identify a particular device that is requested for execution of a function as indicated in the first voice input by analyzing the first voice input,
   when the particular device is the at least one external electronic device, transmit the operation-related information to the at least one external electronic device for execution of the function by the at least one external electronic device.

9. A method in an electronic device, the method comprising:
- receiving a first voice input through a microphone;
- executing by at least one processor first voiceprint authentication on the first voice input including determining whether the first voice input matches voice information corresponding to a user stored in the electronic device;
- when the first voice input does not match the voice information, transmitting by a communication circuit a request message including first data related to the first voice input to at least one external electronic device for execution of a second voiceprint authentication on the first voice input;
- receiving a response message from the at least one external electronic device indicating whether the first voice input is authenticated under the second voiceprint authentication;
- receiving a second voice input through the microphone; and
- receiving access information for accessing an external server from the at least one external electronic device and access the external server based on the received access information, and
- transmitting second data related to the second voice input to the external server for execution of at least one of Automatic Speech Recognition (ASR) or Natural Language Understanding (NLU) on the second data related to the second voice input.

10. The method of claim 9, wherein the first voiceprint authentication further includes transmitting the first data related to the first voice input to the external server such that the first voiceprint authentication is executed at least partially through the external server.

11. The method of claim 9, wherein the at least one external electronic device is communicatively coupled to the electronic device through at least one of Wireless Fidelity (Wi-Fi), Light Fidelity (Li-Fi), Bluetooth, Bluetooth Low Energy (BLE), ZigBee, Near Field Communication (NFC), or magnetic secure transmission.

12. The method of claim 9, further comprising:
- identifying a particular device that is requested for execution of a function as indicated in the first voice input by analyzing the first voice input; and
- determining whether to execute voiceprint authentication based at least in part on the identified particular device.

13. The method of claim 9, further comprising:
- identifying an operation indicated in the first voice input by analyzing the first voice input; and
- determining whether to execute voiceprint authentication based on the identified operation.

14. The method of claim 9, further comprising:
- identifying a particular device that is requested for execution of a function as indicated in the first voice input by analyzing the first voice input,
- when the particular device is the electronic device, transmitting a request for operation-related information to the at least one external electronic device, and
- executing the function identified in the first voice input, based at least on the operation-related information received from the at least one external electronic device.

15. The method of claim 14, further comprising:
- identifying a particular device that is requested for execution of a function as indicated in the first voice input by analyzing the first voice input,
- when the particular device is the at least one external electronic device, transmitting the operation-related information to the at least one external electronic device for execution of the function by the at least one external electronic device.

16. An electronic device comprising:
- at least one communication circuit;
- a microphone;
- at least one processor operationally connected to the communication circuit and the microphone; and
- a memory storing instructions executable by the at least one processor to cause the electronic device to:
  - receive a first voice input through the microphone,
  - execute first voiceprint authentication on the first voice input including determining whether the first voice input matches voice information corresponding to a user stored in the electronic device,
  - when the first voice input does not correspond to the user registered in the electronic device, transmit, using the communication circuit, a request message including first data related to the first voice input to at least one external electronic device to cause the external electronic device to execute second voiceprint authentication processing for the first voice input,
  - receive, using the communication circuit, a response message including an authentication result from the external electronic device, and
  - receive a second voice input through the microphone,
  - receive access information for accessing an external server from the at least one external electronic device and access the external server based on the received access information, and
  - transmit second data related to the second voice input to the external server through the communication circuit for execution of at least one of Automatic Speech Recognition (ASR) or Natural Language Understanding (NLU) on the second data related to the second voice input.

17. The electronic device of claim 16, wherein executing the first voiceprint authentication further includes transmitting the first data related to the first voice input to an external server such that the first voiceprint authentication is executed at least partially through the external server.

18. The electronic device of claim 16, wherein the electronic device comprises a smart speaker including at least one speaker.

* * * * *